US 9,151,644 B2

(12) United States Patent
Ozawa et al.

(10) Patent No.: US 9,151,644 B2
(45) Date of Patent: Oct. 6, 2015

(54) LOAD MEASUREMENT SENSOR SUPPORT STRUCTURE

(75) Inventors: Hidetoshi Ozawa, Tochigi (JP); Wataru Honda, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/235,301

(22) PCT Filed: Jul. 27, 2012

(86) PCT No.: PCT/JP2012/069117
§ 371 (c)(1),
(2), (4) Date: Apr. 22, 2014

(87) PCT Pub. No.: WO2013/015405
PCT Pub. Date: Jan. 31, 2013

(65) Prior Publication Data
US 2014/0224041 A1  Aug. 14, 2014

(30) Foreign Application Priority Data

| Jul. 28, 2011 | (JP) | 2011-165465 |
| Aug. 10, 2011 | (JP) | 2011-175460 |
| Aug. 10, 2011 | (JP) | 2011-175461 |
| Jun. 8, 2012 | (JP) | 2012-131052 |

(51) Int. Cl.
*G01L 1/00* (2006.01)
*G01D 11/30* (2006.01)
(Continued)

(52) U.S. Cl.
CPC .............. *G01D 11/30* (2013.01); *B60N 2/002* (2013.01); *B60N 2/0732* (2013.01); *B60N 2/682* (2013.01); *G01L 1/00* (2013.01)

(58) Field of Classification Search
CPC .......... G01D 11/30; G01L 1/00; B60N 2/002

USPC .............. 73/818, 862.381, 862.629
See application file for complete search history.

(56) References Cited

U.S. PATENT DOCUMENTS 7,000,489 B2 *  2/2006  Kobata et al. ............ 73/862.391
7,399,932 B2 *  7/2008  Kajiyama et al. ............ 177/136
(Continued)

FOREIGN PATENT DOCUMENTS

| JP | 2002-168682 A | 6/2002 |
| JP | 2003-270030 A | 9/2003 |

(Continued)

OTHER PUBLICATIONS

Office Action issued for JP 2011-165465 (Jun. 16, 2015).

*Primary Examiner* — Max Noori
(74) *Attorney, Agent, or Firm* — Drinker Biddle & Reath LLP

(57) ABSTRACT

A support structure stabilizes a position of a load measurement sensor by ensuring the rigidity of a support bracket supporting the sensor. The support structure supports the sensor, including an extension shaft portion extending from a sensor body, by each of attachment bracket and while the extension shaft portion is located at the lateral side of the sensor body, wherein each of the attachment brackets and includes an upright wall that is provided with an insertion hole into which the extension shaft portion is inserted when the sensor is supported, a bottom wall that intersects the upright wall and contacts the upright wall at one end in the seat width direction, and an upward protruding wall provided at a position contacting the bottom wall at the other end opposite the upright wall in the seat width direction of the bottom wall, intersecting the bottom wall, and facing the upright wall.

17 Claims, 27 Drawing Sheets

(51) Int. Cl.
  *B60N 2/00*  (2006.01)
  *B60N 2/07*  (2006.01)
  *B60N 2/68*  (2006.01)

(56) References Cited

U.S. PATENT DOCUMENTS

| | | | |
|---|---|---|---|
| 8,820,464 B2 * | 9/2014 | Takayasu et al. | 180/273 |
| 9,038,487 B2 * | 5/2015 | Ozawa et al. | 73/862.621 |
| 2003/0084731 A1 | 5/2003 | Muraishi | |
| 2003/0106723 A1 * | 6/2003 | Thakur et al. | 177/144 |
| 2003/0177847 A1 | 9/2003 | Ishida | |
| 2005/0021207 A1 | 1/2005 | Endo et al. | |
| 2005/0049824 A1 | 3/2005 | Thakur et al. | |
| 2013/0025377 A1 * | 1/2013 | Ozawa et al. | 73/862.621 |
| 2013/0025378 A1 * | 1/2013 | Ozawa et al. | 73/862.621 |

FOREIGN PATENT DOCUMENTS

| | | |
|---|---|---|
| JP | 2004-050860 A | 2/2004 |
| JP | 2005-041245 A | 2/2005 |
| JP | 2007-057425 A | 3/2007 |
| JP | 2007-271303 A | 10/2007 |
| JP | 2007-308050 A | 11/2007 |
| JP | 4205028 B2 | 1/2009 |
| JP | 2010-042809 A | 2/2010 |

* cited by examiner

FR ⟷ RR

INSIDE ←→ OUTSIDE
WIDTH DIRECTION
(AXIAL DIRECTION)

INSIDE ←→ OUTSIDE
WIDTH DIRECTION

LOAD MEASUREMENT SENSOR SUPPORT STRUCTURE

CROSS REFERENCE TO RELATED APPLICATIONS

This application is the U.S. national phase of the International Patent Application No. PCT/JP2012/069117, filed Jul. 27, 2012, which claims the benefit of the following Japanese Patent Applications whose contents, in their entirety, are incorporated by reference:

| Japanese Patent Application No. | Date Filed |
| --- | --- |
| 2011-165465 | Jul. 28, 2011 |
| 2011-175460 | Aug. 10, 2011 |
| 2011-175461 | Aug. 10, 2011 |
| 2012-131052 | Jun. 8, 2012 |

BACKGROUND

Disclosed herein is a support structure that supports a load measurement sensor, and particularly, a support structure that supports a load measurement sensor by a support bracket while an extension shaft portion provided in the load measurement sensor is located at the lateral side of a sensor body.

For the purpose of improving the safety or the comfortable sitting feeling of the passenger, there has been proposed a technique that controls the operation of a peripheral unit of a vehicle seat in response to the weight of the passenger sitting on the vehicle seat. In such a technique, a load measurement sensor is generally disposed below the vehicle seat on which the passenger sits in order to detect the weight of the passenger sitting on the vehicle seat.

As for the load measurement sensor arrangement position, the load measurement sensor is generally disposed below the vehicle seat. For example, there is known a vehicle seat in which the load measurement sensor is disposed between a slide rail that slides the vehicle seat in the front to back direction and a seat frame that constitutes the vehicle seat (Japanese Patent Document No. 4205028 B1, "the '028 Document").

As illustrated in FIG. 26, the '028 Document discloses a configuration in which a load measurement sensor 130 (which is described as a "load sensor" in the '028 Document) is attached to an upper position of an upper rail 112 (which is described as a "slider" in the '028 Document) sliding relative to a lower rail 111 (which is described as a "rail body" in the '028 Document) attached to a vehicle body floor and a seat frame 101 is disposed above the load measurement sensor 130. Furthermore, FIG. 26 is a partially perspective view illustrating a vehicle seat that employs a load measurement sensor support structure according to the related art.

Then, as illustrated in FIG. 27, a shaft portion 131 (which is described as a "male screw" in the '028 Document) is provided in order to fix the load measurement sensor 130 to the seat frame 101, and is disposed so that the axial direction of the shaft portion 131 becomes the perpendicular direction. FIG. 27 is a cross-sectional view illustrating the load measurement sensor support structure according to the related art.

In recent years, there has been a demand for a technique of decreasing a height of a vehicle seat in order to improve the convenience of the passenger when the passenger sits on the vehicle seat or to improve the design of the vehicle seat. However, in a case where the load measurement sensor 130 is attached by the above-described configuration, the seat frame 101 is disposed at a position that is high by the height of the load measurement sensor 130, and hence a problem arises in that the height of the vehicle seat increases.

In order to solve the above-described problems, there is proposed a technique in which the shaft portion supporting the load measurement sensor is disposed so that the axial direction thereof becomes the horizontal direction instead of the perpendicular direction (Japanese Patent Document No. 2010-42809 A, "the '809 Document"). In the '809 Document, the load measurement sensor (which is described as a "body weight detection sensor" in the '809 Document) is attached so that the axial direction thereof becomes the horizontal direction, and the load measurement sensor is disposed within the height range of the seat frame. For this reason, the height of the vehicle seat may be decreased compared to the technique of the '028 Document.

SUMMARY

In a case where both ends of the load measurement sensor in the axial direction are supported so that the axial direction of the shaft portion becomes the horizontal direction, the ends are assembled to the support bracket, and hence it is difficult to promptly support the load measurement sensor by the support bracket. For this reason, as a load measurement sensor support structure, for example, a structure may be considered which supports only one end of the load measurement sensor in the axial direction by the support bracket. Here, when the support rigidity of the support bracket is small, the position of the load measurement sensor is not stabilized, and hence there is a concern that the unstable position may have a bad influence on the measurement precision of the load measurement sensor.

In a case where a deformation portion is deformed by moving the load measurement sensor due to a load transmitted from the seat to the load measurement sensor, there is a concern that the deformation of the deformation portion may be disturbed when the load is not appropriately transmitted to the deformation portion. For this reason, there is a possibility that the load is not appropriately detected by the deformation portion although the load is input from the seat.

Therefore, various embodiments disclosed herein are made in view of the above-described problems, and an object thereof is to realize a support structure capable of stabilizing a load measurement sensor arrangement position by ensuring the rigidity of a support bracket supporting a load measurement sensor.

Further, another object according to an embodiment is to provide a support structure that transmits a load input from a seat to a load measurement sensor and accurately detects the input load.

The above-described problems are solved by a load measurement sensor support structure that supports a load measurement sensor, which includes a sensor body detecting a load applied to a seat and an extension shaft portion extending from the lateral side of the sensor body, by a support bracket while the extension shaft portion is located at the lateral side of the sensor body, wherein the support bracket includes an upright wall portion that is provided with an insertion hole into which the extension shaft portion is inserted when the load measurement sensor is supported, a bottom wall portion that intersects the upright wall portion and contacts the upright wall portion at one end in the seat width direction, and an upward protruding wall that is provided at a position contacting the bottom wall portion at the other end of the bottom wall portion opposite to the upright wall portion in the width direction, intersecting the bottom wall portion, and facing the upright wall portion.

According to the support structure, since the support bracket includes the upward protruding wall that faces the upright wall portion, the sufficient rigidity of the support bracket may be ensured. As a result, the position of the load measurement sensor may be stabilized, and hence the load measurement sensor may be maintained in a state where the accurate load measurement is performed.

Further, the support bracket may extend in the front to back direction of the seat, the upward protruding wall may be formed from a front end of the bottom wall portion toward a back end thereof, and a removal portion, which is formed by removing a part of the upward protruding wall, may be formed at the same position as the center axis of the extension shaft portion of the load measurement sensor in the front to back direction so that the load measurement sensor is exposed to a space opposite to the upright wall portion when viewed from the upward protruding wall in the width direction.

With such a configuration, the load measurement sensor may be more easily supported. More specifically, the load measurement sensor is attached from the inside of the support bracket, that is, the installation side of the upward protruding wall. Since the removal portion provided in the upward protruding wall exists at the same position as the support position of the load measurement sensor in the front to back direction, the load measurement sensor is smoothly disposed at the support position through the removal portion without being disturbed by the upward protruding wall. As a result, the operation of supporting the load measurement sensor may be further easily performed.

Further, the seat may be attached onto a rail member that extends in the front to back direction of the seat through the support bracket, and the support bracket may be separated from the rail member, and may be removably fixed to the rail member. With such a configuration, for example, even when the seat design is changed, the load measurement sensor may be easily reset. In this way, the general versatility of the load measurement sensor support structure is improved, and the maintenance workability is also improved.

In addition, the support bracket may be fixed to the rail member by a fastening member, and the fastening member may be set to a position avoiding the load measurement sensor in the front to back direction. With such a configuration, the interference between the load measurement sensor and the fastening member is suppressed. Accordingly, the load measurement sensor support position may be further shifted to the lower side, and hence the seat may be further decreased in size in the up to down (vertical) direction.

Further, the support bracket fixing position in the rail member may be adjustable in the longitudinal direction of the rail member. With such a configuration, the support bracket attachment position may be easily and highly precisely adjusted.

Further, the sensor body may include a deformation portion that is deformed to be bent inward in the radial direction of the extension shaft portion by receiving the load, the load measurement sensor support structure may include: a load input portion that contacts the load measurement sensor to input the load to the load measurement sensor; and a sensor body receiving portion that presses the deformation portion when the load measurement sensor is moved by the load input from the load input portion, the sensor body receiving portion may include the support bracket as a constituent, and the load input portion may be separated from the sensor body receiving portion while the load measurement sensor is supported by the support bracket.

In the above-described configuration, since the load input portion and the sensor body receiving portion are separated from each other, when a load is input from the load input portion to the load measurement sensor, the load measurement sensor moves, and the deformation portion is deformed while being pressed against the sensor body receiving portion through the contact portion due to the movement. By such a procedure, the load input from the load input portion is reliably transmitted to the sensor body, that is, the deformation portion through the contact portion. Further, even when the input load is minute, the load is appropriately transmitted from the load input portion to the deformation portion by the principle of the lever. As a result, the load input from the load input portion may be appropriately transmitted to the deformation portion, and hence the load may be accurately detected.

At this time, the load measurement sensor may be rotated by the load input from the load input portion, the deformation portion may move in a direction in which the deformation portion is pressed by the sensor body due to the rotation of the load measurement sensor, and the load input portion may be separated from the sensor body receiving portion in the axial direction of the extension shaft portion in a state where the load measurement sensor is supported by the support bracket. Accordingly, it is possible to further effectively exhibit effects described below.

Further, the load input portion may be located at the opposite side to the sensor body when viewed from the sensor body receiving portion in the axial direction in a state where the load measurement sensor is supported by the support bracket.

In this way, if the load input portion is separated from the sensor body, even when an excessive load is input from the load input portion, the load is not directly exerted on the sensor body, and hence the sensor body may be protected.

Further, the deformation portion may be an annular portion that is inserted into the insertion hole and is pressed against the inner peripheral surface of the insertion hole to be strained in the radial direction, the sensor body receiving portion may include a sliding member that is located between the inner peripheral surface of the insertion hole and the outer peripheral surface of the annular portion in the radial direction and is slidable on the outer peripheral surface of the annular portion, and the annular portion may be pressed against the inner peripheral surface of the insertion hole through the sliding member when the load measurement sensor is moved by the load input from the load input portion. Then, the sliding member may be a cylindrical body into which the annular portion is fitted, a flange portion may be provided at each of both ends of the sliding member in the sliding direction, and the flange portion at one end side in the sliding direction and the flange portion at the other end side in the sliding direction may be formed to be symmetrical to each other.

In this way, when the flange portions formed at both ends of the sliding member in the sliding direction are symmetrical to each other, it is possible to suppress a force, which is exerted on the flange portions when the annular portion contacts the sliding member, from being non-uniform between the flange portions. Further, when both flange portions are symmetrical to each other, the sliding member may be attached to the annular portion from any end, and hence the operation of attaching the sliding member may be easily performed.

Further, the seat may include side frames that are disposed to be separated from each other in the seat width direction, the upright wall portion may be disposed at the position that is parallel to the side frame in the axial direction, and a portion that is located at the lower position in relation to the insertion hole in the upright wall portion may extend downward in the up to down direction.

In this way, when the upright wall portion constituting the sensor body receiving portion directly extends downward, it is possible to suppress an increase in the size of the seat due to the upright wall portion that is widened in the seat width direction.

Further, the support bracket may constitute at least a part of the rail member on which the seat is placed.

Since the rail member has comparatively high rigidity, when at least a part of the rail member is formed by the sensor body receiving portion as described above, the rigidity of the sensor body receiving portion is ensured, and hence the deformation portion is stably pressed against the sensor body receiving portion.

Further, the upright wall portion may include an annular portion that is formed at the inside of the insertion hole and protrudes in the seat width direction, and the deformation portion may be pressed against the inner peripheral surface of the insertion hole when the load measurement sensor is moved by the load input from the load input portion.

In this way, since the area of the inner peripheral surface of the insertion hole against which the deformation portion is pressed is widened by the area of the annular portion, the deformation portion is easily pressed against the inner peripheral surface of the insertion hole. As a result, the load is easily transmitted to the deformation portion.

In addition, in the above-described configuration, the annular portion may protrude toward the load input portion in the width direction.

If the annular portion protrudes toward the load input portion, when the load measurement sensor is rotated by the load input from the load input portion so that the deformation portion is pressed against the inner peripheral surface of the insertion hole, the comparatively highly-rigid base end of the annular portion is first pressed against the inner peripheral surface, and hence the deformation portion may be appropriately pressed against the sensor body receiving portion.

Alternatively, the annular portion may protrude toward the opposite side to the load input portion in the width direction.

If the annular portion protrudes toward the opposite side to the load input portion, the load measurement sensor is rotated by the load input from the load input portion so that the deformation portion is pressed against the inner peripheral surface of the insertion hole, the free end of the annular portion is first pressed against the inner peripheral surface of the insertion hole. Accordingly, even when an excessive load is input from the load input portion, the deformation portion is pressed against the inner peripheral surface of the insertion hole at the free end of the annular portion, and the free end is bent to release the impact load generated by the collision between the deformation portion and the annular portion, thereby absorbing the excessive load.

Further, wherein the deformation portion may be an annular portion that is inserted into the insertion hole and is pressed against the inner peripheral surface of the insertion hole to be strained in the radial direction, the sensor body receiving portion may include a sliding member that is located between the inner peripheral surface of the insertion hole and the outer peripheral surface of the annular portion in the radial direction and is slidable on the outer peripheral surface of the annular portion, and the annular portion may be pressed against the inner peripheral surface of the insertion hole through the sliding member when the load measurement sensor is moved by the load input from the load input portion. Then, the sliding member may be a cylindrical body into which the annular portion is fitted, and a flange portion may be provided at each of both ends of the sliding member in the sliding direction. Further, a one-end-side flange portion located at one side in the sliding direction among the flange portions may be adjacent to a front end of the annular portion at the outside of the front end in the width direction, and an outer edge of the front end of the annular portion may be located at the inside of an outer edge of the one-end-side flange portion.

The sliding member is formed so that a base material is inserted through the annular portion and caulking is performed on one end protruding from the annular portion. Then, the flange portion that is formed by caulking one end protruding from the annular portion in the sliding member is adjacent to the front end of the annular portion. At this time, when the outer edge of the front end of the annular portion is located at the inside of the outer edge of the flange portion, it is possible to ensure a margin by the protruding amount from the outer edge of the front end of the annular portion at the time point in which the caulking is performed.

Further, the deformation portion may include an annular portion that is inserted into the insertion hole and is pressed against the inner peripheral surface of the insertion hole to be strained in the radial direction, the sensor body may include an inner portion that is located at the inside of the annular portion in the radial direction, the inner portion may include an inner large-diameter area that contacts the annular portion when the annular portion is strained inward in the radial direction and an inner small-diameter area that is adjacent to the inner large-diameter area and has a diameter smaller than that of the inner large-diameter area, and at least a part of the inner large-diameter area and the inner small-diameter area may be disposed inside the insertion hole in a state where the load measurement sensor is supported by the support bracket.

Since a load is transmitted to the portion strained in the radial direction to contact the inner large-diameter area in the annular portion, when at least a part of the inner large-diameter area and the inner small-diameter area are disposed inside the insertion hole in a state where the load measurement sensor is supported by the support bracket, the entire area of the portion that receives the load in the annular portion is surrounded by the annular portion. Accordingly, the load receiving portion in the annular portion is reliably pressed against the annular portion, and hence the load is reliably transmitted.

Further, the seat may include the side frames that are disposed to be separated from each other in the seat width direction, the support bracket may be located at the inside of the side frame in the width direction, and a front end of the extension shaft portion may protrude from the insertion hole and may be fastened to the side frame.

In this way, since the extension shaft portion is fastened to the side frame having comparatively high rigidity in the frames of the seat, the load measurement sensor may be stably disposed at the support position.

According to an embodiment, since the support bracket supporting the load measurement sensor has sufficient rigidity, the position of the load measurement sensor may be stabilized.

According to an embodiment, the load measurement sensor support position may be further shifted to the lower side.

According to an embodiment, the load measurement sensor may be easily reset even when the seat design is changed. In this way, the general versatility of the load measurement sensor support structure is improved, and the maintenance workability is also improved.

According to an embodiment, the interference between the load measurement sensor and the fastening member is suppressed. Accordingly, the load measurement sensor support position may be further shifted to the lower side, and hence the seat may be further decreased in size in the up to down direction.

According to an embodiment, the support bracket attachment position may be easily and highly precisely adjusted.

According to an embodiment, the load input from the load input portion is appropriately transmitted to the deformation portion in a manner such that the deformation portion is displaced to the position where the deformation portion is pressed against the sensor body receiving portion with the rotation of the load measurement sensor, and the load is appropriately transmitted from the load input portion to the deformation portion even when the load input from the load input portion is minute by the principle of the lever. Accordingly, since the load input from the load input portion may be appropriately transmitted to the deformation portion, the load may be accurately detected.

According to an embodiment, even when an excessive load is input from the load input portion, the excessive load is not directly exerted on the sensor body, and hence the sensor body may be protected.

According to an embodiment, it is possible to suppress a force exerted on the flange portions of the sliding member when the annular portion contacts the sliding member from being non-uniform between the flange portions. Further, the operation of attaching the sliding member may be easily performed.

According to an embodiment, it is possible to suppress an increase in the size of the seat due to the upright wall portion that is widened in the seat width direction.

According to an embodiment, the rigidity of the sensor body receiving portion is ensured, and hence the deformation portion is stably pressed against the sensor body receiving portion.

According to an embodiment, since the area of the inner peripheral surface of the insertion hole against which the deformation portion is pressed is widened by the area of the annular portion, the deformation portion is easily pressed against the inner peripheral surface of the insertion hole, and hence the load is easily transmitted to the deformation portion.

According to an embodiment, when the load measurement sensor is rotated by the load input from the load input portion so that the deformation portion is pressed against the inner peripheral surface of the insertion hole, the comparatively highly-rigid base end of the annular portion is first pressed against the inner peripheral surface, and hence the deformation portion may be appropriately pressed against the sensor body receiving portion.

According to an embodiment, when the load measurement sensor is rotated by the load input from the load input portion so that the deformation portion is pressed against the inner peripheral surface of the insertion hole, the free end of the annular portion is first pressed against the inner peripheral surface of the insertion hole. For this reason, for example, even when an excessive load is input from the load input portion, the deformation portion is pressed against the inner peripheral surface of the insertion hole at the free end of the annular portion. At that time, the free end is bent to release the impact load generated by the collision between the deformation portion and the annular portion, and hence the excessive load may be absorbed.

According to an embodiment, it is possible to ensure a margin by the protruding amount from the outer edge of the front end of the annular portion at the time point in which caulking is performed on one end of a base material protruding from the annular portion to form the flange portion at one end of the sliding member in the sliding direction.

According to an embodiment, since the entire load receiving portion in the annular portion is surrounded by the annular portion, the load receiving portion of the annular portion is reliably pressed against the annular portion, and hence the load is reliably transmitted.

According to an embodiment, since the extension shaft portion is fastened to the side frame having comparatively high rigidity, the load measurement sensor may be stably disposed at the support position.

BRIEF DESCRIPTION OF THE DRAWINGS

Various embodiments are described below with respect to the drawing figures.

DETAILED DESCRIPTION

Hereinafter, a load measurement sensor support structure according to an embodiment (this embodiment) of the present invention will be described with reference to FIGS. 1 to 17. Here, the load measurement sensor of this embodiment is used to measure a load applied to a vehicle seat Z, and in the description below, a support structure will be described which supports the load measurement sensor in a predetermined posture by a predetermined member.

Furthermore, the sign FR of the views indicate the front side of the vehicle, and the sign RR indicates the back side of the vehicle. Further, in the description below, the width direction of the vehicle seat Z (hereinafter, simply referred to as the width direction) indicates the right and left direction while a passenger faces the front side of the vehicle and corresponds to the horizontal direction. Further, in FIG. 4, sensor attachment components 40 to be described later are not depicted for convenience of the description.

A load measurement sensor (hereinafter, a sensor 30) generally measures the load generated when the passenger sits on the vehicle seat Z as the load applied to the vehicle seat Z. The measurement result is output as an electric signal from a circuit board in the sensor 30. Subsequently, when a receiver (not illustrated) receives the output signal, it is determined whether the passenger exists on the vehicle seat or the sitting passenger is an adult or a child.

Structure of the Vehicle Seat

Figure 3:
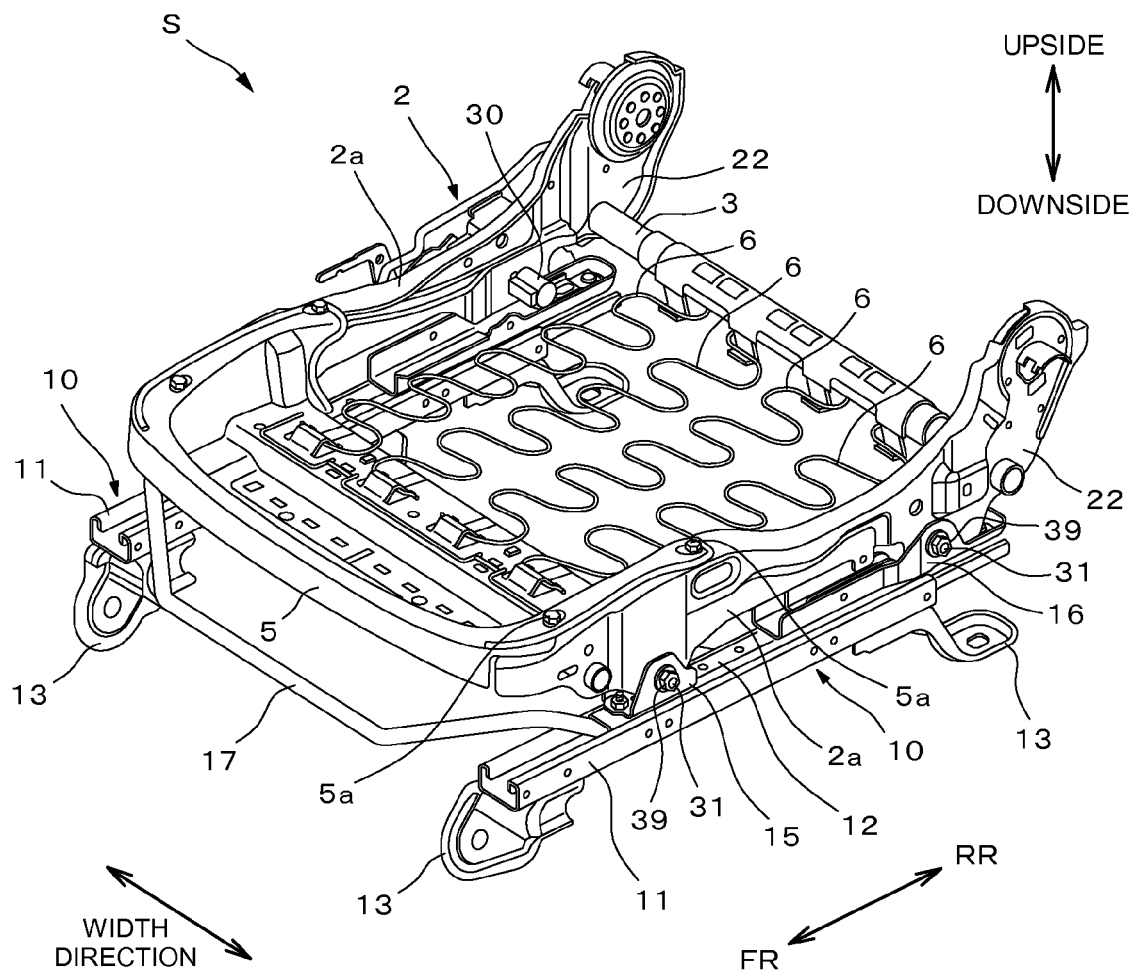
FIG. 3 is a perspective view illustrating a seat unit.

The sensor 30 is supported at a predetermined position of a seat unit S illustrated in FIG. 3 in order to measure the load applied to the vehicle seat Z. Hereinafter, the structure of the seat unit S that includes the vehicle seat Z will be described.

Figure 1:
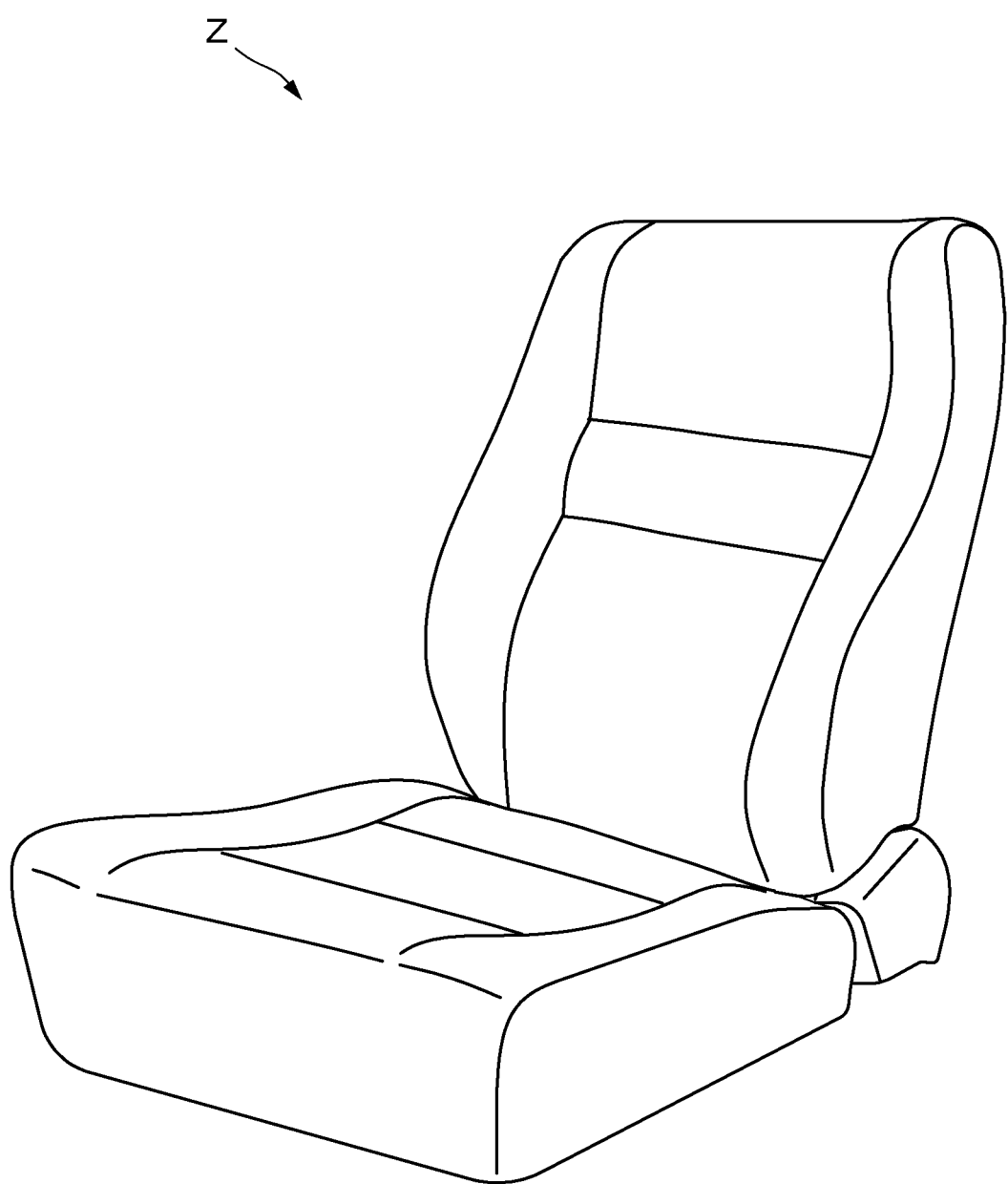
FIG. 1 is an external perspective view of a vehicle seat.
Figure 2:
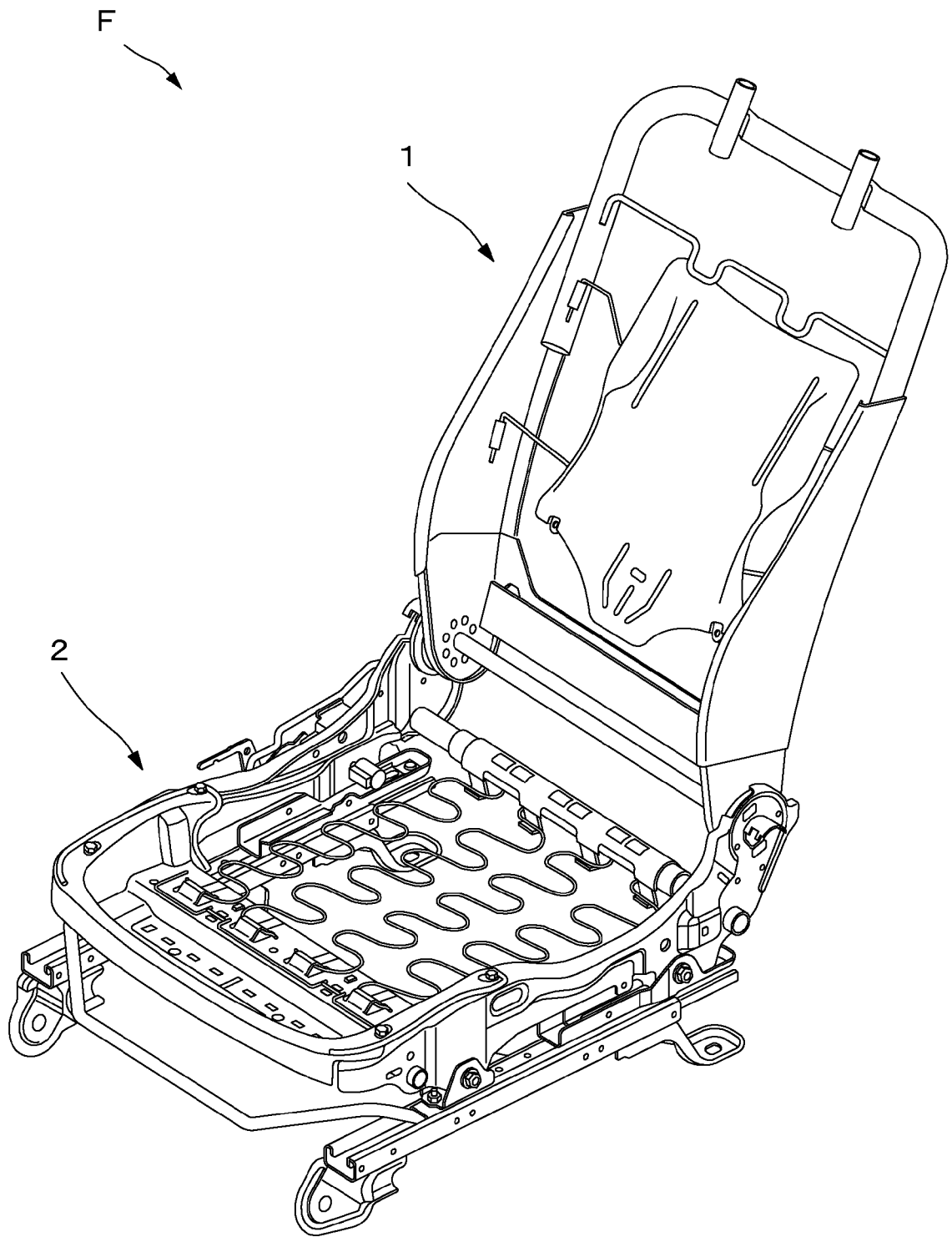
FIG. 2 is a perspective view of a seat frame.

The seat unit S includes the vehicle seat Z and a rail member 10, and is fixed to a vehicle body floor. The vehicle seat Z illustrated in FIG. 1 is an example of the seat, and includes a cushion material and a seat frame F as the skeleton thereof. The seat frame F is made of a metal material, and includes a seating frame 2 that includes a side frame 2a provided at each of both ends in the width direction thereof and a seat back frame 1 that is provided at the back side as illustrated in FIG. 2.

Figure 4:
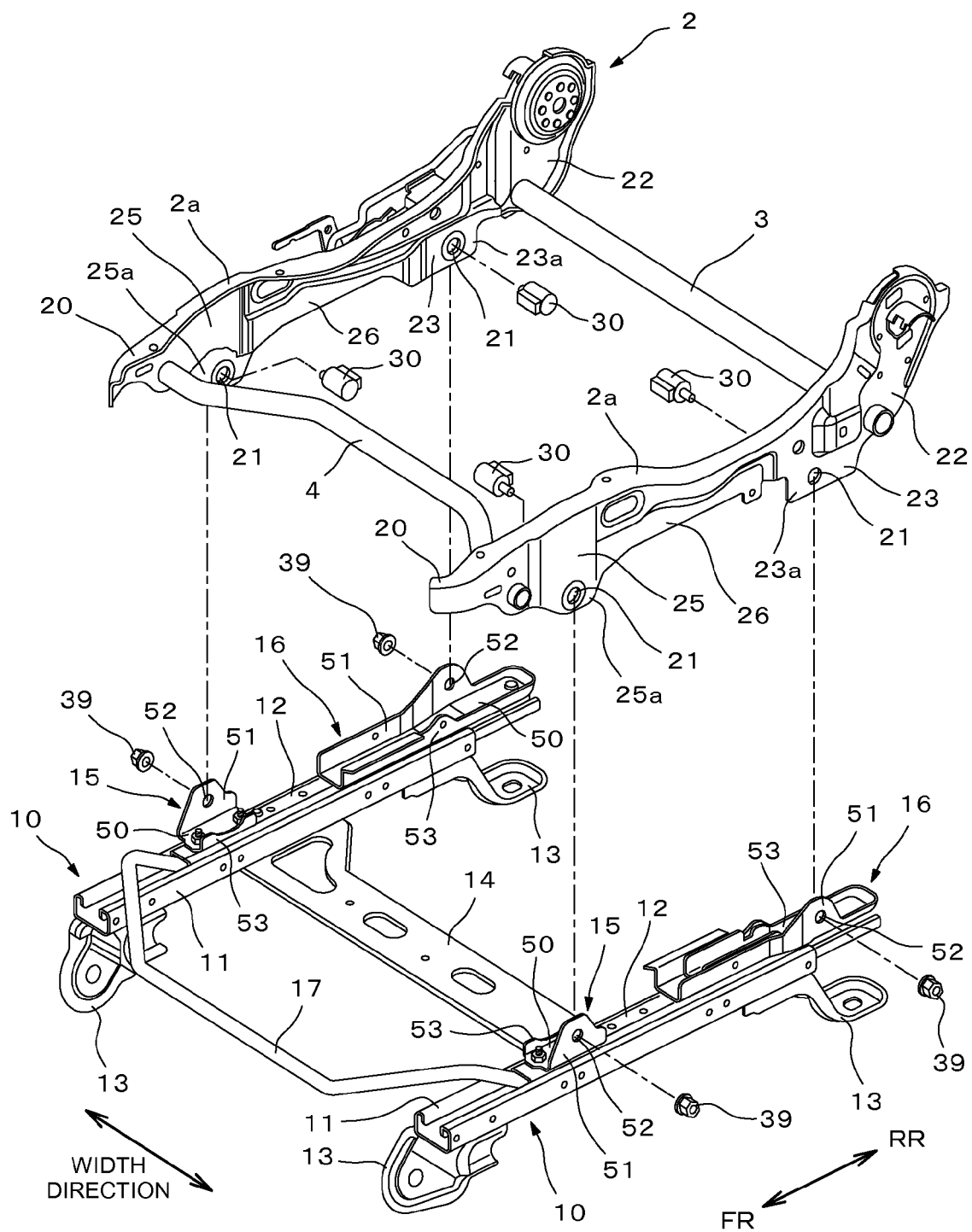
FIG. 4 is an exploded development view of the seat unit.

Each side frame 2a that constitutes the seating frame 2 is a sheet-metal member that extends in the front to back direction, and the back end thereof is connected to the seat back frame. Further, the side frame 2a at one end side of the width direction and the side frame 2a at the other end side of the width direction are separated from each other in the width direction in a parallel state. Further, as illustrated in FIG. 4, the back ends of the side frames 2a are connected to each other through a connection pipe 3, and the front ends thereof are also connected to each other through a submarine restraining pipe 4.

The submarine restraining pipe 4 as a connection member is a pipe member that extends from one end of the width direction toward the other end thereof. A width-direction center portion 4a and a width-direction end 4b of the submarine restraining pipe 4 are disposed in parallel in the width direction and are shifted from each other in the front to back direction. In this embodiment, the width-direction center portion 4a is located at the back side in relation to the width-direction end 4b (for example, see FIG. 16). However, the present invention is not limited thereto, and the width-direction end 4b may be located at the back side in relation to the width-direction center portion 4a. Furthermore, a connection portion 4c that connects the width-direction center portion 4a and the width-direction end 4b to each other is provided therebetween, and the extension direction of the connection portion 4c is inclined with respect to the width direction.

Further, a plurality of (four in the case of FIG. 3) S-springs 6 are disposed between the side frames 2a. Each of the S-springs 6 is a support spring that supports a cushion member from the lower side thereof, and extends in the front to back direction in a meandering state. Furthermore, the front end of each S-spring 6 is hung by an installation pan 5 as a plate-shaped frame installed between the side frames 2a. The back end of each S-spring 6 is hung by the above-described connection pipe 3, and more specifically, a substantially circular-arc latching member that is fitted to the connection pipe 3. Accordingly, the S-springs 6 are disposed between the side frames 2a. Then, a cushion member (not illustrated) is mounted on the installation pan 5 and the S-springs 6. Furthermore, the structure of the side frame 2a will be described in detail later.

As illustrated in FIG. 3, the installation pan 5 is attached to the side frame 2a by an attachment portion 5a. Then, the attachment portion 5a is disposed at the inside of the width direction of the vehicle seat Z in relation to the outer end surface of the side frame 2a (more specifically, the surface disposed at the outside of the width direction of the vehicle seat Z). Further, not only the attachment portion 5a of the installation pan 5 but also the outer end (the outer edge) of the installation pan 5, that is, the end at the outside of the seat width direction are disposed at the inside of the seat width direction in relation to the outer end surface of the side frame 2a. Then, the attachment portion 5a of the installation pan 5 is disposed at a position that avoids a front attachment area 25 to be described later.

In this way, when the installation pan 5 is disposed at the inside of the seat width direction in relation to the outer end surface of the side frame 2a, there is no need to increase the size of the installation pan 5 in the seat width direction, and an increase in the weight of the installation pan 5 may be suppressed.

The rail member 10 is provided as a pair of rail members separated from each other in the width direction. Each rail member 10 includes a lower rail 11 that is fixed to the vehicle body floor and an upper rail 12 that is slidable on the lower rail 11 while engaging with the lower rail 11. Each of the lower rail 11 and the upper rail 12 is provided as a pair of lower rails and a pair of upper rails, and extends in the front to back direction. As illustrated in FIG. 4, the pair of upper rails 12 is disposed in parallel with a gap therebetween in the width direction, and both rails are connected to each other by a slide lever 17.

As illustrated in FIG. 4, the pair of lower rails 11 is disposed in parallel with a gap therebetween in the right and left direction, and both rails are connected to each other by a member frame 14. Further, a fixed bracket 13 is attached to the lower surface of the end of each lower rail 11. When the fixed bracket 13 is fastened to the vehicle body floor, the lower rail 11 is fixed to the vehicle body floor.

Then, the vehicle seat Z is placed on the lower rails 11. More specifically, the upper rail 12 is disposed on the lower rail 11 in a slidable manner, and attachment brackets 15 and 16 are fixed onto the upper rails 12 by the nuts which are screw-fixed to bolts 18a and 18b and bolts 18a and 18b as the fastening members. When the side frames 2a of the vehicle seat Z are connected to the attachment brackets 15 and 16, the vehicle seat Z is attached to the upper rails 12, and the vehicle seat Z is placed on the lower rails 11. Further, the sensor 30 to be described later is supported by each of the attachment brackets 15 and 16.

Furthermore, in a state where the vehicle seat Z is disposed on the lower rails 11, the side frame 2a at one end side of the width direction is located above the lower rail 11 at one end side of the width direction, and the side frame 2a at the other end side of the width direction is located above the lower rail 11 at the other end side of the width direction. Further, in a state where the vehicle seat Z is placed on the lower rails 11, the plurality of S-springs 6 are located between the lower rails 11 while being disposed in parallel in the width direction.

Further, in this embodiment, the sensor 30 to be described later is supported by each of the attachment brackets 15 and 16. That is, in the configuration according to this embodiment, the attachment brackets 15 and 16 correspond to the support brackets. In this embodiment, when the passenger sits on the vehicle seat Z so that a load is applied thereto, the side frame 2a presses a predetermined portion of the sensor 30 downward so that the load is input to the sensor 30.

Structure of the Sensor

Next, the structure of the sensor 30 will be described with reference to FIG. 5.

Figure 5:
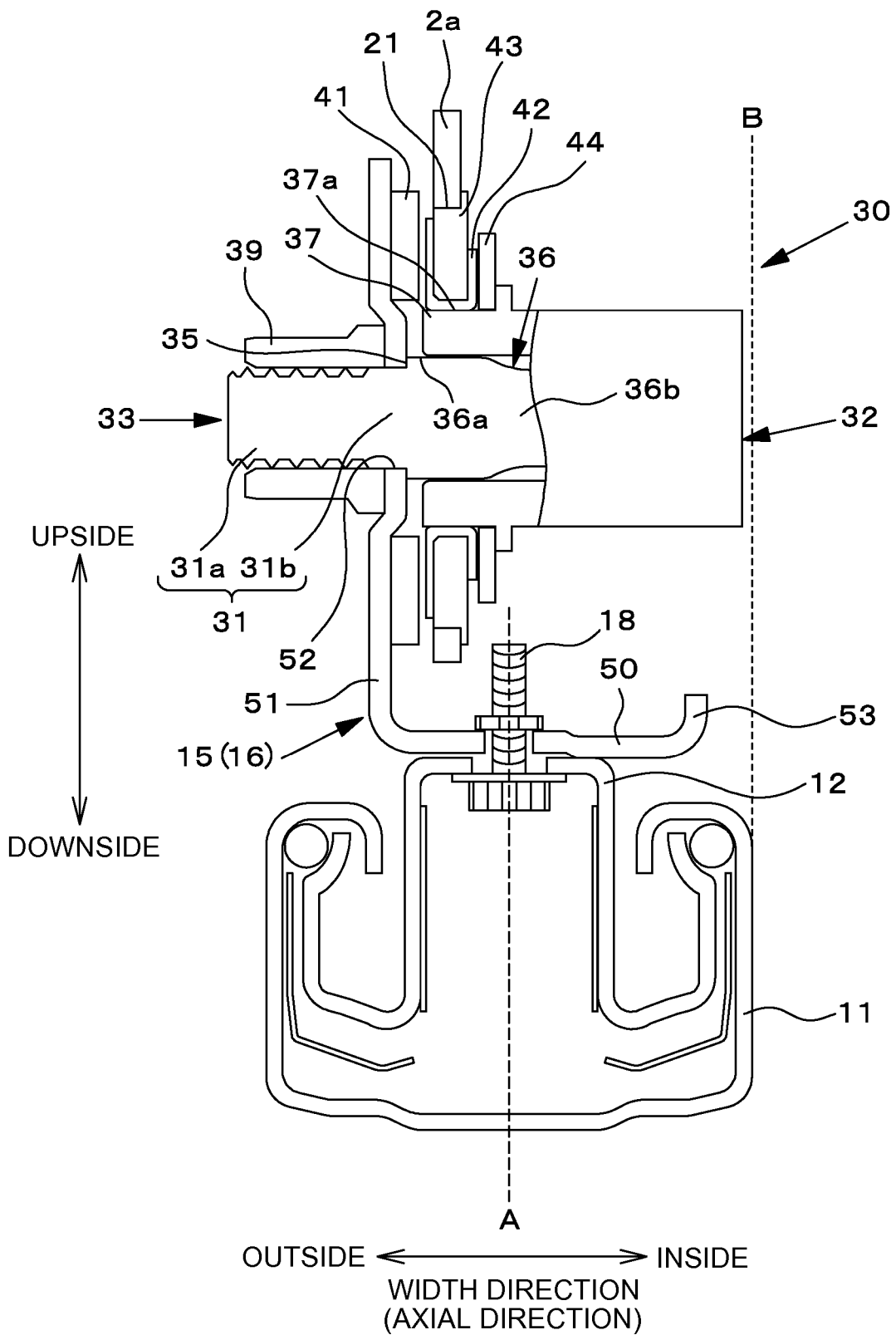
FIG. 5 is a front cut-away view illustrating a load measurement sensor support structure.

As illustrated in FIG. 5, the sensor 30 includes an extension shaft portion 31 and a sensor body 32. In this embodiment, the extension shaft portion 31 is formed by the end provided with a male screw in a metallic shaft body 33 having a male screw formed at one end thereof. The sensor body 32 includes a large diameter portion (specifically, a step portion to be described later) which is formed in the shaft body 33, an outer cylinder body through which the shaft body 33 is inserted, and a circuit board unit 34. Furthermore, the shaft body 33 that includes the extension shaft portion 31 is integrated with the outer cylinder body constituting the sensor body 32.

The extension shaft portion 31 is a bolt-shaped portion that is provided to support the sensor 30 at a predetermined position of the seat unit S, and extends from the lateral side of the sensor body 32. Further, the extension shaft portion 31 includes a male screw portion 31a that is formed at one end of the shaft body in the axial direction and an adjacent portion 31b that is adjacent to the male screw portion 31a in the axial direction. The diameter of the adjacent portion 31b is equal to the portion corresponding to the thread ridge of the male screw portion 31a. Furthermore, in this embodiment, a case has been described in which the extension shaft portion 31 is provided with the male screw portion 31a, but the extension shaft portion may be provided with a female screw.

The sensor body 32 is a main portion of the sensor 30, and is used to detect a load generated when the passenger sits on the vehicle seat Z and to measure the load. The sensor body 32 includes a positioning portion 35 that positions the sensor 30 and a load detection unit 37 that is deformed to detect a load. The positioning portion 35 is a step portion that is adjacent to the adjacent portion 31b at the opposite side to the male screw portion 31a in the shaft body provided with the extension shaft portion 31. The step portion that forms the positioning portion 35 has an outer diameter slightly larger than that of the male screw portion 31a or the adjacent portion 31b, and corresponds to a large diameter portion.

The load detection unit 37 is formed by an annular portion that is located at the opening side end (the end that becomes the insertion hole of the shaft body provided with the extension shaft portion 31) in the outer cylinder body. The annular portion corresponds to a deformation portion, and is deformed so that the load detection unit 37 is bent in the radial direction when a load is generated in the radial direction (in other words, the radial direction of the extension shaft portion 31). The sensor body 32 detects the deformation amount of the annular portion as the load detection unit 37 by a strain sensor (not illustrated), and measures the magnitude of the load from the deformation amount.

Figure 14:
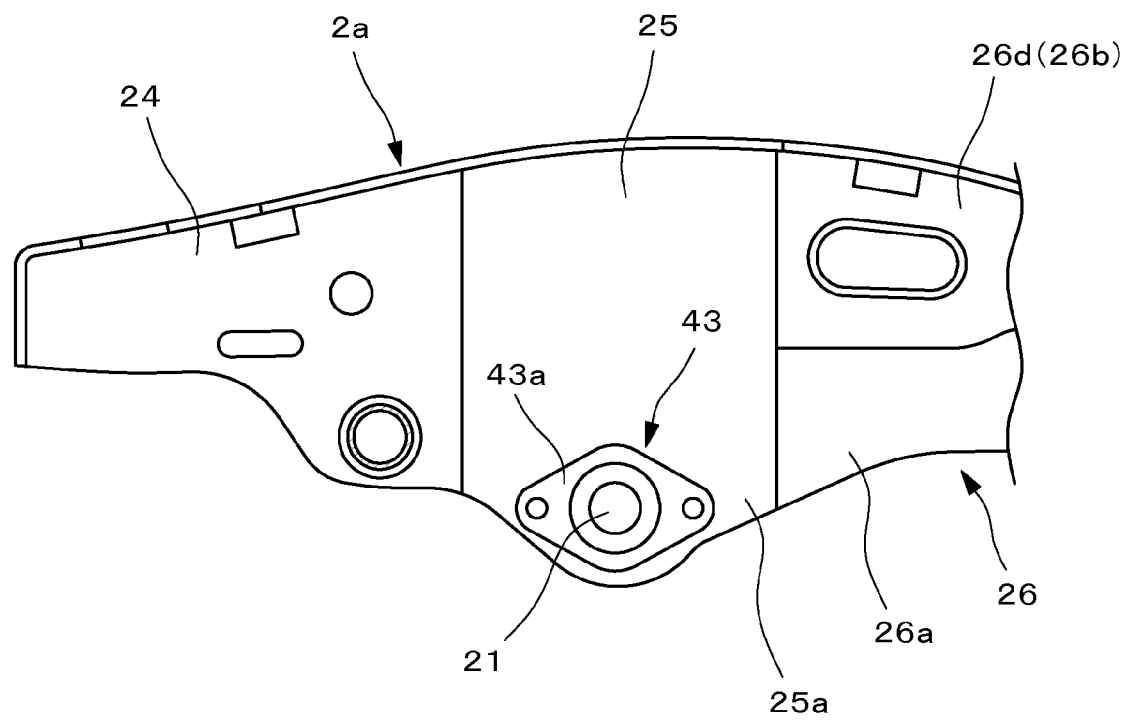
FIG. 14 is an enlarged side view of the periphery of a hole portion of the side frame.

Further, the sensor body 32 is equipped with the circuit board unit 34. The circuit board unit 34 includes a circuit board that outputs an electric signal representing the load measurement result of the sensor 30. Further, as illustrated in FIG. 14, the circuit board unit 34 is equipped with a connector portion 34a that is connected to a receiver (not illustrated) which receives an electric signal output from the circuit board.

In addition, the sensor body 32 includes a portion (hereinafter, an accommodation shaft portion 36) that is accommodated in the outer cylinder body in the shaft body 33 provided with the extension shaft portion 31. The accommodation shaft portion 36 corresponds to an inner portion, and includes, as illustrated in FIG. 5, an equal diameter portion 36a that extends from the step portion forming the positioning portion 35 in the axial direction of the shaft body while keeping an equal diameter and an unequal diameter portion 36b that has a diameter decreasing to be smaller than that of the equal diameter portion 36a. The equal diameter portion 36a corresponds to an inner large diameter area, and is a portion that has the largest outer diameter in the accommodation shaft portion 36, where the outer diameter is slightly smaller than the inner diameter of the annular portion as the load detection unit 37. The unequal diameter portion 36b corresponds to an inner small diameter area, and the outer diameter is slightly smaller than that of the equal diameter portion 36a.

As illustrated in FIG. 5, the sensor 30 with the above-described configuration is supported so that the extension shaft portion 31 is located at the lateral side of the sensor body 32, and more specifically, the extension shaft portion 31 follows the horizontal direction. Furthermore, in a state where the sensor 30 is supported at a predetermined position, the annular portion as the load detection unit 37 in the sensor 30 is fitted to a hole portion 21 formed in the side frame 2a.

Then, when the passenger sits on the vehicle seat Z, the load that is generated at that time is transmitted to the annular portion as the load detection unit 37 of the sensor body 32 through the side frame 2a. More specifically, the side frame 2a that is located at the outside of the radial direction of the annular portion presses the upper portion of the annular portion inward in the radial direction to transmit the load to the annular portion. Here, the portion that is pressed by the side frame 2a is the uppermost portion of the annular portion in the circumferential direction. That is, an area that is located at the upper portion of the outer peripheral surface of the annular portion in the circumferential direction corresponds to a load receiving surface 37a, and the sensor body 32 detects a load in a direction (specifically, the downward vertical direction) perpendicular to the load receiving surface 37a.

Furthermore, the equal diameter portion 36a of the accommodation shaft portion 36 that has an outer diameter slightly smaller than the inner diameter of the annular portion is disposed at the inside of the radial direction of the annular portion (see FIG. 5). Thus, if the load detection unit 37 is bent in the radial direction of the annular portion (the downward vertical direction) due to the load generated when the passenger sits on the vehicle seat Z, the load detection unit is bent until contacting the equal diameter portion 36a. In this way, the bent amount is regulated so that the load detection unit is not excessively bent. That is, in this embodiment, the equal diameter portion 36a corresponds to a regulation portion that regulates the deformation amount during the deformation of the load detection unit 37, and regulates the deformation amount while contacting the load detection unit 37.

As illustrated in FIG. 5, the equal diameter portion 36a of the accommodation shaft portion 36 is disposed at the inside of the annular portion. Thus, when the upper portion of the annular portion in the circumferential direction is bent inward in the radial direction by the load, the annular portion is bent until the annular portion contacts the equal diameter portion 36a. In other words, the equal diameter portion 36a regulates the bent amount while contacting the annular portion bent by a predetermined amount so that the annular portion is not excessively bent. That is, the equal diameter portion 36a corresponds to a regulation portion that regulates the deformation amount during the deformation of the annular portion as the load detection unit 37.

The equal diameter portion 36a as the regulation portion is disposed at a position that meets a load center point when the load applied to the vehicle seat Z is transmitted to the annular portion as the load detection unit 37 through the side frame 2a in the axial direction of the extension shaft portion 31. Here, the load center point indicates the load concentration point of the sensor body 32 when the load detection unit 37 of the sensor body 32, that is, the annular portion receives the load from the vehicle seat Z. In this embodiment, the load center point exists inside the load receiving surface 37a, and is generally located at the center position of the load receiving surface 37a in the axial direction of the extension shaft portion 31.

Since the equal diameter portion 36a as the regulation portion is provided at the above-described position, the equal diameter portion 36a receives the portion corresponding to the load center point of the load detection unit 37. As a result, the annular portion may be suppressed from being excessively deformed by a biased load or the like, and hence the sensor 30 may stably perform the load measurement.

Further, in this embodiment, as illustrated in FIG. 5, the length of the equal diameter portion 36a in the axial direction of the extension shaft portion 31 becomes larger than the length (the thickness) of the side frame 2a in the same direction. That is, the equal diameter portion 36a exists in the range in which the load detection unit 37 is pressed by the side frame 2a in the axial direction. Thus, the equal diameter portion 36a receives the load detection unit 37 throughout the range where the load detection unit is pressed by the side frame 2a, and hence the more stable load measurement may be performed.

Sensor Support Structure

As illustrated in FIG. 5, the above-described sensors 30 serve as the members that connect the side frames 2a to the attachment brackets 15 and 16. Thus, when the sensors 30 are supported at the predetermined support positions in a predetermined posture, the side frames 2a are connected to the attachment brackets 15 and 16, and the vehicle seat Z are fixed to the upper rails 12. In other words, the sensors 30 are supported to get astride of the side frames 2a and the attachment brackets 15 and 16.

Hereinafter, the support structure which supports the sensor 30 at a predetermined position will be described. Here, since the vehicle seat Z of this embodiment is formed in a bilaterally symmetrical shape, only the configuration at one end side of the vehicle seat Z in the width direction will be described in the description below.

Furthermore, in the description below, one lower rail 11 of the pair of lower rails 11 is referred to as a first rail member, and the other lower rail 11 is referred to as a second rail member. Here, the first rail member and the second rail member correspond to the relative concept. Thus, when one lower rail 11 is set as the first rail member, the other lower rail 11 of the pair becomes the second rail member.

Further, for convenience of the description, the location side of the second rail member when viewed from the first rail member in the width direction of the vehicle seat Z is referred to as the inside, and the opposite side to the location side of the second rail member when viewed from the first rail member is referred to as the outside.

For the description of the structure of supporting the sensor 30, the structures of the side frames 2a and the attachment brackets 15 and 16 will be described with reference to FIGS. 6, 7, 8, and 10.

First, the structure of the side frame 2a will be described. The side frame 2a is formed by processing an elongated sheet metal, and the front end 20 is bent inward to define the front end of the vehicle seat Z. Further, the circular hole portions 21 are respectively provided at the slightly back position in relation to the front end of the side frame 2a and the slightly front position in relation to the back end thereof to support the sensor 30. The annular portion provided with the load detection unit 37 in the sensor 30 is inserted through the hole portion 21. Furthermore, in this embodiment, a bush 43 to be described later is fitted to the hole portion 21 in order to increase the length of the portion through which the annular portion is inserted in the side frame 2a.

Figure 6:
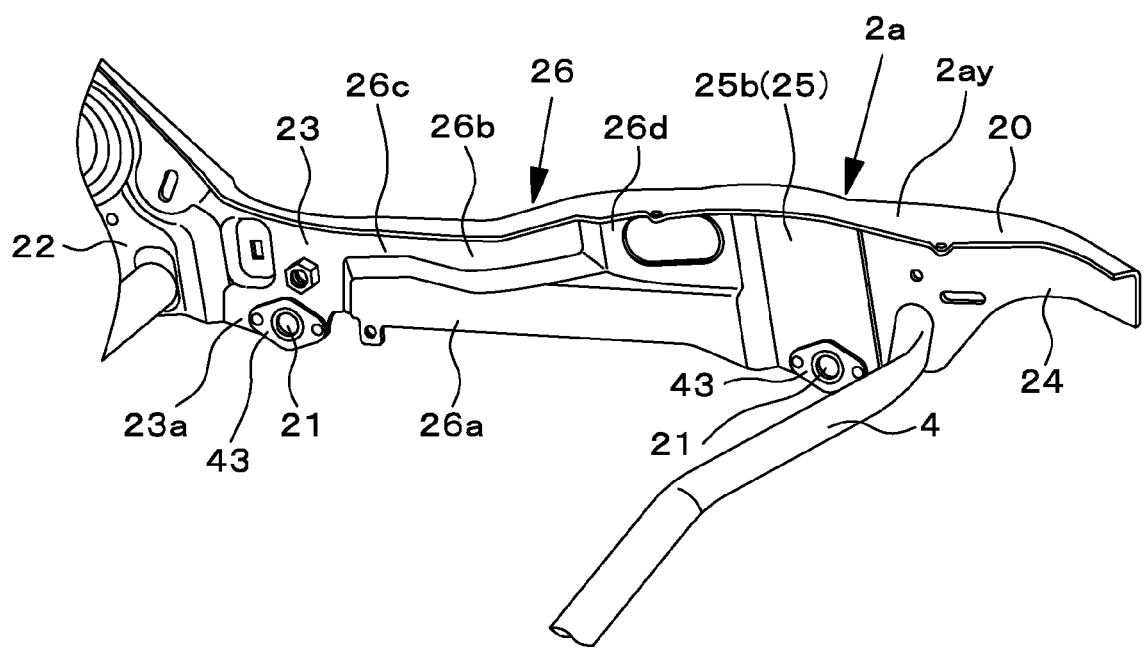
FIG. 6 is a (first) perspective view illustrating a side frame.
Figure 7:
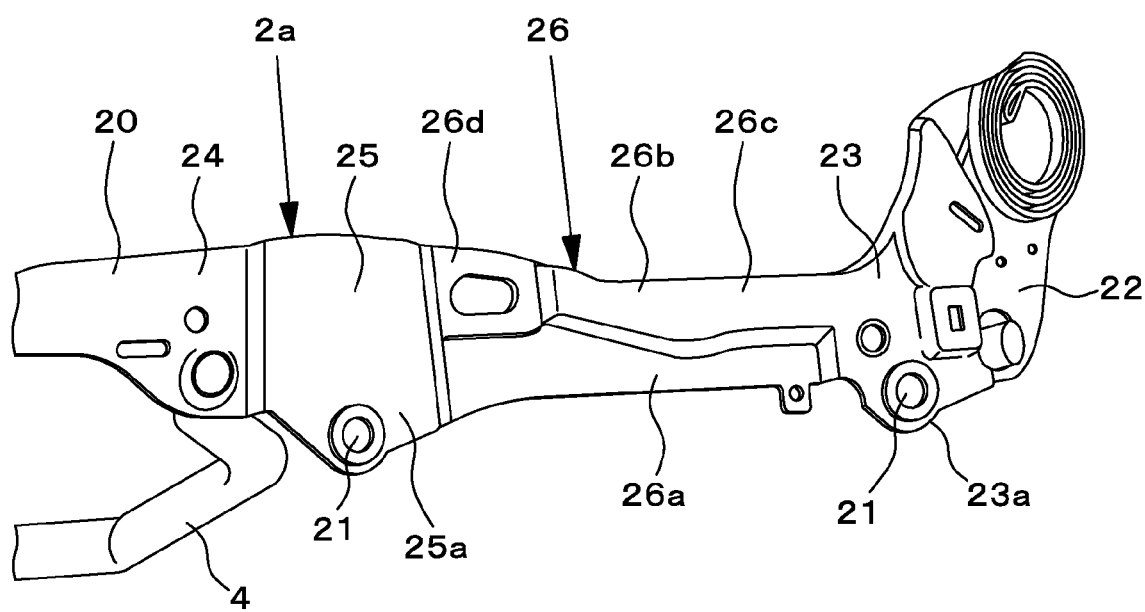
FIG. 7 is a (second) perspective view illustrating the side frame.

Further, as illustrated in FIGS. 6 and 7, a predetermined area of the side frame 2a is recessed inward, and the other areas protrude outward. More specifically, in the side frame 2a, a connection area 22 (that is, a back end) as a connection portion connected to the seat back frame is located at the innermost side in the side frame 2a (in other words, the connection area is closest to the second rail member in the width direction of the vehicle seat Z). An area (hereinafter, a back attachment area 23) that is located at the front side of the connection area 22 and is provided with the back hole portion 21 slightly protrudes outward in relation to the connection area 22. In particular, the portion located in the vicinity of the boundary with respect to the connection area 22 further protrudes outward as illustrated in FIG. 7.

An area (hereinafter, a front attachment area 25) that is located at the back side in relation to an area (a front end area 24) corresponding to the front end of the side frame 2a and is provided with the front hole portion 21 is located at the outside in relation to the front end area 24. Further, the front attachment area 25 is located at the outside in relation to the connection area 22 that is located at the innermost side in the side frame 2a.

With regard to an area (a middle area 26) that is located between the front attachment area 25 and the back attachment area 23 in the front to back direction of the side frame 2a, a lower portion 26a is recessed inward. In an upper portion 26b of the middle area 26, a back adjacent portion 26c adjacent to the back attachment area 23 protrudes outward by the same protruding amount as that of the back attachment area 23, and a front adjacent portion 26d adjacent to the front attachment area 25 is slightly recessed inward in relation to the front attachment area 25.

As described above, in this embodiment, when the outer surface of the connection area 22 in the side frame 2a is set as a reference surface, the back attachment area 23 and the front attachment area 25 provided with the hole portions 21, that is, the areas for supporting the sensor 30 protrude outward in relation to the reference surface.

Furthermore, in this embodiment, a part of an area (for example, the back adjacent portion 26c of the middle area 26) other than the back attachment area 23 and the front attachment area 25 provided with the hole portions 21 also protrudes outward in relation to the reference surface. However, the present invention is not limited thereto. For example, only the area provided with the hole portion 21, that is, the support area of the sensor 30 may protrude outward in relation to the reference surface.

In addition, as illustrated in FIG. 7, an inverted triangular projection portion 23a is formed in the lower portion of the back attachment area 23 as the outward protruding portion. Similarly, an inverted triangular projection portion 25a is also formed in the lower portion of the front attachment area 25 as the outward protruding portion. That is, in the back attachment area 23 and the front attachment area 25 in the side frame 2a, the length in the up to down direction is longer than those of the other areas by the amount corresponding to the projection portions 23a and 25a. Then, the projection portions 23a and 25a are provided with the hole portions 21.

In this way, since the downward extending projection portions 23a and 25a are respectively provided in the back attachment area 23 and the front attachment area 25, the areas of the back attachment area 23 and the front attachment area 25 are widened, and hence the rigidity of the back attachment area 23 and the front attachment area 25 may be improved. As a result, the rigidity of the side frame 2a may be improved.

Further, when the extension shaft portion 31 of the sensor 30 is inserted into each of the hole portions 21 formed in the downward extending projection portions 23a and 25a, the sensor 30 may be disposed at the lower side.

As illustrated in FIG. 6, the upper end of the side frame 2a is provided with a flange portion 2ay that extends inward in the width direction of the vehicle seat Z, and the lower end thereof is not provided with a flange portion. That is, only the upper end of the side frame 2a is provided with the flange portion 2ay. Thus, since only the upper end of the side frame 2a is provided with the flange portion 2ay, the rigidity of the upper portion is higher than that of the lower portion. In other words, the rigidity of the lower side of the side frame 2a is lower than that of the upper side thereof.

Then, since the sensors 30 may be assembled to the lower end of the side frame 2a, that is, the projection portions 23a and 25a, the sensors 30 may be assembled to the portions distant from the flange portion 2ay of the side frame 2a, that is, the portion the portions having comparatively low rigidity. Thus, since the sensors 30 are provided at the low-rigid portions in the side frame 2a, the load may be easily transmitted to the sensors 30. As a result, the sensor 30 may easily follow the movement (in particular, the movement in the up to down direction) of a sliding member 42 as a load input portion.

In addition, since the side frame 2a is provided with the projection portions 23a and 25a as described above, the sensors 30 are disposed at the positions that are more distant from the flange portion 2ay. Thus, since the sensors 30 are disposed at the particularly low-rigid positions in the side frame 2a, there is an effect that the load may be more easily transmitted to the sensors 30.

Next, the attachment brackets 15 and 16 will be described. The attachment brackets 15 and 16 are formed as members separated from the upper rail 12, extend in the front to back direction of the vehicle seat Z, and are removably fixed to the upper surface of the upper rail 12 by the bolts 18. In this way, since the attachment brackets 15 and 16 that are used to support the sensors 30 are formed as members separated from the upper rail 12, the sensors 30 may be easily attached even when the seat design is changed. Likewise, the general versatility of the structure of supporting the sensor 30 is improved, and the maintenance workability is also improved. Further, the freedom in design of the attachment brackets 15 and 16 may be improved. In addition, since the attachment brackets 15 and 16 are formed as separate members, the weight thereof may be decreased compared to the case where the attachment brackets are integrally formed in the front to back direction.

In this embodiment, the attachment brackets 15 and 16 are attached to the upper rail 12 in the longitudinal direction (in other words, the front to back direction of the vehicle seat Z). Then, the sensors 30 are supported by the respective attachment brackets 15 and 16. That is, in this embodiment, the plurality of sensors 30 may be provided at different positions in the front to back direction of the vehicle seat Z, and particularly in the embodiment illustrated in the present specification, the sensors 30 are respectively provided at the front and back ends of the vehicle seat Z in the ends of the width direction (that is, four sensors 30 are totally provided in the vehicle seat Z).

Then, the attachment brackets 15 and 16 and the support structures that support the sensors 30 by the attachment brackets 15 and 16 are separately provided for the sensors 30. More specifically, the attachment bracket 15 is provided for the front sensor 30, and the attachment bracket 16 is provided for the back sensor 30.

As described above, since the attachment brackets 15 and 16 as the support brackets that support the sensors 30 are divided as a plurality of attachment brackets in the longitudinal direction of the upper rail 12, the attachment position of each of the attachment brackets 15 and 16 may be individually adjusted, the adjustment precision of the attachment position is improved.

Furthermore, as a configuration different from the above-described configuration, the attachment bracket 15 for the front sensor 30 may be connected to the attachment bracket 16 for the back sensor 30. Alternatively, a configuration may be employed in which the attachment brackets 15 for the front sensors 30 are connected or the attachment brackets 16 for the back sensors 30 are connected. Further, the above-described configurations may be used in combination. With such a configuration, the rigidity of the attachment brackets 15 and 16 is improved.

Regarding the attachment bracket 16 that is attached to the back side in the front to back direction of the vehicle seat Z, the length of the longitudinal direction is longer than that of the attachment bracket 15 attached to the front side. In this way, since the attachment bracket 16 attached to the back side is formed to be longer than that of the other attachment bracket, the rigidity of the attachment bracket 16 is improved. Here, it is general that a large load is applied to the back side of the vehicle seat Z, but the rigidity of the attachment bracket 16 attached to the back side is high, the load may be received by the attachment bracket 16 even when the large load is applied thereto.

The attachment bracket 15 for the front sensor 30 and the attachment bracket 16 for the back sensor 30 are different in that both attachment brackets have different lengths in the longitudinal direction of the upper rail 12, but the basic structures thereof have a substantially equal length.

Figure 8:
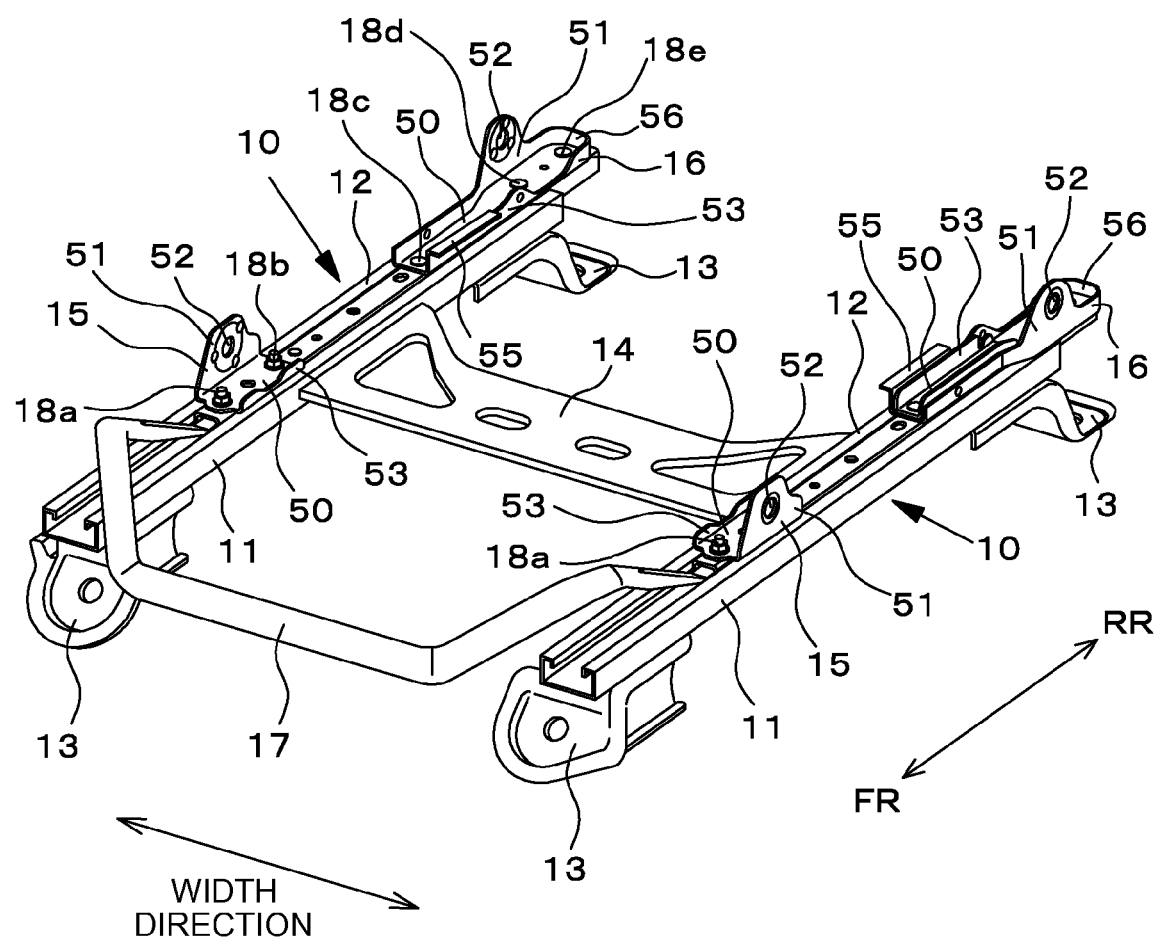
FIG. 8 is a perspective view illustrating a rail member.

First, the front attachment bracket 15 will be described. As illustrated in FIG. 8, the front attachment bracket is formed in a substantially U-shape in the front view (when viewed from the front side), and is fixed to the upper surface of the upper rail 12 so that the center in the width direction overlaps the center of the upper rail 12 in the width direction. Furthermore, as described above, the attachment bracket 15 is fixed to the upper surface of the upper rail 12 as the rail member by the bolts 18 as the fastening members.

Figure 10:
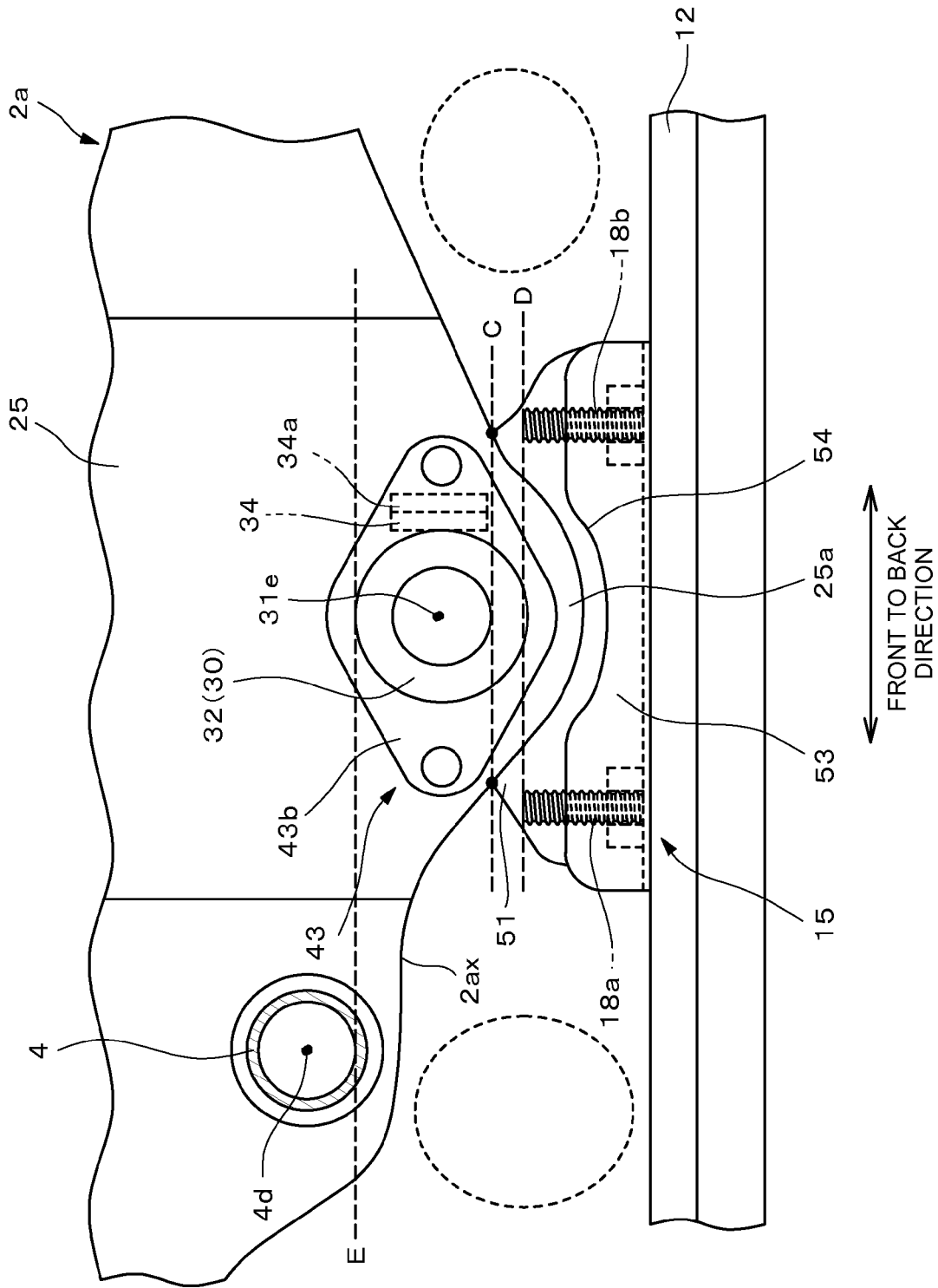
FIG. 10 is a side view illustrating a load measurement sensor supported at a predetermined position and viewed from the lateral side thereof.

At least two bolts 18 are provided in each attachment bracket 15, and are provided at the positions that interpose the sensor 30 fixed to the attachment bracket 15. That is, as illustrated in FIG. 10, the attachment bracket 15 is attached onto the upper rail 12 by the bolts 18*a* and 18*b*.

When the slide lever 17 is operated, the vehicle seat Z may be slid in the front to back direction in a manner such that the upper rail 12 slides on the lower rail 11. Then, even in a state where the vehicle seat Z is slid to the front-most side, the attachment bracket 15 is disposed to be located on the lower rail 11. More specifically, the bolts 18*a* and 18*b* used to attach the attachment bracket 15 to the upper rail 12 are disposed on the lower rail 11 even when the vehicle seat Z is slid to the front-most position.

In this way, since the attachment bracket 15 disposed at the front position is disposed on the lower rail 11 at all times, the attachment bracket 15 may be stably attached.

The bolts 18*a* and 18*b* are respectively disposed at the portions that support the sensor 30 in the attachment bracket 15, that is, the positions that interpose an insertion hole 52 in the front to back direction. In this way, when the bolts 18*a* and 18*b* are disposed to face each other in the front to back direction with one sensor 30 interposed therebetween, the attachment bracket 15 is rigidly attached to the upper rail 12. As a result, the sensor 30 may be stably attached to the upper rail 12.

More specifically, at least a part of the sensor 30 is disposed on the vertical plane that passes through the bolt 18*a* as the first attachment member and the bolt 18*b* as the second attachment member. In other words, at least a part of the sensor 30 is disposed on the plane including the center axes (the dotted lines A of FIG. 10) of the bolt 18*a* and the bolt 18*b* that are disposed to be separated from each other in the front to back direction of the vehicle seat Z and are disposed so that the axial directions thereof follow the up to down direction (the vertical direction).

In this way, since the sensor 30 is disposed between the bolts 18*a* and 18*b* and is disposed on the vertical plane passing through the center axes of the bolts 18*a* and 18*b*, an increase in the size of the structure of supporting the sensor 30 in the seat width direction may be suppressed.

Here, as illustrated in FIG. 10, a bottom wall portion 50 of the attachment bracket 15 is provided with bolt holes so that the bolts 18*a* and 18*b* may be inserted therethrough. The bolt holes are formed as the elongated holes (the long holes) in the longitudinal direction of the upper rail 12 (the front to back direction of the vehicle seat Z).

For this reason, in a case where the attachment bracket 15 is fixed onto the upper rail 12, the bolts 18*a* and 18*b* are inserted through the bolt holes and are temporarily assembled by the nuts, and then the attachment bracket 15 may be moved in the longitudinal direction of the upper rail 12. Therefore, in this embodiment, the attachment position of the attachment bracket 15 in the upper rail 12 as the rail member may be adjusted in the longitudinal direction of the upper rail 12. Accordingly, the attachment position of the attachment bracket 15 may be easily and highly precisely adjusted.

Furthermore, the bolt hole is not limited to the elongated hole in the longitudinal direction of the upper rail 12. For example, the bolt hole may be formed as a truly circular hole as long as the bolt hole has a size in which the attachment position of the attachment bracket 15 may be adjusted.

Figure 9:
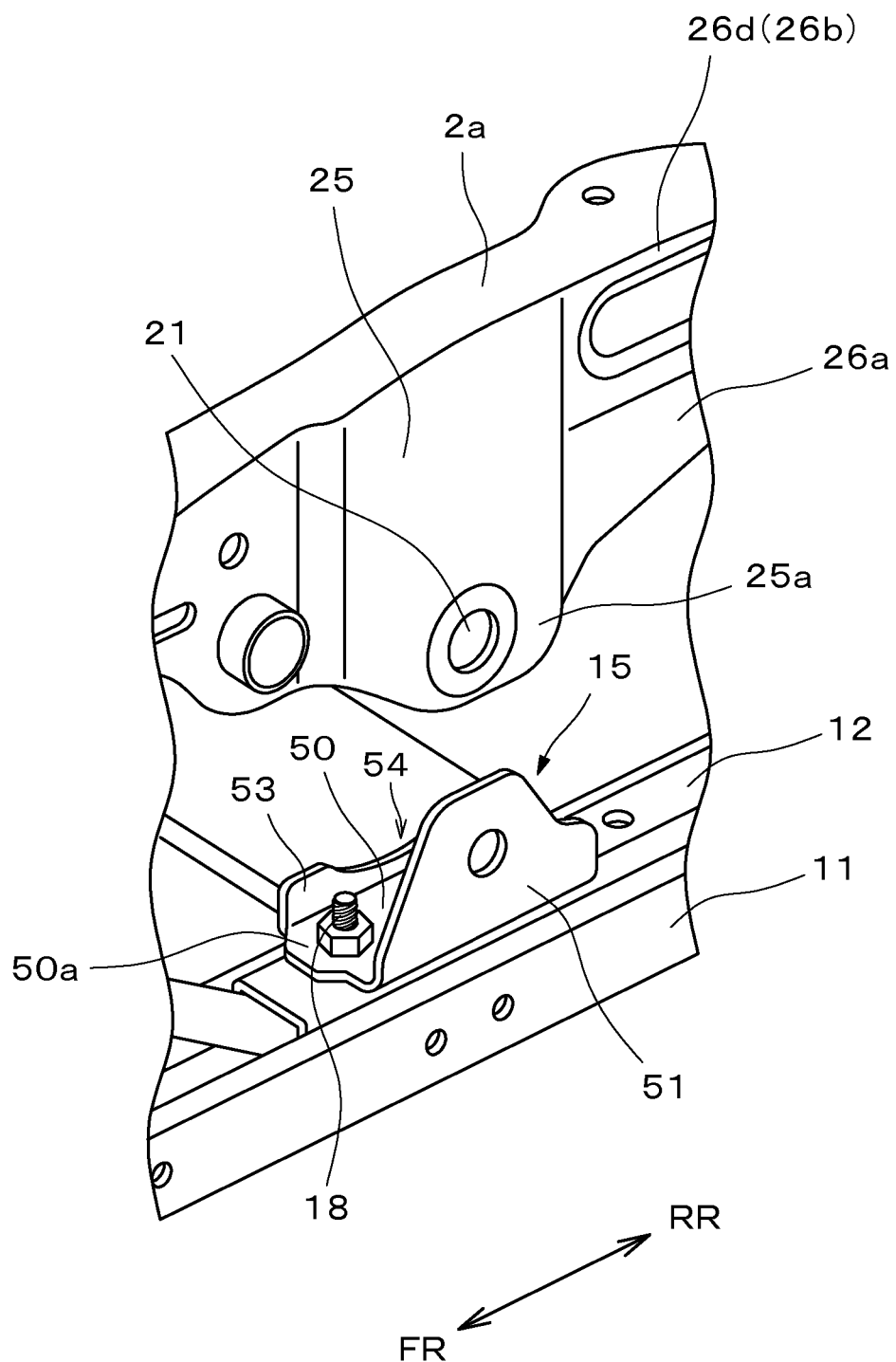
FIG. 9 is a perspective view illustrating a state where an attachment bracket is connected to the side frame.

Further, as illustrated in FIG. 9, the bottom wall portion 50 into which the bolts 18*a* and 18*b* are inserted include an extension portion 50*a* that extends in the front to back direction at the end of the vehicle seat Z in the front to back direction. The extension portion 50*a* is formed to extend to the front or back side of the end of an upright wall portion 51 in the front to back direction. Then, the bolts 18*a* and 18*b* are disposed near the extension portion 50*a*. More specifically, the bolts 18*a* and 18*b* are disposed at the positions adjacent to the extension portion 50*a* in the front to back direction.

In this way, since the bolts 18*a* and 18*b* are disposed at the positions adjacent to the extension portion 50*a*, the bolts 18*a* and 18*b* may be rigidly attached. As a result, the attachment bracket 15 may be rigidly attached to the upper rail 12.

The bolts 18*a* and 18*b* are attached so that the heights of the upper ends thereof are substantially equal to each other as indicated by the dotted line D of FIG. 10. In this way, when the upper ends of the bolts 18*a* and 18*b* are substantially disposed at the same height, an increase in the size of the structure of supporting the sensor 30 may be suppressed. Particularly, in a case where the sensor 30 is assembled to the side frame 2*a* through the attachment bracket 15, the upper ends of the bolts 18*a* and 18*b* may be disposed at the same height in this way.

Further, the bolts 18*a* and 18*b* are disposed at the inside of the width of the front attachment area 25 as the outward protruding portion (the width of the vehicle seat Z in the front to back direction). That is, the bolts 18*a* and 18*b* are disposed so that the distance between the bolts 18*a* and 18*b* is smaller than the distance between the ends of the front attachment area 25 in the front to back direction. In this way, when the distance between the bolts 18*a* and 18*b* is formed to be smaller than the width of the front attachment area 25 in the front to back direction, the space in the periphery of the bolts 18*a* and 18*b* is widened. Accordingly, it is possible to easily fasten the bolts 18*a* and 18*b* or easily check the attachment state of the bolts 18*a* and 18*b*.

In addition, the bolts 18*a* and 18*b* are disposed at the positions that avoid the inverted triangular projection portion 25*a* provided in the lower portion of the front attachment area 25 as the outward protruding portion. More specifically, the bolts 18*a* and 18*b* are disposed at the positions not overlapping the projection portion 25*a* in the seat width direction. Thus, since the interference between the projection portion 25*a* (the side frame 2*a*) and the bolts 18*a* and 18*b* hardly occurs when the bolts 18*a* and 18*b* are fastened, the assembling operation of the vehicle seat Z may be easily performed.

Further, the lower side of the side frame 2*a* is provided with a concave portion 2*ax* as a removal portion that is notched upward so that the bolt 18*a* does not overlap the side frame 2*a*. Since the concave portion 2*ax* is provided by notching a part corresponding to the upper side of the bolt 18*a* in the lower end of the side frame 2*a*, the weight of the side frame 2*a* may be decreased, and the interference between the bolt 18*a* and the side frame 2*a* may be further suppressed. Accordingly, the attachment operation of the vehicle seat Z may be easily performed. Further, since the interference between the bolt 18*a* and the side frame 2*a* does not easily occur, the damage of the bolt 18*a* may be suppressed, and hence the attachment bracket 15 may be stably attached to the upper rail 12. In addition, since the bolt 18*a* is provided at the lower side of the concave portion 2*ax*, the bolt 18*a* may be easily seen.

Furthermore, although the relation between the bolt 18*a* and the concave portion 2*ax* has been described above, the side frame 2*a* may be provided with a concave portion due to the same relation with the bolt 18*b*.

The structure of the attachment bracket 15 will be described. The attachment bracket 15 is provided with an upright wall portion 51 that is uprightly formed at the outer end of the bottom wall portion 50 in the width direction of the vehicle seat Z in the substantially perpendicular direction. In other words, the bottom wall portion 50 is a portion that contacts the upright wall portion 51 at the outer end of the width direction while intersecting the upright wall portion 51 at the attachment bracket 15.

The upright wall portion 51 is formed in a substantially triangular shape, and is formed from the front end of the bottom wall portion 50 to the back end thereof. Further, as illustrated in FIG. 8, a portion corresponding to the apex angle in the substantially triangular upright wall portion 51 is provided with the insertion hole 52 into which the extension shaft portion 31 is inserted when the sensor 30 is supported. The insertion hole 52 is formed as a through-hole that is formed in the thickness direction of the attachment bracket 15, and hence the support state of the sensor 30, that is, the positioned state of the sensor 30 in the width direction of the vehicle seat Z may be checked.

In this way, since the insertion hole 52, into which the extension shaft portion 31 is inserted, is formed in the upright wall portion 51 that extends upward from the downside, the space (in FIG. 10, the space occupied by the oval indicated by the dotted line) for the sensor 30 and the attachment bracket 15 in the front to back direction is easily. Accordingly, the support state of the sensor 30 is easily seen, and hence the operation of supporting the sensor 30 may be easily performed.

As illustrated in FIG. 5, the bolts 18a and 18b are disposed to be separated from each other in the width direction of the vehicle seat Z with respect to the insertion hole 52 formed in the upright wall portion 51 supporting the sensor 30. Further, since the bolts 18a and 18b are disposed to face each other in the front to back direction through the sensor 30 as described above, the space of the periphery of the bolts 18a and 18b may be easily ensured. As a result, since the bolts 18a and 18b do not easily interfere with the upright wall portion 51 and the bolts 18a and 18b do not easily interfere with the sensor 30, the bolts 18a and 18b may be easily fastened.

As illustrated in FIGS. 4 and 5, the upright wall portion 51 is disposed at the outside of the width direction of the vehicle seat Z in relation to the side frame 2a. Then, since the side frame 2a is disposed at the outside of the seat width direction in relation to the center axes (indicated by the dotted line A in FIG. 5) of the bolts 18a and 18b, it is possible to suppress the space at the inside of the seat width direction in the seating frame 2 from being narrowed. Thus, the other members (for example, the S-spring 6 or the harness) may be easily attached to the space at the inside of the seat width direction of the seating frame 2. Further, it is possible to suppress the other members disposed inside the seating frame 2 from interfering with the side frame 2a by the contact therebetween.

Further, the center axes (indicated by the dotted line A of FIG. 5) of the bolts 18a and 18b are disposed at the inside of the width direction of the vehicle seat Z in relation to the side frame 2a, and the upright wall portion 51 is disposed at the outside of the seat width direction in relation to the side frame 2a as described above. Then, as illustrated in FIG. 5, the upright wall portion 51 is disposed at the inside of the seat width direction in relation to the outer end of the lower rail 11 as the rail member in the seat width direction.

When the upright wall portion 51 is disposed with the above-described positional relation, an increase in the size of the seating frame 2 in the width direction of the vehicle seat Z may be suppressed.

In addition, since the bolt 18a is disposed at the inside of the width direction of the vehicle seat Z in relation to the side frame 2a and is disposed at the lower side of the concave portion 2ax, the bolt 18a does not easily interfere with the side frame 2a, and hence the attachment bracket 15 may be stably attached to the upper rail 12. Further, since the bolt 18a is seen through the concave portion 2ax, the workability of the attachment operation of the vehicle seat Z may be improved.

Figure 12:
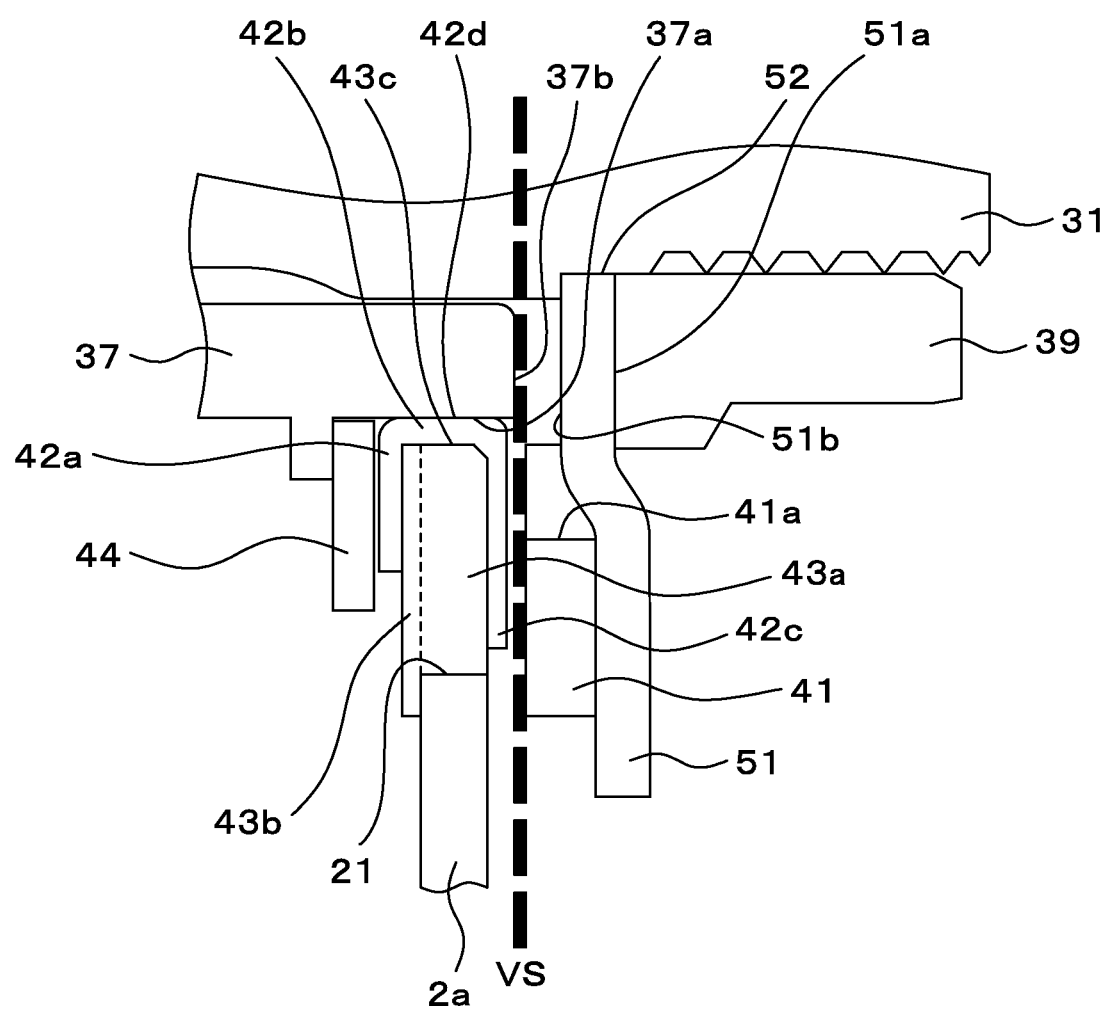
FIG. 12 is an enlarged front view illustrating the periphery of the load measurement sensor in FIG. 5.

Further, as illustrated in FIGS. 5 and 12, the upright wall portion 51 includes a concave portion 51a that is recessed inward in the width direction of the vehicle seat Z at the attachment portion (more specifically, the periphery of the insertion hole 52) while the extension shaft portion 31 is inserted therethrough and a convex portion 51b that protrudes inward in the seat width direction. Furthermore, in the other drawings, the concave portion 51a and the convex portion 51b of the upright wall portion 51 are not depicted for the simplicity.

In the upright wall portion 51, the concave portion 51a is formed to surround at least the insertion hole 52, and the back surface of the concave portion 51a, that is, the inner surface in the width direction of the vehicle seat Z is provided with the convex portion 51b. The convex portion 51b protrudes inward in the seat width direction.

As described above, the concave portion 51a and the convex portion 51b are integrally formed with each other in a manner such that a bulged portion is formed by causing the upright wall portion 51 to be bulged inward in the seat width direction. That is, the concave portion 51a and the convex portion 51b are formed by curving a part of the upright wall portion 51.

In this way, when the concave portion 51a and the convex portion 51b are formed by curving a part of the upright wall portion 51, the rigidity of the upright wall portion 51 is improved. As a result, the upright wall portion 51 may stably support the sensor 30. For this reason, since particularly the sensor 30 is stably supported, the convex portion 51b may be formed at the position where the convex portion overlaps at least a nut 39 as a fastening member threaded into the extension shaft portion in the axial direction of the extension shaft portion 31. Further, when the concave portion 51a is formed in a donut shape to follow the outer diameter of the nut 39, the nut 39 is easily positioned, and the nut 39 may be more stably fastened.

Furthermore, in this embodiment, a configuration has been described in which the concave portion 51a and the convex portion 51b are formed so that the front and back surfaces are integrated with each other, but only the concave portion 51a or only the convex portion 51b may be provided in the upright wall portion 51.

In a case where only the concave portion 51a is formed, the concave portion 51a may be formed by drilling the outer surface of the upright wall portion 51 in the width direction of the vehicle seat Z. In this way, since the upright wall portion 51 is provided with the concave portion 51a, it is possible to decrease the length (the width) of the extension shaft portion 31 that protrudes outward in the seat width direction when the extension shaft portion 31 is inserted outward in the seat width direction. That is, it is possible to shorten the length of the extension shaft portion 31 that extends outward in the seat width direction by the depth of the concave portion 51a. As a result, the sensor 30 may be compactly supported.

In a case where only the convex portion 51b is formed, the convex portion 51b may be formed by thickening the inner surface of the upright wall portion 51 in the width direction of the vehicle seat Z inward in the seat width direction. In this way, since the upright wall portion 51 is provided with the convex portion 51b as the thick portion, the extension shaft portion 31 may be rigidly attached to the convex portion 51b. Thus, the sensor 30 may be stably supported.

Figure 13:
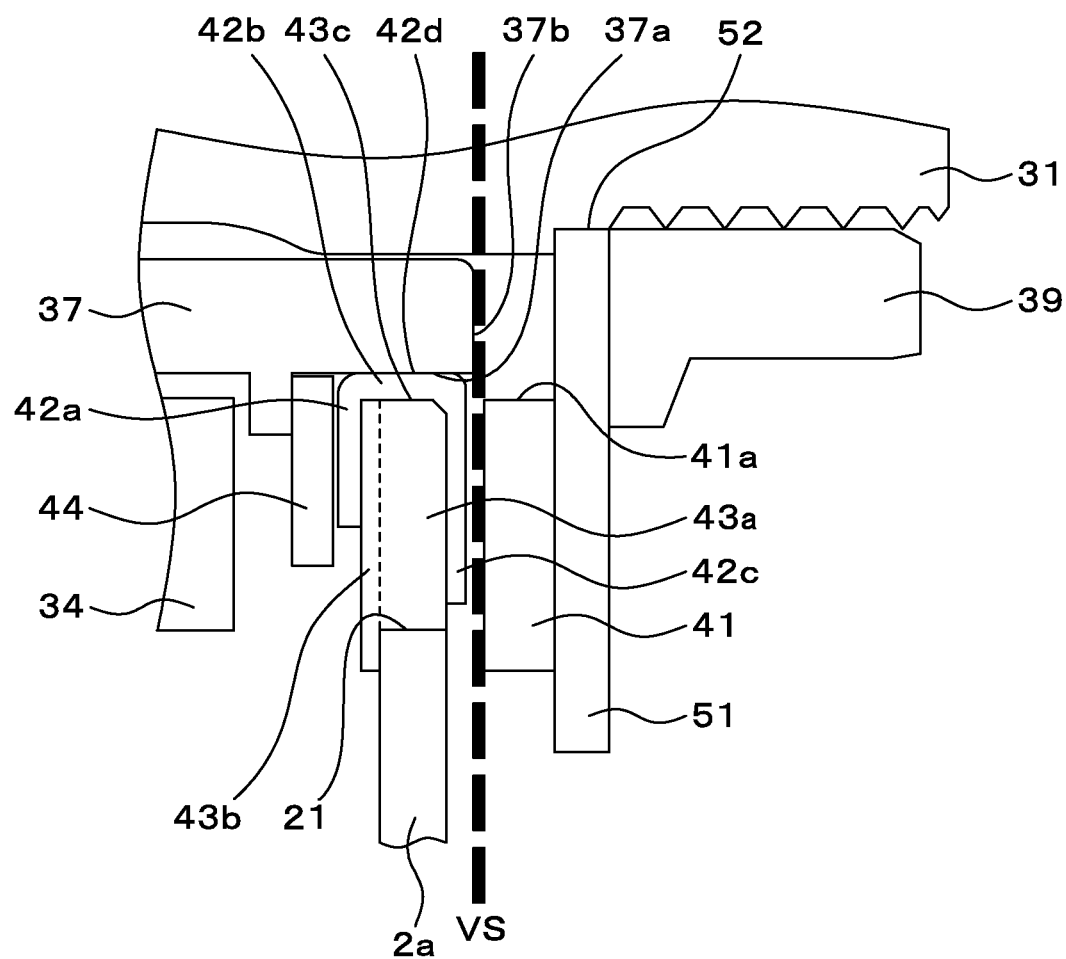
FIG. 13 is an enlarged front view illustrating a modified example of the load measurement sensor support structure.

Further, as illustrated in FIG. 13, a configuration may be employed in which the upright wall portion 51 is not provided with both the concave portion 51a and the convex portion 51b. That is, both outer and inner surfaces of the upright wall portion 51 in the width direction may be formed as a flat surface.

The attachment bracket 15 includes an upward protruding wall 53 that protrudes upward from the inner end of the bottom wall portion 50 in the width direction. As described above, the upward protruding wall 53 is provided at the position where the upward protruding wall contacts the bottom wall portion 50 at the inner end (that is, the other end opposite to one end provided with the upright wall portion 51) in the width direction of the bottom wall portion 50, intersects the bottom wall portion 50, and faces the upright wall portion 51.

As illustrated in FIG. 10, the upward protruding wall 53 is formed to extend upward in the range in which the upward protruding wall does not overlap the projection portion 25a. That is, the upper end of the upward protruding wall 53 may be provided at the lower side of the lower end of the projection portion 25a. With such a configuration, the side frame 2a does not easily interfere with the upward protruding wall 53 of the attachment bracket 15, and hence the attachment operation of the vehicle seat Z may be easily performed.

Since the attachment bracket 15 is provided with the upward protruding wall 53, the rigidity of the attachment bracket 15 is improved. As a result, the support rigidity for the sensor 30 (the rigidity of the portion supporting the sensor 30) is improved, and hence the precision of the load measurement using the sensor 30 may be improved. Furthermore, the upward protruding wall 53 according to this embodiment intersects the bottom wall portion 50 in the substantially perpendicular diction, but the present invention is not limited thereto. For example, the upward protruding wall 53 may be provided to intersect the bottom wall portion 50 while forming an obtuse angle therebetween.

The upward protruding wall 53 is formed (to extend) from the front end of the bottom wall portion 50 toward the back end thereof in the front to back direction of the vehicle seat Z. The upper portion of the portion that is located at the same position as that of the insertion hole 52 in the front to back direction is notched and removed. In this way, the upward protruding wall 53 includes a removal portion 54 that is formed at the same position as that of the insertion hole 52 in the front to back direction.

Next, the characteristic structure of the attachment bracket 16 disposed at the back side will be described.

As illustrated in FIG. 8, the attachment bracket 16 that is disposed at the back side includes an inner flange portion 55 that extends from the upward protruding wall 53 inward in the seat width direction. Since the inner flange portion 55 is provided, the harness that extends from the sensor 30 may be protected by the inner flange portion 55 and the extension direction of the harness may be regulated. Further, the attachment bracket 16 includes a back end protruding wall 56 that is formed at the back end thereof to protrude from the bottom wall portion 50. The back end protruding wall 56 is formed in a manner such that the upright wall portion 51 and the upward protruding wall 53 are integrally formed with each other so that the upright wall portion 51 disposed at the outside of the seat width direction is connected to the upward protruding wall 53 disposed at the inside of the seat width direction.

Since the above-described configuration (specifically, the inner flange portion 55 and the back end protruding wall 56) is provided, the rigidity of the attachment bracket 16 is higher than that of the attachment bracket 15 disposed at the front side in the front to back direction of the seat. Thus, as described above, a large load is applied to the back side of the vehicle seat Z compared to the front side thereof. However, since the high-rigid attachment bracket 16 is disposed, the large load may be received by the attachment bracket 16. Thus, the durability of the seat frame F may be improved.

Further, the vehicle seat Z may be slid in the front to back direction just by the operation of the slide lever 17, but even when the vehicle seat Z is slid to the backmost side, at least a part of the attachment bracket 16 is disposed on the rail member 10 (the lower rail 11). That is, at least a part of the front end of the attachment bracket 16 is disposed on the lower rail 11 even when the back end thereof is disposed at the back side of the back end of the lower rail 11.

In this way, when the vehicle seat Z is slid to the backmost side, a large load may be easily applied particularly to the attachment bracket 16. Since the attachment bracket 16 is formed to have higher rigidity than that of the attachment bracket 15 disposed at the front side, the damage of the attachment bracket caused by the large load may be suppressed as described above.

The attachment bracket 16 is attached onto the upper rail 12 by pins 18c, 18d, and 18e as attachment members. The pins 18c, 18d, and 18e are attached in order of the pins 18c, 18d, and 18e from the front side of the vehicle seat Z. More specifically, the pins 18d and 18e that are disposed at the back side face each other in the front to back direction with the sensor 30 interposed therebetween. Further, the pin 18c is disposed at the front end of the attachment bracket 16. Thus, the attachment bracket 16 is stably attached to the upper rail 12.

Then, the attachment bracket 16 is disposed so that at least one (that is, the pin 18c disposed at the front side) of the pins 18c, 18d, and 18e attached to the attachment bracket 16 is located on the lower rail 11 when the vehicle seat Z is slid to the backmost side. In this way, when at least the pin 18c is disposed on the lower rail 11 in a state where the vehicle seat Z is slid to the backmost side, the attachment bracket 16 is stabilized on the lower rail 11. As a result, the sensor 30 may be stably held.

Furthermore, it is desirable to employ a configuration in which the two front pins 18c and 18d of the pins 18c, 18d, and 18e attached to three positions are disposed to be located on the lower rail 11 when the vehicle seat Z is slid to the backmost side in that the attachment bracket 16 may be more stably attached to the upper rail 12.

The side frame 2a and the attachment brackets 15 and 16 described so far are connected to one another when the sensor 30 is disposed at a predetermined position. More specifically, as illustrated in FIG. 9, the vehicle seat Z is disposed on the pair of rail members 10 so that the side frames 2a are located at the inside of the upright wall portions 51 of the attachment brackets 15 and 16. At this time, the insertion holes 52 formed in the attachment brackets 15 and 16 overlap the hole portions 21 formed in the side frame 2a. More specifically, the insertion hole 52 of the front attachment bracket 15 overlaps the hole portion 21 of the front attachment area 25 of the side frame 2a, and the insertion hole 52 of the back attachment bracket 16 overlaps the hole portion 21 of the back attachment area 23 of the side frame 2a.

In a state where the above-described two holes (the insertion hole 52 and the hole portion 21) overlap each other, the sensors 30 are respectively inserted into the above-described two holes from the extension shaft portions 31. Specifically, the sensor body 32, that is, the annular portion as the load detection unit 37 of the sensor 30 is inserted into the hole portion 21, and the extension shaft portion 31 of the sensor 30 is inserted into the insertion hole 52 through the hole portion 21. Then, the sensor 30 is inserted until the positioning portion 35 of the sensor 30 contacts the inner surface of the upright wall portion 51 of each of the attachment brackets 15 and 16. Accordingly, the sensor 30 is positioned in the width direction of the vehicle seat Z.

Then, at the time point in which the sensor 30 is positioned, the annular portion provided with the load detection unit 37 in the sensor 30 is fitted to the hole portion 21 of the side frame 2a, the male screw portion 31a of the extension shaft portion 31 protrudes outward in relation to the outer surface of the upright wall portion 51 of each of the attachment brackets 15 and 16, and the adjacent portion 31b is fitted to the insertion hole 52 of each of the attachment brackets 15 and 16.

Then, the sensor 30 may be disposed on the same horizontal plane as that of the intersection point (indicated by the black point in FIG. 10) between the edge of the projection portion 25a protruding downward in an inverted triangular shape and the edge of the upright wall portion 51 protruding upward in a substantially trapezoid shape when viewed from one end of the extension shaft portion 31 in the axial direction or when the sensor 30 is viewed as illustrated in FIG. 10. That is, at least a part of the sensor 30 is disposed to overlap the dotted line C in FIG. 10.

Since the sensor 30 is disposed on the same horizontal plane with respect to the overlap point of the respective edges (edge sides) substantially extending in the up to down direction while the downward extending projection portion 25a and the upward protruding upright wall portion 51 overlap each other, the support state of the sensor 30 may be easily seen, and hence the operation of supporting the sensor 30 may be easily performed.

Then, the sensor 30 is inserted into the insertion hole 52 through the hole portion 21 to be positioned thereto, and the nut 39 is threaded into the male screw portion 31a protruding from the outer surface of the upright wall portion 51, so that the sensor 30 is supported at a predetermined support position. In such a state, the sensor 30 takes a posture in which the axial direction of the extension shaft portion 31 follows the horizontal direction (specifically, the width direction of the vehicle seat Z). That is, in this embodiment, the sensor 30 is supported in a cantilevered state (a state where one end is a fixed end with respect to the attachment brackets 15 and 16 and the other end is a free end) in a posture in which the extension shaft portion 31 follows the horizontal direction.

In a case where the sensor 30 is supported in a cantilevered state, the operation of supporting the sensor 30 may be easily performed compared to the case where both ends are fixed. In a case where the sensor 30 is supported in a cantilevered state, there is a need to stabilize the position (the arrangement position) of the sensor 30 for the precise load measurement of the sensor 30. Accordingly, in order to stabilize the position of the sensor 30, each of the attachment brackets 15 and 16 supporting the sensors 30 needs to have sufficient support rigidity. In this embodiment, as described above, the support rigidity of the attachment brackets 15 and 16 is improved by forming the upward protruding wall 53, and hence the sensor 30 may be stably supported.

Furthermore, in this embodiment, the insertion hole 52 is provided at the position deviated from the maximal load position where the largest load is applied in the axial direction of the extension shaft portion 31. Here, the maximal load position is a position that corresponds to the above-described load center point. Accordingly, the sensor 30 is stably supported by each of the attachment brackets 15 and 16.

Then, when the passenger sits on the vehicle seat Z while the sensor 30 is disposed at the above-described position, the load is applied to the load detection unit 37 of the sensor 30 through the side frame 2a. Specifically, the load which is generated when the passenger sits on the vehicle seat Z is a load generated in the downward vertical direction. Then, when the load is generated, the side frame 2a presses the annular portion inserted into the hole portion 21 at the inner peripheral surface of the hole portion 21. Accordingly, the annular portion is deformed to be bent inward in the radial direction, and the magnitude of the load is measured by the load measurement unit 38 based on the deformation amount.

As described above, when the sensor 30 is supported in a posture in which the extension shaft portion 31 follows the horizontal direction, the load measurement may be performed by the sensor 30. In other words, the support position of the sensor 30 indicates the position where the load measurement may be performed by the sensor 30. Specifically, the support position indicates the position of the sensor 30 illustrated in FIG. 8. Furthermore, in this embodiment, the support position is disposed above the first rail member, that is, the lower rail 11 which is near when viewed from the sensor 30.

The structure of supporting the sensor 30 will be further described. The upward protruding wall 53 is provided at the inner end of each of the attachment brackets 15 and 16 in the width direction, and the upward protruding wall 53 is provided with the removal portion 54 which is formed at the same position as that of the insertion hole 52 in the front to back direction of the vehicle seat Z. Then, in this embodiment, as illustrated in FIG. 10, the support position of the sensor 30 matches the formation position of the removal portion 54. With this configuration, in this embodiment, the sensor 30 may be easily supported by each of the attachment brackets 15 and 16.

More specifically, the sensor 30 is inserted into the insertion hole 52 and the hole portion 21 that overlap each other from the inside of each of the attachment brackets 15 and 16, that is, the installation side of the upward protruding wall 53. The removal portion 54 is provided at the same position as that of the sensor 30 in the front to back direction, that is, the same position as a shaft center 31e of the extension shaft portion 31 of the sensor 30. Here, the removal portion 54 is a portion that is formed by removing a part of the upward protruding wall 53 to expose the sensor 30 with respect to the inner space in relation to the upward protruding wall 53 (the space opposite to the upright wall portion 51 when viewed from the upward protruding wall 53 in the width direction of the vehicle seat Z).

Then, since the removal portion 54 is provided, the sensor 30 accesses the hole portion 21 through the removal portion 54 for the attachment. That is, since the upward protruding wall 53 does not exist in the path in which the sensor 30 is moved from the inside of the upward protruding wall 53 toward the attachment position, the operation of supporting the sensor 30 may be smoothly performed. Furthermore, in this embodiment, the removal portion 54 is formed by notching of the upper portion of the portion located at the same position as that of the insertion hole 52 in the front to back direction of the vehicle seat Z in the upward protruding wall 53, but the present invention is not limited thereto. For example, the upward protruding wall 53 may be provided with a through-hole (not illustrated) having a size sufficient for the passage of the sensor 30 when the sensor 30 moves toward the support position.

Here, as illustrated in FIG. 10, a portion which is located directly below the shaft center 31e of the extension shaft portion 31 of the sensor 30 in the removal portion 54 is located at the lowermost side in the removal portion 54. Accordingly, the support position of the sensor 30 may be further shifted downward. Furthermore, in the configuration illustrated in FIG. 10, the circuit board unit 34 is disposed at the lateral side position, and the shape or the formation position of the removal portion 54 are set in response to the arrangement position. Accordingly, the support position of the sensor 30 may be shifted downward in response to the arrangement position of the circuit board unit 34.

Further, the setting positions of the bolts 18a and 18b that fix the attachment brackets 15 and 16 to the upper surface of the upper rail 12 are deviated from the removal portion 54 in the front to back direction. The fastening members (the bolts 18a and 18b) that fix the attachment brackets 15 and 16 are set to the positions (specifically, the positions at the front and back sides of the sensor 30) that avoid the sensor 30 in the front to back direction. Accordingly, the interference between the sensor 30 (precisely, the sensor body 32) and the bolts 18a and 18b is suppressed, and hence the attachment position of the sensor 30 may be further shifted to the lower side. Thus, the vehicle seat Z may be further decreased in size in the up to down direction.

Furthermore, the upward protruding wall 53 is provided at the position facing the bolts 18a and 18b in the front to back direction of the vehicle seat Z. In other words, the upward protruding wall 53 includes front and back areas that interpose the notched removal portion 54, and the areas are adjacent to the bolts 18a and 18b in the width direction of the vehicle seat Z. In this way, since the upward protruding wall 53 is provided at the position facing at least the bolts 18a and 18b, the rigidity (the fastening rigidity) of the portion that is fastened to the upper rail 12 by the bolts 18a and 18b in each of the attachment brackets 15 and 16 is ensured, and hence the attachment brackets 15 and 16 may be appropriately fixed onto the upper rail 12.

Further, when the sensor 30 is attached to the attachment position, the lower end surface of the sensor 30 is located at the lower side of the upper end surfaces (indicated by the dotted line D in FIG. 10) of the bolts 18a and 18b set to the upper surface of the first rail member. Accordingly, the space for supporting the sensor 30 may be decreased, and the vehicle seat Z may be further decreased in size. Furthermore, in order to decrease the size of the vehicle seat Z, at least a part of the sensor 30 instead of the lower end surface of the sensor 30 may be located at the lower side of the upper end surfaces of the bolts 18a and 18b.

Further, in this embodiment, when the insertion hole 52 formed in each of the attachment brackets 15 and 16 overlaps the hole portion 21 formed in the side frame 2a, the substantially triangular upright wall portion 51 provided with the insertion hole 52 overlaps each of the substantially inverted triangular projection portions 23a and 25a provided with the hole portion 21 as illustrated in FIG. 9. As a result, the space in the periphery of the bolts 18a and 18b set to the front side and the back side of the sensor 30 may be easily ensured, and hence the workability is improved. Further, since the upright wall portion 51 is formed in a substantially triangular shape and each of the projection portions 23a and 25a is formed in a substantially inverted triangular shape, the periphery of the coupled portion (specifically, the formation portion of the insertion hole 52 or the hole portion 21) is notched. As a result, the weight may be further decreased and the support state of the sensor 30 may be easily seen.

Furthermore, as described above, the notch as the removal portion 54 is formed at the same position as that of the sensor 30 in the front to back direction of the vehicle seat Z in the upward protruding wall 53 of each of the attachment brackets 15 and 16. As a result, the upright wall portion 51 of each of the attachment brackets 15 and 16 may easily overlap each of the projection portions 23a and 25a of the side frame 2a. That is, since the removal portion 54 is formed by notching the upward protruding wall 53, the sensor 30 may be easily supported and the seat unit S may be easily assembled (the assembly of the vehicle seat Z with respect to the rail member 10).

Sensor Attachment Component

As illustrated in FIG. 5, components (hereinafter, the sensor attachment components 40) that are used to dispose the sensor 30 at the support position for the satisfactory load measurement are provided in the periphery of the sensor 30 supported at the support position, that is, the periphery of the annular portion as the load detection unit 37. Hereinafter, each of the sensor attachment components 40 will be described with reference to FIGS. 11 to 14.

As illustrated in FIG. 12, the sensor attachment components 40 are arranged in parallel in order of a spacer 41, a sliding member 42, a bush 43, and a washer 44 from the outside of the width direction of the vehicle seat Z.

Figure 11:
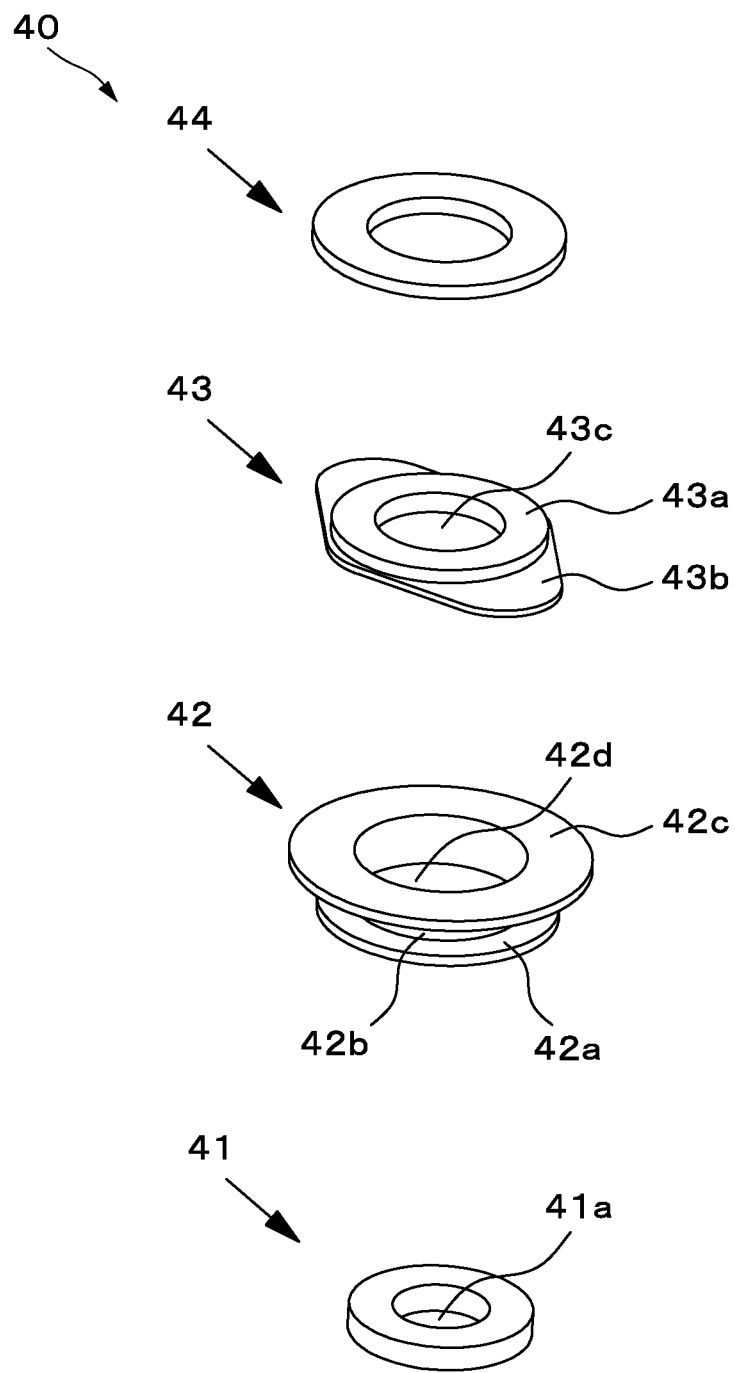
FIG. 11 is an exploded component view illustrating sensor attachment components.

The bush 43 is provided to transmit a load from the seat frame F provided in the vehicle seat Z to the sensor 30. The bush 43 is a member that is made of a hot-rolled steel plate (SPHC), and has a structure in which a cylindrical portion 43a is adjacent to a substantially rhombic flange portion 43b in the thickness direction as illustrated in FIG. 11. That is, the flange portion 43b is formed to extend from one end of the cylindrical portion 43a in the axial direction outward in the radial direction. A through-hole 43c is formed at the center position of the bush 43 to penetrate both the cylindrical portion 43a and the flange portion 43b. The diameter of the through-hole 43c is slightly larger than the outer diameter of the annular portion that is provided as the load detection unit 37 in the sensor 30. The thickness of the cylindrical portion 43a is substantially equal to the thickness of the side frame 2a (specifically, the back attachment area 23 or the front attachment area 25), and the outer diameter thereof is substantially equal to the diameter of the hole portion 21.

Further, the thickness of the flange portion 43b is formed so that the front attachment area 25 (or the back attachment area 23) provided in the side frame 2a becomes smaller than the protruding width in the seat width direction (more specifically, the bulged width toward the outside of the seat width in relation to the connection area 22). Further, the outer diameter of the flange portion 43b is formed in a size in which the outer diameter falls within the range of the front attachment area 25 (or the back attachment area 23) in the front to back direction when the vehicle seat Z is viewed from the lateral side thereof.

With the above-described configuration, the flange portion 43b of the bush 43 is disposed at the inside of the bulged portion of the front attachment area 25 (or the back attachment area 23) when the bush 43 is attached to the side frame 2a. For this reason, there is no need to increase the seat width as a whole for the attachment of the bush 43. As a result, the bush 43 may be compactly attached.

In the bush 43 with the above-described shape, the cylindrical portion 43a is coupled to the side frame 2a by projection-welding while being fitted to the hole portion 21 of the side frame 2a. Then, the sensor 30 is inserted into the through-hole 43c of the bush 43 coupled to the side frame 2a, and the bush 43 is located at the outside of the radial direction of the annular portion provided with the load detection unit 37 of the sensor 30, that is, the portion pressing the sensor body 32 of the sensor 30 in the side frame 2a.

With the above-described configuration, when the annular portion is pressed to transmit the load generated when the passenger sits on the vehicle seat Z, the side frame 2a may press a larger area by the amount corresponding to the thickness of the flange portion 43b of the bush 43. That is, the bush 43 is a load transmission member that is used to widen the pressing area when the side frame 2a presses the annular portion.

Furthermore, in this embodiment, as illustrated in FIG. 14, the bush 43 is coupled to the side frame 2a so that the longitudinal direction of the flange portion 43b as the extension portion extending from the cylindrical portion 43a follows the longitudinal direction of the side frame 2a (in other words, the front to back direction of the vehicle seat Z). Accordingly, it is possible to suppress the space for coupling the bush 43 (specifically, the height of the projection portions 23a and 25a) compared to the case where the bush 43 is coupled so that the longitudinal direction of the flange portion 43b is perpendicular to the longitudinal direction of the side frame 2a.

Further, as illustrated in FIG. 12, the length (the thickness) of the bush 43 in the axial direction of the extension shaft portion 31 is larger than the length of the equal diameter portion 36a in the axial direction. Then, the bush 43 is provided so that both ends of the bush 43 in the axial direction are located at the inside of both ends of the equal diameter portion 36a in the axial direction. With the above-described configuration, even when the pressing range of the side frame 2a is widened by the bush 43, the equal diameter portion 36a receives the load detection unit 37 in the entire widened pressing range. Thus, the more stable load measurement may be performed while obtaining the effect of the bush 43.

Further, at least a part of the flange portion 43b is located at the lower side of the upper surface (indicated by the dotted line D in FIG. 10) of each of the bolts 18a and 18b used to fix the attachment brackets 15 and 16 to the upper surface of the upper rail 12. Accordingly, the space for supporting the sensor 30 may be further decreased in size.

The sliding member 42 is provided to transmit the load from the seat frame F provided in the vehicle seat Z to the sensor 30 while contacting the sensor 30. Further, the sliding member 42 is formed of a resin member having a satisfactory sliding performance so that the sliding member 42 easily slides on the sensor 30 in the axial direction of the extension shaft portion 31 when the load is applied from the side frame 2a.

More specifically, the sliding member 42 is an annular member that is formed of an ethylene resin, and is interposed between the annular portion and the bush 43 in the radial direction of the annular portion provided with the load detection unit 37 (in other words, the radial direction of the extension shaft portion 31). More specifically, the sliding member 42 includes a cylindrical fitting cylinder portion 42b that is fitted to the through-hole 43c of the bush 43, a one-end-side flange portion 42a that is adjacent to one end of the fitting cylinder portion 42b, and the other-end-side flange portion 42c that is adjacent to the other end of the fitting cylinder portion 42b. In a state where the fitting cylinder portion 42b is inserted through the through-hole 43c of the bush 43, the one-end-side flange portion 42a and the other-end-side flange portion 42c interpose the bush 43 therebetween (see FIG. 12). Furthermore, in this embodiment, the one-end-side flange portion 42a has a diameter smaller than that of the other-end-side flange portion 42c. In this way, since the sliding member 42 includes the one-end-side flange portion 42a and the other-end-side flange portion 42c as the flange portions, the rigidity of the sliding member 42 is improved.

Further, the sliding member 42 is provided with a through-hole 42d that penetrates the one-end-side flange portion 42a, the fitting cylinder portion 42b, and the other-end-side flange portion 42c in the thickness direction. The through-hole 42d is slightly larger than the outer diameter of the annular portion provided with the load detection unit 37 in the sensor 30. Then, when the sensor 30 is attached, the annular portion is fitted into the through-hole 42d while a slight gap is formed between the annular portion and the through-hole 42d of the sliding member 42. Furthermore, in this embodiment, the sliding member 42 is attached so that the one-end-side flange portion 42a is distant from the front end of the extension shaft portion 31 in relation to the other-end-side flange portion 42c in the axial direction of the extension shaft portion 31.

The sliding member 42 with the above-described configuration contacts the load detection unit 37 while being interposed between the side frame 2a (precisely, the bush 43) and the load detection unit 37 in the radial direction when the side frame 2a presses the load detection unit 37 of the sensor body 32. For this reason, the sliding member 42 may be called a load input member that finally inputs the load transmitted through the side frame 2a and the bush 43 to the load detection unit 37. That is, the sliding member 42 as the load input member directly presses the load detection unit 37 while contacting the load detection unit 37 when the load transmitted from the side frame 2a is transmitted to the load detection unit 37.

Then, the sliding member 42 is disposed to be separated from the other members (specifically, the spacer 41 and the washer 44) which are adjacent to each other in the thickness direction. That is, since the sliding member 42 is disposed to be separated from the other members in the axial direction of the extension shaft portion 31, the sliding member 42 may move in the axial direction when the load is applied from the side frame 2a. More specifically, when the load detection unit 37 of the sensor 30 is deformed to be bent inward in the radial direction due to the load transmitted from the side frame 2a to the sensor 30, the sliding member 42 slides outward (in other words, toward the attachment brackets 15 and 16) along the annular portion provided with the load detection unit 37 in accordance with the deformation. That is, the sliding member 42 is a movable portion (a movable member) that slides on the outer peripheral surface of the annular portion to follow the deformation of the load detection unit 37.

In this way, since the sliding member 42 slides outward (in other words, toward the extension shaft portion 31), the sensor 30 may receive the load in the vicinity (that is, the fixed portion) of the attachment brackets 15 and 16. As a result, since the load is stably input from the side frame 2a to the sensor 30, the detection precision is improved.

In addition, the sliding member 42 is disposed at the inside of the seat width direction in relation to the positioning portion 35, and is disposed at the position close to the circuit board unit 34 in relation to the outer end of the load detection unit 37 in the seat width direction. That is, the sliding member 42 is disposed at the position close to the circuit board unit 34 in relation to the non-fixed end (the free end) of the load detection unit 37 in the axial direction. With such a configuration, since the sliding member 42 stably contacts the load receiving surface 37a of the sensor 30, the load detection precision may be improved. Further, it is possible to suppress a biased load from being applied to the sliding member 42.

Furthermore, the contact surface of the sliding member 42 with respect to the load detection unit 37 (more specifically, the area facing the load receiving surface 37a in the inner peripheral surface of the through-hole 42d) has a breadth in the axial direction of the extension shaft portion 31. Here, one end of the contact surface in the axial direction is located near one end among one end and the other end of the vehicle seat Z in the width direction along with one end of the equal diameter portion 36a (the regulation portion) in the axial direction. In contrast, the other end of the contact surface in the axial direction is located near the other end among one end and the other end of the vehicle seat Z in the width direction along with the other end of the equal diameter portion 36a in the axial direction.

Then, one end of the contact surface in the axial direction is located at the inside of one end of the equal diameter portion 36a in the axial direction (to be distant from one end of the vehicle seat Z in the width direction). Accordingly, the equal diameter portion 36a as the regulation portion receives the load detection unit 37 when the side frame 2a presses the load detection unit 37 through the sliding member 42, and the equal diameter portion may continuously and stably receive the load detection unit 37 even when the sliding member 42 slides.

Further, the other end of the contact surface in the axial direction is located at the outside of the other end of the equal diameter portion 36a in the axial direction (to be distant from the width direction of the vehicle seat Z the other end). That is, in this embodiment, the contact surface falls within the range in which the equal diameter portion 36a as the regulation portion exists in the width direction of the vehicle seat Z. Accordingly, the load detection unit 37 may appropriately receive the load while being regulated by the equal diameter portion 36a, and hence may accurately detect the load.

The washer 44 is an annular member that is formed by a steel plate (specifically, grade SUS 630). The washer 44 is fitted to the annular portion provided with the load detection unit 37 of the sensor 30 while the sensor 30 is supported at the support position, and is located at the inside of the seat width direction of the sliding member 42 with a slight gap between the washer and the sliding member 42 as illustrated in FIG. 12. That is, the washer 44 is disposed to be adjacent to the sliding member 42 at the inside of the sliding member 42 in the axial direction of the extension shaft portion 31. Further, the washer 44 is located at the outside of the seat width direction of the circuit board unit 34 to be separated from the circuit board unit 34 provided in the sensor 30.

Then, the washer 44 regulates the excessive inward movement of the sliding member 42 (that is, toward the opposite side to the attachment brackets 15 and 16) at the arrangement position. That is, the washer 44 serves as a movement regulation member, and regulates the sliding member 42 from moving inward in relation to the arrangement position of the washer 44.

Further, in this embodiment, as illustrated in FIG. 12, the inner end of the equal diameter portion 36a as the regulation portion (in other words, the end opposite to the attachment brackets 15 and 16 in the axial direction of the extension shaft portion 31) is close to the attachment brackets 15 and 16 in relation to the washer 44 (to be located at the outside). Accordingly, the length of the equal diameter portion 36a (the length in the axial direction) that needs to be ensured to regulate the deformation amount of the load detection unit 37 may be the amount of the movable range of the sliding member 42, that is, the length to the arrangement position of the washer 44, thereby suppressing an increase in the size of the equal diameter portion 36a more than is necessary.

Further, the washer 44 is formed in a size in which the inner peripheral end thereof is located at the inside of the radial direction in relation to the bottom surface of the circuit board unit 34 provided in the sensor 30 and the outer peripheral end thereof is located at the outside of the radial direction in relation to the bottom surface of the circuit board unit 34. That is, the washer 44 is provided to extend to the outside of the bottom surface of the circuit board unit 34 when the sensor 30 is supported by each of the attachment brackets 15 and 16. Thus, the washer 44 that is disposed at the arrangement position is used to suppress an accident in which the sliding member 42 moves inward in the axial direction of the extension shaft portion 31 and interferes with the circuit board unit 34.

Further, the outer diameter of the washer 44 is formed to be larger than the outer diameter of the one-end-side flange portion 42a of the sliding member 42. That is, the washer 44 extends to the outside of the radial direction in relation to the outer diameter of the one-end-side flange portion 42a of the sliding member 42. In this way, the outer diameter of the washer 44 is larger than the outer diameter of the sliding member 42. Thus, even when the sliding member 42 slides in the axial direction, the movement may be reliably prohibited by the washer 44.

Furthermore, in this embodiment, a configuration has been described in which the washer 44 is provided separately from the sensor 30 (the sensor body 32), but for example, the washer may be integrally formed with the annular portion. When the washer 44 is integrally formed, the number of components may be decreased, and hence the time taken for the operation of attaching the sensor 30 may be shortened.

The spacer 41 is a cylindrical member that is formed by a hot-rolled steel plate. As illustrated in FIG. 12, the spacer is disposed in the gap between the sliding member 42 and the upright wall portion 51 of each of the attachment brackets 15 and 16 in a state where the sensor 30 is supported at the support position, and is adjacent to the sliding member 42 in the width direction of the vehicle seat Z with a slight gap therebetween. Further, a circular hole 41a is formed at the center portion of the spacer 41, and the diameter thereof is larger than the diameter of the step portion forming the positioning portion 35 in the sensor 30.

The spacer 41 with the above-described shape is coupled to the inner surface of the upright wall portion 51 of each of the attachment brackets 15 and 16 by projection-welding so that the circular hole 41a and the insertion hole 52 coaxially overlap each other. Then, when the extension shaft portion 31 is inserted into the insertion hole 52 to support the sensor 30, the extension shaft portion 31 is led into the insertion hole 52 through the circular hole 41a of the spacer 41. Further, at the time point in which the positioning portion 35 of the sensor 30 contacts the upright wall portion 51 of each of the attachment brackets 15 and 16 so that the sensor 30 is positioned in the width direction of the vehicle seat Z, the spacer 41 is located at the outside of the positioning portion 35 in the radial direction of the extension shaft portion 31 as illustrated in FIG. 12.

The spacer 41 that is set in this way serves as a stopper that regulates the sliding member 42 from excessively moving outward in the axial direction of the extension shaft portion 31. More specifically, the spacer 41 regulates the sliding member 42 from being separated from the annular portion when the sliding member 42 moves outward in the axial direction of the extension shaft portion 31 from the outside of the annular portion provided with the load detection unit 37 in the radial direction of the extension shaft portion 31.

Furthermore, in this embodiment, the thickness of the spacer 41 is slightly large. Then, when the sensor 30 is inserted into the insertion hole 52 until the positioning portion 35 contacts the upright wall portion 51 of each of the attachment brackets 15 and 16, the inner end of the spacer 41 in the thickness direction (that is, the end of the spacer 41 near the sliding member 42 in the width direction of the vehicle seat Z) reaches the free end of the extension shaft portion 31 in the axial direction (that is, the end of the load detection unit 37 near the spacer 41 in the axial direction of the extension shaft portion 31) of the annular portion provided with the load detection unit 37 of the sensor 30 as illustrated in FIG. 12.

In other words, the inner end of the spacer 41 in the thickness direction and the free end of the annular portion overlap each other on the same virtual plane (indicated by the sign VS in FIG. 12) of which the axial direction of the extension shaft portion 31 is the normal direction. With such a positional relation, it is possible to suppress a biased load from being applied to the free end of the annular portion (the end of the load detection unit 37 near the spacer 41 in the axial direction of the extension shaft portion 31).

Furthermore, as a configuration different from the above-described configuration, the spacer 41 may be disposed to not overlap the end surface (the free end 37b) of the load detection unit 37 of the sensor 30 at the outside of the seat width direction on the virtual plane (indicated by the sign VS in FIG. 12) in the radial direction of the sensor 30 (the direction perpendicular to the axial direction of the extension shaft portion 31) in a state where the sensor 30 is supported by each of the attachment brackets 15 and 16. When the spacer 41 is attached in such a configuration, it is possible to suppress the load detection error due to the interference between the spacer 41 and the load detection unit 37 when the load detection unit 37 is deformed by the load applied thereto.

The spacer 41 is disposed at the position overlapping the front attachment area 25 (or the back attachment area 23) when the vehicle seat Z is viewed from the lateral side thereof. That is, the spacer 41 is provided in the range of the front attachment area 25 (or the back attachment area 23).

With the above-described configuration, since the distance between the side frame 2a (more specifically, the front attachment area 25 and the back attachment area 23) and the upright wall portion 51 of each of the attachment brackets 15 and 16 provided at the outside of the seat width direction in the side frame 2a decreases, the thickness of the spacer 41 does not increase.

Furthermore, in this embodiment, a configuration has been described in which the spacer 41 is provided separately from the sensor 30 or the attachment brackets 15 and 16, but the spacer may be integrally formed with the upright wall portion 51 of each of the attachment brackets 15 and 16. For example, instead of the component constituting the spacer 41, a part of the upright wall portion 51 may be bulged toward the sensor body 32 to form a portion corresponding to the spacer 41 in the upright wall portion 51. In this way, when the spacer 41 is integrally formed, the number of components may be decreased, and hence the time taken for the operation of supporting the sensor 30 may be shortened.

Positional Relation Between Sensor and Vehicle Seat Z

Hereinafter, the support position of the sensor 30 will be described in more detail, and the positional relation between the sensor 30 and the vehicle seat Z (including the sensor attachment components 40) will be described with reference to FIGS. 15 and 16 along with FIG. 5.

As described in the section of the "sensor support structure", the support position of the sensor 30 is located above the first rail member, that is, the lower rail 11 which is closer when viewed from the sensor 30. Then, when the sensor 30 is supported at the support position, the sensor body 32 of the sensor 30 (precisely, the portion located at the inside of the load detection unit 37 in the sensor body 32) is located between the side frames 2a in the width direction of the vehicle seat Z. For example, as illustrated in FIG. 5, the circuit board unit 34 provided in the sensor 30 is located at the inside of the side frame 2a.

Then, in this embodiment, when the sensor 30 is supported at the support position while the vehicle seat Z is placed on the rail member 10, the load receiving portion of the sensor body 32 is disposed at the position far from the second rail member in relation to the center of the first rail member in the width direction of the vehicle seat Z. Here, the load receiving portion is a portion that is formed in the sensor body 32, and is an area that receives the load transmitted from the vehicle seat Z through the side frame 2a. In this embodiment, the load receiving surface 37a corresponds to a load receiving portion.

That is, in this embodiment, as illustrated in FIG. 5, the load receiving surface 37a as the load receiving portion is located at the outside of the center (indicated by the sign A in FIG. 5) of the lower rail 11 as the first rail member in the width direction in a state where the sensor 30 is supported at the support position. With such a positional relation, the sensor 30 does not easily interfere with the seat inner member (the member located between the rail members, for example, the S-spring 6 or the harness (not illustrated)), and hence a decrease in the size of the vehicle seat Z may be satisfactorily realized.

Furthermore, the load receiving surface 37a as the load receiving portion includes a width (a breadth) in the width direction of the vehicle seat Z. Then, in this embodiment, as illustrated in FIG. 5, the outer end of the load receiving surface 37a in the width direction is located at the outside of the center of the lower rail 11 as the first rail member in the width direction. In other words, the end of the load receiving surface 37a located near the first rail member in the width direction is disposed at the position far from the second rail member in relation to the center of the first rail member.

In particular, in this embodiment, the center of the load receiving surface 37a in the width direction is located at the outside of the center of the first rail member (to be disposed at the position far from the second rail member in relation to the center of the first rail member in the width direction). Further, even the inner end of the load receiving surface 37a in the width direction is located at the outside of the center of the first rail member (to be disposed at the position far from the second rail member in relation to the center of the first rail member in the width direction). With the above-described positional relation, it is possible to further effectively exhibit the effect of suppressing the interference between the sensor 30 and the seat inner member.

In addition, in this embodiment, as illustrated in FIG. 5, the sensor body 32 is disposed between both ends of the lower rail 11 in the width direction while the sensor 30 is supported at the support position. That is, when the sensor 30 at the first rail member is supported at the support position, the sensor body 32 is disposed at the position far from the second rail member in relation to the end (indicated by the dotted line B in FIG. 5) of the first rail member near the second rail member in the width direction of the vehicle seat Z. Accordingly, since the sensor 30 further becomes distant from the seat inner member in the width direction of the vehicle seat Z, it is possible to further effectively suppress the interference between the sensor 30 and the seat inner member.

Since the sensor body 32 is disposed between both ends of the lower rail 11 in the width direction, the sensor 30 may be supported by effectively using the space on the lower rail 11, and hence the vehicle seat Z may be further decreased in size.

Further, since the sensor body 32 is disposed between both ends of the lower rail 11 in the width direction, the circuit board unit 34 provided in the sensor body 32 is also disposed between both ends of the lower rail 11 in the width direction. Thus, when the sensor 30 is supported at the support position, the connector portion 34a that is provided in the circuit board unit 34 is disposed at the outside (the position far from the second rail member) in relation to the inner end (the end near the second rail member) of the first rail member in the width direction. Accordingly, since the interference between the connector portion 34a and the seat inner member is suppressed, for example, the harness may be smoothly connected to the connector portion 34a.

Further, in a state where the sensor 30 is supported at the support position, the sensor is located at the outside of the S-spring 6 (the near S-spring among the plurality of S-springs 6 arranged in parallel in the width direction) in the width direction of the vehicle seat Z. In other words, the sensor is distant from the second rail member in relation to the S-spring 6. Accordingly, as described above, the interference between the sensor 30 and the S-spring 6 may be effectively suppressed.

Figure 15:
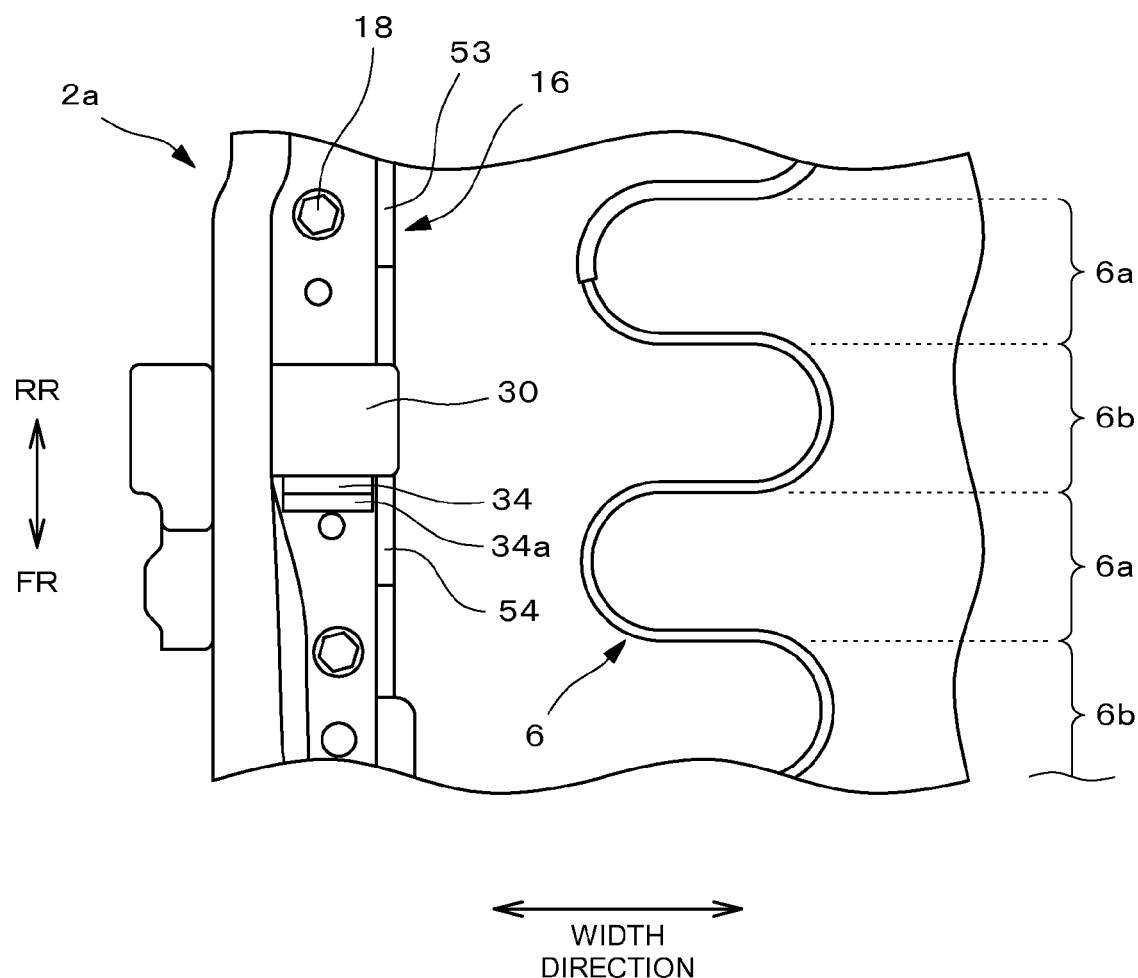
FIG. 15 is a plan view illustrating the positional relation between the load measurement sensor and the S-spring.

In addition, in this embodiment, as illustrated in FIG. 15, the sensor 30 is disposed at the same position as that of a second curved portion 6b among a first curved portion 6a and the second curved portion 6b constituting the S-spring 6 in the front to back direction of the vehicle seat Z for the purpose of further effectively suppressing the interference between the sensor 30 and the S-spring 6. Here, the first curved portion 6a is a portion that is curved to approach the first rail member in the width direction of the vehicle seat Z when viewed from the sensor 30 supported on the first rail member in the S-spring 6. The second curved portion 6b is a portion that is curved to approach the second rail member in the width direction of the vehicle seat Z when viewed from the sensor 30 supported on the first rail member.

With the above-described arrangement, the sensor 30 may be separated from the S-spring 6, and hence the interference between the sensor 30 and the S-spring 6 may be further effectively suppressed. Furthermore, in this embodiment, the attachment position of the sensor 30 and the arrangement position of the S-spring 6 are set to different positions in the up to down direction (the height direction of the vehicle seat Z) in order to further effectively suppress the interference between the sensor 30 and the S-spring 6.

Further, as described above, the sensor 30 may be assembled to the outward protruding area (specifically, the back attachment area 23 and the front attachment area 25 as the outward protruding portions) in the side frame 2a. Accordingly, the position of the sensor 30 may be further shifted to the outside in the width direction of the vehicle seat Z, and hence the interference between the sensor 30 and the seat inner member may be further effectively suppressed.

Figure 16:
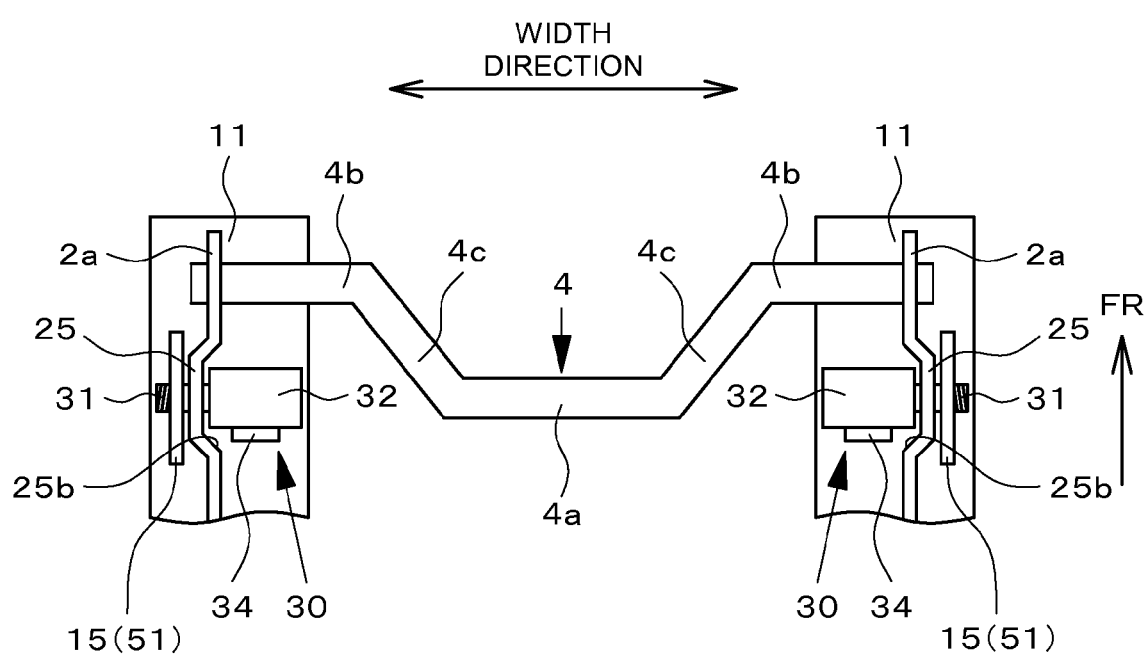
FIG. 16 is a plan view illustrating the positional relation between the load measurement sensor and a submarine restraining pipe.

More specifically, as illustrated in FIG. 16, at least a part of the upright wall portion 51 provided in the attachment bracket 15 is disposed to overlap the front attachment area 25 in the seat width direction. That is, the front protruding area 25 and the upright wall portion 51 are disposed to overlap each other when the vehicle seat Z is viewed from the lateral side thereof. In this way, since a part (the front protruding area 25) of the side frame 2a is bent (bulged) to approach the upright wall portion 51, the distance between the side frame 2a and the attachment bracket 15 (the upright wall portion 51) is shortened, and hence the sensor 30 that is supported while being inserted through the hole portion 21 of the side frame 2a and the insertion hole 52 of the upright wall portion 51 may be compactly supported.

Then, a concave portion 25b is provided at the inner surface in the seat width direction of the front protruding area 25 that is formed to protrude outward in the seat width direction. That is, the front protruding area 25 is a bulged portion that is formed by bending a part of the plate-shaped side frame 2a outward in the seat width direction. Since the sensor 30 is disposed at the inside of the bulged portion, that is, the inside of the concave portion 25b, the sensor 30 is disposed to be shifted outward in the width direction of the vehicle seat Z. In other words, at least a part of the sensor 30 is disposed inside the concave portion 25b of the front protruding area 25 in the width direction of the vehicle seat Z.

Since the sensor 30 is disposed at the outside of the seat width direction as much as possible at the inside of the seat width direction of the seating frame 2 by the above-described configuration, the space in the periphery of the sensor 30 is widened, and hence the interference between the attachment member (for example, the harness or the S-spring 6) and the sensor 30 does not easily occur at the inside of the seat width direction of the seating frame 2.

In this embodiment, when the sensor 30 is supported at the support position while the vehicle seat Z is placed on the first rail member and the second rail member, the sensor 30 is located at the same position as that of the width-direction center portion 4a of the submarine restraining pipe 4 in the front to back direction of the vehicle seat Z while the extension shaft portion 31 follows the vehicle seat width direction as illustrated in FIG. 16.

In other words, when the sensor 30 is attached to the attachment position, the width-direction center portion 4a of the submarine restraining pipe 4 is disposed at the position where the sensor 30 exists in the front to back direction. The width-direction end 4b (the end near the sensor 30) of the submarine restraining pipe 4 is disposed to turn around the front side of the sensor 30 in the front to back direction and follow the extension shaft portion 31. Since the positional relation between the sensor 30 and the submarine restraining pipe 4 satisfies the positional relation, the submarine restraining pipe 4 may be provided while suppressing the interference with the sensor 30.

Furthermore, in this embodiment, the width-direction end 4b of the submarine restraining pipe 4 is caused to turn around the front side of the sensor 30 in the front to back direction of the vehicle seat Z, but the present invention is not limited thereto. For example, the width-direction end 4b of the submarine restraining pipe 4 may be caused to turn around the back side of the sensor 30 in the front to back direction.

Further, as illustrated in FIG. 10, in the submarine restraining pipe 4 as the connection member, a shaft center (a center axis) 4d is disposed at the front side of the shaft center (the center axis) 31e of the extension shaft portion 31, and at least a part of the submarine restraining pipe 4 is disposed to be located at the lower side of the upper end (indicated by the dotted line E in FIG. 10) of the sensor 30. When the shaft center 4d of the submarine restraining pipe 4 is disposed to match the shaft center 31e of the extension shaft portion 31 in the front to back direction of the vehicle seat Z, the submarine restraining pipe 4 is disposed directly above (or directly below) the sensor 30, and hence the submarine restraining pipe 4 and the sensor 30 increase in size in the height direction.

When the shaft center 4d of the submarine restraining pipe 4 is disposed at the front side (or the back side) of the shaft center 31e of the extension shaft portion 31 as described above, it is possible to prevent the submarine restraining pipe 4 from being disposed directly above (or directly below) the extension shaft portion 31, and hence to dispose the submarine restraining pipe 4 and the sensor 30 to partially overlap each other in the height direction. As a result, an increase in the size of the vehicle seat Z in the height direction may be suppressed.

Furthermore, in the description above, the configuration of the submarine restraining pipe 4 has been described. However, the connection pipe 3 that is provided at the back side of the submarine restraining pipe 4 is also disposed at the position where the shaft center thereof does not match the shaft center of the extension shaft portion 31 of the sensor 30 provided at the back side of the vehicle seat Z in the front to back direction. More specifically, the shaft center of the connection pipe 3 is provided at the back side of the extension shaft portion 31, and the connection pipe 3 and the sensor 30 are disposed to partially overlap each other in the height direction. As a result, an increase in the size of the height direction is suppressed.

Further, as illustrated in FIG. 16, the connection portion between the submarine restraining pipe 4 as the connection member and the side frame 2a is formed at the position avoiding the front attachment area 25 on the side frame 2a. That is, the width-direction end 4b of the submarine restraining pipe 4 is connected to the side frame 2a at the portion other than the front attachment area 25. In this way, since the submarine restraining pipe 4 that connects the side frames 2a disposed to be separated from each other in the width direction of the vehicle seat Z is installed between the side frames 2a at the position other than the portion (that is, the front attachment area 25) in which the distance between the side frames 2a increases, an increase in the length of the submarine restraining pipe 4 may be suppressed. Thus, the vehicle seat Z may be decreased in weight.

In addition, since the submarine restraining pipe 4 is installed in the portion in which the distance between the facing side frames 2a is short, the rigidity of the seating frame 2 may be improved.

As illustrated in FIGS. 4 and 16 and the like, the submarine restraining pipe 4 is provided to penetrate the outer surface of the side frame 2a in the width direction of the vehicle seat Z outward in the seat width direction. In this case, the protruding portion of the submarine restraining pipe 4 is formed to fall within the protruding range of the front attachment area 25. That is, the lateral protruding portion of the submarine restraining pipe 4 is formed to be located at the inside of the seat width direction in relation to the outer surface of the front attachment area 25 of the side frame 2a in the seat width direction.

With the above-described configuration, the submarine restraining pipe 4 does not increase in size in the width direction of the vehicle seat Z, and hence the vehicle seat Z may be decreased in weight without being increased in size in the width direction.

Furthermore, in the description above, the configuration of the submarine restraining pipe 4 has been described, but the connection pipe 3 that is provided between the side frames 2a at the back side of the submarine restraining pipe 4 is also disposed at the position avoiding the back attachment area 23, an increase in the length of the connection pipe 3 may be also suppressed, and the rigidity of the seating frame 2 is improved.

Further, as described above, the concave portion 2ax that is notched upward is formed between the connection portion connecting the submarine restraining pipe 4 to the side frame 2a and the portion provided with the sensor 30 (more specifically, between the sensor 30 and the connection portion that connects the submarine restraining pipe 4 to the side frame 2a in the front to back direction of the vehicle seat Z). As described above, the concave portion 2ax is a notched portion that is formed in the side frame 2a, and the side frame 2a may be decreased in weight.

In addition, since the concave portion 2ax that is notched upward is provided, the support state of the sensor 30 provided at the lower side of the side frame 2a may be easily seen from the front to back direction of the vehicle seat. Further, since the submarine restraining pipe 4 is provided near the concave portion 2ax, it is possible to suppress the degradation of the rigidity near the concave portion 2ax in the side frame 2a. That is, since the submarine restraining pipe 4 is connected to the vicinity of the concave portion 2ax, it is possible to suppress the degradation of the rigidity of the side frame 2a caused by the concave portion 2ax that is formed by notching a part of the side frame 2a.

Further, when the sensor 30 is attached to the attachment position, the circuit board unit 34 provided in the sensor 30 is located at the inside of the side frame 2a. That is, the circuit board of the circuit board unit 34 is located at the side opposite to the attachment brackets 15 and 16 in the axial direction of the extension shaft portion 31 when viewed from the side frame 2a. In such a state, the gap between the circuit board and the side frame 2a (in other words, the gap between the circuit board unit 34 and the side frame 2a) becomes larger than the gap between the side frame 2a and each of the attachment brackets 15 and 16. Accordingly, since the contact between the circuit board and the side frame 2a is suppressed and the attachment position of the sensor 30 is further shifted to the outside, the vehicle seat Z may be further decreased in size.

Next, the positional relation between the sensor 30 and the sensor attachment component 40 will be described.

When the sensor 30 is attached to the attachment position, the sliding member 42 is disposed at the inside of the outer end of the load detection unit 37 (that is, the end near the attachment brackets 15 and 16 in the axial direction of the extension shaft portion 31) (in other words, the sliding member is disposed to be more distant from the attachment brackets 15 and 16). That is, in this embodiment, in a state where the sensor 30 is supported at the support position, the sliding member 42 is not hung on the outer end of the load detection unit 37. Thus, it is possible to check the state (the existence of the foreign matter or the like) of the outer end of the load detection unit 37.

Furthermore, as described above, in this embodiment, the inner end of the spacer 41 in the thickness direction reaches the outer end of the load detection unit 37, but in order to easily check the state of the vicinity of the outer end of the load detection unit 37, the inner end of the spacer 41 in the thickness direction may be located at the outside of the outer end of the load detection unit 37.

Further, in a state where the vehicle seat Z is placed on the first rail member (the lower rail 11 at one end side in the width direction) and the second rail member (the lower rail 11 at the other end side in the width direction) and the sensor 30 is supported at the support position, the equal diameter portion 36a as the regulation portion is disposed at the position distant from the second rail member in relation to the center of the first rail member in the width direction. Accordingly, since the sensor 30 (specifically, the load detection unit 37) is further disposed at the outside, the interference between the seat inner member and the sensor 30 may be further effectively suppressed.

Improved Example of Extension Shaft Portion

In the above-described embodiment, the cross-section of the extension shaft portion 31 in the axial direction is formed in a truly circular shape. The sensor 30 is located at a predetermined position of the extension shaft portion 31 in the circumferential direction at the time point in which the sensor 30 is inserted into two overlapping holes (the insertion hole 52 and the hole portion 21) from the extension shaft portion 31 to be positioned in the width direction of the vehicle seat Z in order to support the sensor 30. At the predetermined position, the load detection unit 37 and the load receiving surface 37a are substantially located directly below the side frame 2a in the load transmission direction, and hence the load may be appropriately received.

Incidentally, the adjacent portion 31b of the extension shaft portion 31 is fitted to the insertion hole 52 of each of the attachment brackets 15 and 16 at the time point in which the sensor 30 is positioned in the vehicle seat width direction, but the sensor 30 may rotate about the extension shaft portion 31 relative to the attachment brackets 15 and 16. Then, when the sensor 30 rotates relative to the attachment brackets 15 and 16, the load detection unit 37 and the load receiving surface 37a move in the rotation direction. The variation of the load receiving surface 37a indicates that the direction of the load receiving surface 37a with respect to the load is changed. Accordingly, there is a bad influence on the load measurement precision of the sensor 30.

For this reason, when the extension shaft portion 31 is inserted into the insertion hole 52 formed in each of the attachment brackets 15 and 16 in order to support the sensor 30, there is a need to suppress the relative rotation of the sensor 30 with respect to the attachment brackets 15 and 16 after the attachment. Here, when a local force (contact pressure) is applied to the sensor 30 or each of the attachment brackets 15 and 16 in order to regulate the relative rotation of the sensor 30 with respect to each of the attachment brackets 15 and 16, the extension shaft portion 31 is abraded, and hence there is a concern that the attachment brackets 15 and 16 may be cut out. Then, when such a state is continued, there is a possibility that the relative rotation of the sensor 30 with respect to the attachment brackets 15 and 16 may not be regulated at last.

Figure 17:
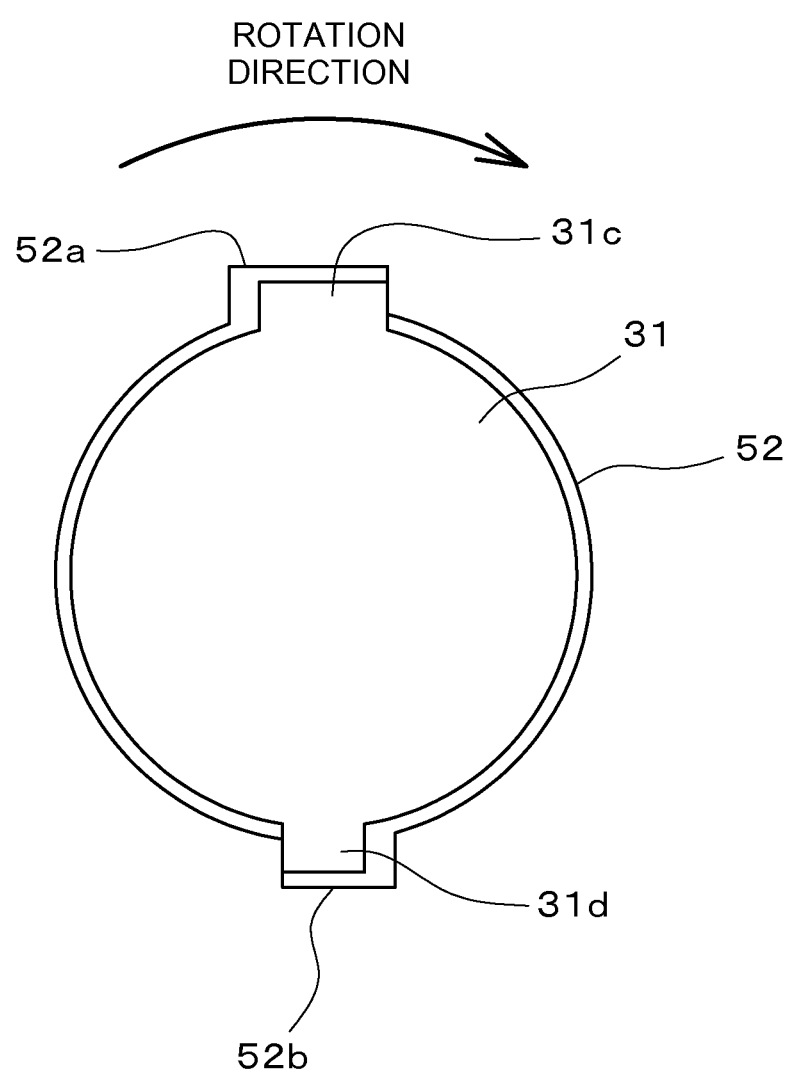
FIG. 17 is a cross-sectional view illustrating an improved example of an extension shaft portion.

Therefore, as a method of suppressing the relative rotation of the sensor 30, a method may be supposed in which the shaft body of the extension shaft portion 31 is provided with a convex portion that protrudes outward in the radial direction from the outer periphery of the shaft body as illustrated in FIG. 17. Here, the shaft body is the portion that excludes the convex portion in the extension shaft portion 31, and in this embodiment, the shaft body is the adjacent portion 31b that is adjacent to the male screw portion 31a.

The method of suppressing the relative rotation of the sensor 30 will be described in detail. A plurality of convex portions are provided at different positions in the shaft body of the extension shaft portion 31 in the circumferential direction of the extension shaft portion 31, and in this embodiment, two convex portions 31c and 31d are provided.

The inner peripheral surface of the insertion hole 52 is provided with concave portions 52a and 52b that respectively correspond to the two convex portions 31c and 31d, and the extension shaft portion 31 is inserted into the insertion hole 52 so that the respective convex portions 31c and 31d engage with the corresponding concave portions 52a and 52b. As a result, when the sensor 30 rotates about the extension shaft portion 31 relative to each of the attachment brackets 15 and 16 in a state where the extension shaft portion 31 is inserted into the insertion hole 52, the convex portions 31c and 31d are locked to the first side surface (that is, the edge surface of the insertion hole 52 of each of the attachment brackets 15 and 16) of the concave portions 52a and 52b formed in the inner peripheral surface of the insertion hole 52. Accordingly, the relative rotation of the sensor 30 is suppressed.

As described above, in this embodiment, the convex portions 31c and 31d are provided to regulate the relative rotation of the sensor 30. However, the present invention is not limited thereto. For example, the convex portions 31c and 31d may be provided to define the position of the sensor 30 in the outer peripheral direction of the shaft body of the extension shaft portion 31 (that is, for the positioning operation).

Furthermore, when the concave portions 52a and 52b are formed to correspond to the convex portions 31c and 31d, the convex portions 31c and 31d come into planar contact with the insertion hole 52 of each of the attachment brackets 15 and 16 when being locked to the edge surface thereof. Accordingly, it is possible to solve the above-described problem in which the extension shaft portion 31 contacts the inner peripheral surface of the insertion hole 52 at the edge thereof so that the extension shaft portion is abraded. Furthermore, in this embodiment, the concave portions 52a and 52b are provided so that the convex portions 31c and 31d come into planar contact with the edge surface of the insertion hole 52 of each of the attachment brackets 15 and 16, but any planar contacting structure may be employed. For example, the planar contact structure may be provided instead of the concave portions 52a and 52b.

Further, at least one of the concave portions 52a and 52b is located at the upper side of the shaft body in a state where the extension shaft portion 31 is inserted into the insertion hole 52. In other words, in this embodiment, the edge surface of the insertion hole 52 of each of the attachment brackets 15 and 16 is provided with the concave portion that may engage with the convex portion while being located at the upper side of the shaft body in a state where the extension shaft portion 31 is inserted into the insertion hole 52. Accordingly, the support state of the sensor 30, that is, the positioned state of the sensor 30 in the width direction of the vehicle seat Z may be easily checked.

Further, in this embodiment, the plurality of (in this embodiment, two) convex portions 31c and 31d are formed at different positions in the outer periphery of the shaft body. Accordingly, the effect of suppressing the relative rotation of the sensor 30 is further effectively exhibited. At this time, it is desirable that the convex portions 31c and 31d be disposed while being deviated at a predetermined interval (in this embodiment, about) 180° in the circumferential direction of the outer periphery of the shaft body.

In addition, in this embodiment, two convex portions 31c and 31d respectively have different shapes (sizes). Accordingly, it is possible to prevent the erroneous assembly of the sensor 30.

Further, in this embodiment, among two convex portions, the convex portion 31c that receives a large load in the circumferential direction of the outer periphery of the shaft body is larger than the convex portion 31d that receives a small load in the circumferential direction. Here, the position that receives a large load in the circumferential direction of the outer periphery of the shaft body indicates the downstream (upstream) position when viewed from the load transmission direction among two different points in the circumferential direction of the outer periphery.

More specifically, the intersection point between the outer periphery of the annular portion provided with the load detection unit 37 of the sensor 30 and the transmission path (the straight path) for the load applied to the load detection unit 37 exists at two points on the outer periphery of the annular portion. Among these, the intersection point (the lower intersection point) located at the lower side is the intersection point that receives a large load, and the convex portion 31c that is formed at the position corresponding to the lower intersection point in the circumferential direction of the outer peripheral surface of the shaft body becomes the convex portion that receives a large load. The intersection point (the upper intersection point) located at the upper side is the intersection point that receives a small load, and the convex portion 31*d* that is formed at the position corresponding to the lower intersection point in the circumferential direction of the outer peripheral surface of the shaft body becomes the convex portion that receives a small load.

In this way, when the convex portion that receives a large load is formed in a large size, the rigidity is further improved. Accordingly, even when a large load is generated, the relative rotation of the sensor 30 may be stably regulated. Furthermore, in order to improve the rigidity of the convex portion that receives a large load, for example, a surface treatment or a coating for improving the rigidity may be performed instead of the method of increasing the size.

Further, in this embodiment, the convex portions 31*c* and 31*d* protrude from the outer periphery of the adjacent portion 31*b* in the extension shaft portion 31, and are connected to the step portion as the positioning portion 35 of the sensor 30. That is, in this embodiment, the step portion is integrally formed with the convex portions 31*c* and 31*d* to be continuous in the axial direction. With such a configuration, in a case where the convex portions 31*c* and 31*d* is formed by processing the shaft body, the convex portions 31*c* and 31*d* may be comparatively easily formed.

In addition, in this embodiment, the length from the center of the extension shaft portion 31 to the front ends of the convex portions 31*c* and 31*d* in the radial direction of the extension shaft portion 31 is equal to or smaller than the outer diameter of the step portion as the positioning portion 35 of the sensor 30, and in this embodiment, the length is smaller than the outer diameter of the step portion. Accordingly, it is possible to suppress the relative rotation of the sensor 30 while easily positioning the sensor 30 using the step portion. Furthermore, the length from the center of the extension shaft portion 31 to the front ends of the convex portions 31*c* and 31*d* may be equal to the outer diameter of the step portion. In this case, although the sensor 30 is not easily positioned by the step portion compared to the case where the length from the center of the extension shaft portion 31 to the front ends of the convex portions 31*c* and 31*d* is smaller than the outer diameter of the step portion, this configuration is excellent from the viewpoint in which the molding process is easily performed or the rigidity is ensured.

Further, it is desirable that the outer diameter of the nut threaded into the male screw portion 31*a* of the extension shaft portion 31 be larger than the diameter of the insertion hole 52 in order to suppress an excessive load from being applied to the convex portions 31*c* and 31*d*.

Another Support Structure

In the above-described embodiment (hereinafter, the present example), the extension shaft portion 31 of the sensor 30 is fastened to each of the attachment brackets 15 and 16 in order to attach the sensor 30. Then, in the present example, a structure is employed in which a load is directly input from the side frame 2*a* disposed at the inside of the width direction in relation to the attachment brackets 15 and 16 to the load detection unit 37 when the load is applied to the vehicle seat Z. Here, a structure other than the structure according to the present example may be considered as the structure of supporting the sensor 30, for example, a structure may be employed in which the extension shaft portion 31 of the sensor 30 is fastened to the side frame 2*a* so that the sensor 30 is supported by the frame 2*a*. In such a structure (hereinafter, the other embodiment), a load is transmitted from a member other than the side frame 2*a* to the load detection unit 37.

Hereinafter, the other embodiment will be described with reference to FIGS. 18 to 25. In FIG. 19, sensor attachment components 70 are not depicted for convenience of the description. Further, FIG. 23 slightly exaggerates the inclination of the load measurement sensor and the like in order to easily describe the state of the load measurement sensor in the event of a load.

Furthermore, in the description below, a configuration of the other embodiment different from that of the present example will be mainly described, and the common configuration will not be repeated. In FIGS. 18 to 25, the same reference numerals or signs will be given to the same constituents as those of the present example.

In the other embodiment, in each of the pair of side frames 2*a* provided in the seat frame F of the vehicle seat Z, each of the front end and the back end thereof is provided with the circular hole portion 21 to which the extension shaft portion 31 of the sensor 30 is fastened. That is, in the other embodiment, each sensor 30 may be assembled to each of the front end and the back end of each side frame 2*a*. In this way, when the sensor 30 is attached to the side frame 2*a* that has comparatively high rigidity in the seat frame F, the attachment rigidity with respect to the sensor 30 is improved, and hence the sensor 30 may be stably supported at a predetermined position.

Further, as illustrated in FIG. 19, a front sensor receiving bracket 65 is fixed to the front end of the upper end surface of the upper rail 12 by a bolt and a nut, and a back sensor receiving bracket 66 is fixed to the back end thereof by a bolt and a nut. Each of the sensor receiving brackets 65 and 66 is provided with an insertion hole 62, and the extension shaft portion 31 of the sensor 30 is inserted into the insertion hole 62. Then, when the extension shaft portion 31 of the sensor 30 is inserted into the insertion hole 62, the sensor 30 is supported by each of the sensor receiving brackets 65 and 66. That is, in the other embodiment, the sensor receiving brackets 65 and 66 correspond to the support brackets.

Then, in a state where the insertion hole 62 formed in each of the sensor receiving brackets 65 and 66 overlaps the hole portion 21 formed in the side frame 2*a*, when the extension shaft portion 31 of the sensor 30 is inserted through both holes, each of the sensor receiving brackets 65 and 66 is connected to the side frame 2*a* through the extension shaft portion 31 of the sensor 30. At this time, as illustrated in FIGS. 18 and 19, the pair of side frames 2*a* is located at the outside of the width direction in relation to the sensor receiving brackets 65 and 66, and the sensor body 32 of the sensor 30 is located at the inside of the sensor receiving brackets 65 and 66.

Figure 18:
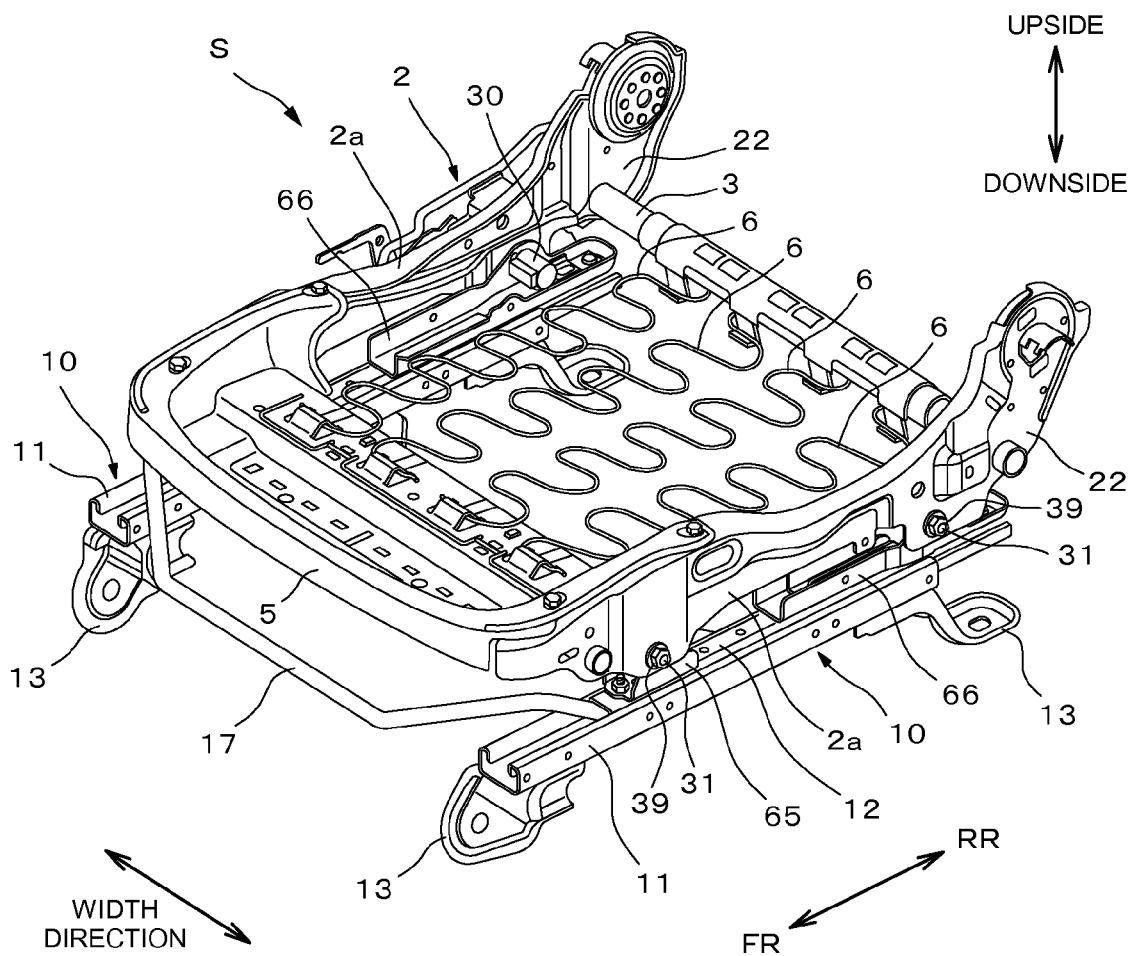
FIG. 18 is a perspective view illustrating a seat unit according to the other embodiment.
Figure 19:
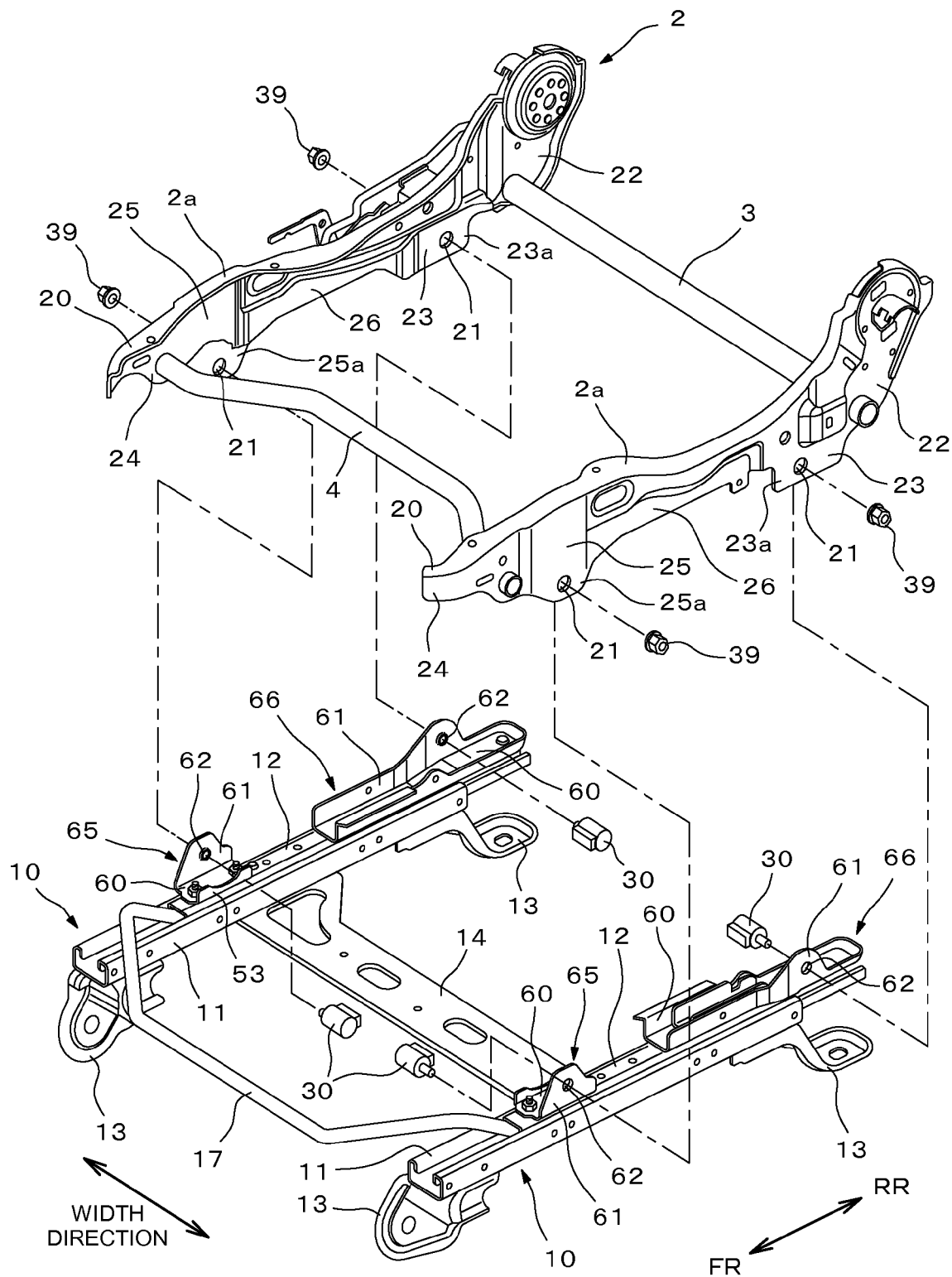
FIG. 19 is an exploded development view of a seat unit according to the other embodiment.

Furthermore, in the configuration illustrated in FIGS. 18 and 19, the sensor receiving brackets 65 and 66 are fixed to the upper surface of the upper rail 12, but the sensor receiving brackets 65 and 66 may be attached to the side surface of the upper rail 12. Such a configuration is very desirable in that an increase in the size of the seat unit S in the up to down direction is suppressed. More desirably, a sensor receiving bracket which is integrated from the front end of the side surface of the upper rail 12 to the back end thereof may be provided by integrating the sensor receiving brackets 65 and 66 in a connected state. In such a configuration, the support rigidity with respect to the sensor receiving bracket is improved. Further, when the sensor receiving brackets 65 and 66 are disposed in the space between the lower rail 11 and the upper rail 12 in the width direction, an increase in the size of the seat unit S in the width direction may be suppressed.

The sensor body 32 of the sensor 30 according to the other embodiment includes the load detection unit 37 that is deformed to detect the load. As in the present example, the load detection unit 37 is a portion that corresponds to a deformation portion and is deformed in response to the magnitude of the load applied to the vehicle seat Z. Specifically, the load detection unit is an annular portion that is located at the opening-end-side end of the outer cylinder body forming the sensor body 32. The end near the free end in the annular portion is inserted into the insertion hole 62 formed in the upright wall portion 61 of each of the sensor receiving brackets 65 and 66 while the sensor 30 is fixed and supported to the side frame 2a.

Then, when a load is generated by the operation in which the passenger sits on the vehicle seat Z, the free-end-side end of the annular portion is deformed to be strained inward in the radial direction of the annular portion while the upper portion of the outer peripheral surface thereof is pressed against the sensor receiving brackets 65 and 66. That is, even in the other embodiment, the upper portion of the outer peripheral surface of the annular portion as the load detection unit 37 corresponds to the load receiving surface 37a as in the present example.

Figure 20:
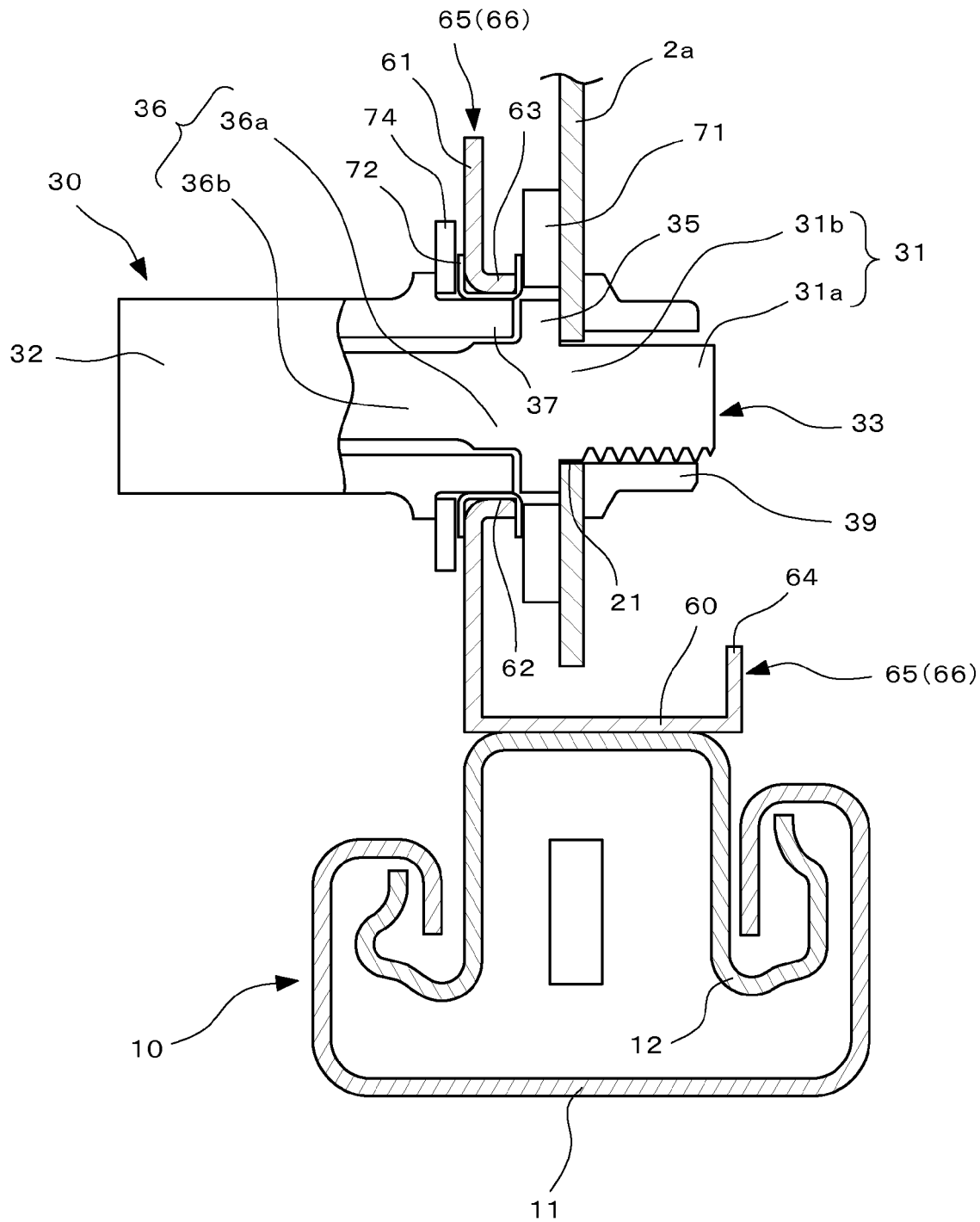
FIG. 20 is a cut-out view illustrating a load measurement sensor support structure according to the other embodiment.

In the other embodiment, as illustrated in FIG. 20, the sensor 30 is fixed to the side frame 2a while being supported by each of the sensor receiving brackets 65 and 66 so that the extension shaft portion 31 is located at the lateral side of the sensor body 32. More specifically, as described above, the hole portion 21 formed in the side frame 2a overlaps the insertion hole 62 formed in each of the sensor receiving brackets 65 and 66, and the extension shaft portion 31 of the sensor 30 is inserted into both holes from the inside of each of the sensor receiving brackets 65 and 66. Accordingly, the free-end-side end of the annular portion of the sensor 30 is loosely inserted into the insertion hole 62 of each of the sensor receiving brackets 65 and 66.

At this time, the male screw portion 31a as the front end of the extension shaft portion 31 protrudes from the insertion hole 62, and is inserted into the hole portion 21 of the side frame 2a. The male screw portion 31a that protrudes from the insertion hole 62 protrudes from the hole portion 21 toward the outside of the side frame 2a, and the nut 39 is threaded into the portion that protrudes toward the outside of the side frame 2a. In this way, the male screw portion 31a is fastened to the side frame 2a, so that the sensor 30 is fixed and supported by the side frame 2a. Then, the sensor 30 takes a posture in which the axial direction of the extension shaft portion 31 follows the horizontal direction, that is, the width direction of the vehicle seat Z. Furthermore, the sensor 30 that is supported by each of the sensor receiving brackets 65 and 66 is held in a cantilevered state, that is, a state where the opposite side to the extension shaft portion 31 becomes a free end.

When the passenger sits on the vehicle seat Z to which the sensor 30 is attached as described above, the load generated at that time (indicated by the arrow of the sign F in FIG. 23) is transmitted to the load detection unit 37 through the side frame 2a and the sensor receiving brackets 65 and 66. More specifically, when the passenger sits on the vehicle seat Z, the side frame 2a presses down the upper end of the adjacent portion 31b of the extension shaft portion 31 at the inner peripheral surface of the hole portion 21 due to the load. The pressing force corresponds to the load that is generated when the passenger sits on the vehicle seat Z. For this reason, a portion provided with the hole portion 21 in the side frame 2a corresponds to a load input portion, and inputs the load to the sensor 30 while contacting a portion different from the load receiving surface 37a in the sensor 30.

Figure 23:
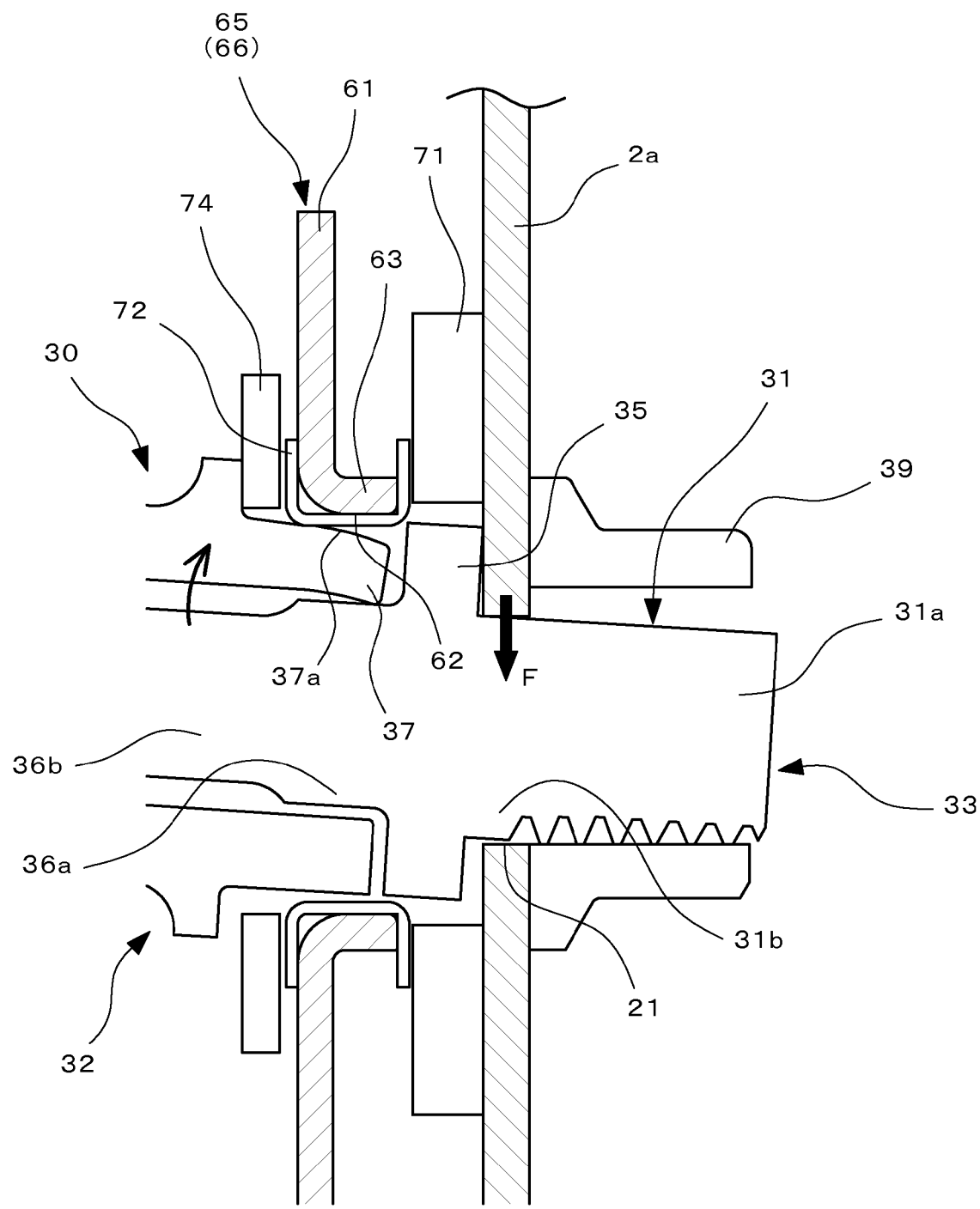
FIG. 23 is a partially enlarged front view illustrating the state of a load measurement sensor and the periphery thereof in the event of a load.

When there is an input of the pressing force from the side frame 2a, that is, the load generated when the passenger sits on the vehicle seat Z, the sensor 30 rotates about a predetermined position due to the rotation moment generated by the load input from the side frame 2a as illustrated in FIG. 23. In accordance with such a rotation, the annular portion of the sensor body 32 provided with the load receiving surface 37a is pressed against each of the sensor receiving brackets 65 and 66, that is, the inner peripheral surface of the insertion hole 62 formed in the upright wall portion 61 through a sliding member 72. For this reason, in the upright wall portion 61 of each of the sensor receiving brackets 65 and 66, the portion provided with the insertion hole 62 forms a sensor body receiving portion against which the sensor body 32 is pressed with the rotation of the sensor 30. In other words, in the other embodiment, the sensor body receiving portion includes the sensor receiving brackets 65 and 66 as constituents.

Then, when the load receiving surface 37a formed in the upper portion of the outer peripheral surface of the annular portion is pressed against the upright wall portion 61 of each of the sensor receiving brackets 65 and 66, the free-end-side end of the annular portion is strained to collapse inward in the radial direction due to the reaction force as illustrated in FIG. 23.

As described above, in the other embodiment, when the passenger sits on the vehicle seat Z, the load generated at this time is first input from the side frame 2a to the extension shaft portion 31 of the sensor 30, and hence the sensor 30 is rotated by the input load. With the rotation, the upper portion of the outer peripheral surface of the annular portion as the load detection unit 37 is pressed against the upright wall portion 61 of each of the sensor receiving brackets 65 and 66. Finally, the free-end-side end of the annular portion is deformed to be strained inward in the radial direction. In this way, in the other embodiment, the load applied to the vehicle seat Z is transmitted to the side frame 2a and the sensor receiving brackets 65 and 66, and is further transmitted to the annular portion by the rotation of the sensor 30.

Furthermore, the equal diameter portion 36a of the accommodation shaft portion 36 is disposed at the inside of the radial direction of the annular portion. For this reason, when the strain amount in which the free-end-side end of the annular portion is strained inward in the radial direction by the load reaches a predetermined amount the equal diameter portion 36a contacts the annular portion. That is, as in the present example, even in the other embodiment, when the annular portion is deformed to be strained inward in the radial direction, the equal diameter portion 36a contacts the annular portion to regulate the further strained deformation of the annular portion.

More specifically, in the equal diameter portion 36a, an area that contacts the annular portion when the annular portion is strained inward in the radial direction has a constant breadth in the axial direction of the extension shaft portion 31. Such an area suppresses the excessive deformation of the annular portion due to a biased load or the like, so that the sensor 30 may stably perform the load measurement. Furthermore, the equal diameter portion 36a exists in the range pressed against the sensor receiving brackets 65 and 66 in the annular portion. Thus, the equal diameter portion 36a receives the annular portion in the entire range in which the sensor receiving brackets 65 and 66 is pressed. As a result, in this embodiment, the more stable load measurement may be performed.

Further, in the equal diameter portion 36a, areas located at both sides of an area that regulates the deformation of the annular portion serve as foreign matter intrusion suppressing portions that suppress the foreign matter from intruding between the annular portion and the accommodation shaft portion 36. In this way, in the other embodiment, since the regulation portion that regulates the excessive deformation of the annular portion and the foreign matter intrusion suppressing portion that suppresses the intrusion of the foreign matter between the annular portion and the accommodation shaft portion 36 are formed in one member, the number of components decreases compared to the case where the regulation portion and the foreign matter intrusion suppressing portion are respectively formed as separate members.

Next, the structure of supporting the sensor 30 according to the other embodiment will be described. Furthermore, since the vehicle seat Z substantially has a bilaterally symmetrical shape, only the configuration at one end side of the width direction of the vehicle seat Z will be described below.

As illustrated in FIG. 23, the sensor 30 is supported to connect the side frame 2*a* to each of the sensor receiving brackets 65 and 66. That is, the sensor 30 is supported to get astride of the side frame 2*a* and each of the sensor receiving brackets 65 and 66.

The side frame 2*a* is provided with the circular hole portion 21, and the adjacent portion 31*b* of the extension shaft portion 31 of the sensor 30 is loosely inserted into the hole portion 21.

The sensor receiving brackets 65 and 66 are provided separately from the upper rail 12, extend in the front to back direction of the vehicle seat Z, and are removably fixed to the upper surface of the upper rail 12 by bolts. Since the sensor receiving brackets 65 and 66 are formed separately from the upper rail 12, the sensor 30 may be attached even when the seat design is changed. Likewise, the general versatility of the structure of supporting the sensor 30 is improved, and the maintenance workability is also improved. Here, the sensor receiving brackets 65 and 66 may be integrated with the lower rail 11 or the upper rail 12. In other words, the sensor receiving brackets 65 and 66 may constitute at least a part of the rail member. With such a configuration, since a part of the rail member having comparatively high rigidity is used as the sensor receiving brackets 65 and 66, the rigidity of the sensor receiving brackets 65 and 66 is ensured. As a result, the annular portion of the sensor body 32 as the load detection unit 37 may be stably pressed against the sensor receiving brackets 65 and 66.

Further, in the other embodiment, the front sensor receiving bracket 65 is provided at the front end of the upper rail 12, and the back sensor receiving bracket 66 is provided at the back end of the upper rail 12. In this way, since two sensor receiving brackets 65 and 66 are separated from each other in the front to back direction of the vehicle seat Z, the arrangement of the sensor receiving brackets 65 and 66 may be individually adjusted, and hence the bracket position adjustment precision is improved. However, the present invention is not limited thereto. For example, a configuration may be employed in which the sensor receiving bracket is integrated without being divided as the front and back brackets, a configuration may be employed in which the front sensor receiving brackets 65 are connected to each other and the back sensor receiving brackets 66 are connected to each other, and a configuration may be employed in which the above-described configurations are combined with each other. With such a configuration, the rigidity of the sensor receiving brackets 65 and 66 is improved.

Here, the length of the front sensor receiving bracket 65 is different from the length of the back sensor receiving bracket 66 in the front to back direction. However, since the basic structures thereof are substantially the same, only the structure of the front sensor receiving bracket 65 will be selectively described below.

As illustrated in FIG. 19, the sensor receiving bracket 65 includes a bottom wall portion 60 that is placed on the upper surface of the upper rail 12, an upright wall portion 61 that is uprightly formed at the outer end of the bottom wall portion 60 in the width direction in the substantially perpendicular direction, and an upward protruding wall 64 that contacts the bottom wall portion 60 at the inner end of the bottom wall portion 60 in the width direction (the end opposite to the upright wall portion 61 in the width direction). The upward protruding wall 64 is provided at the position intersecting the bottom wall portion 60 and facing the upright wall portion 61. Since the upward protruding wall 64 is formed, the support rigidity for the sensor 30 by the sensor receiving bracket 65 (the rigidity of the portion supporting the sensor 30) is improved, and hence the precision of the load measurement using the sensor 30 may be improved.

Further, as described above, the upright wall portion 61 is provided with the insertion hole 62, and the annular portion provided as the load detection unit 37 in the sensor 30 is loosely inserted into the insertion hole 62. Furthermore, as illustrated in FIG. 20, burring is performed on the outer edge of the insertion hole 62 in the upright wall portion 61. Accordingly, the outer edge of the insertion hole 62 in the upright wall portion 61 is bent in a ring shape to form an annular portion 63. The annular portion 63 is a portion that slightly protrudes outward in the width direction, that is, toward the near side frame 2*a* in a state where the insertion hole 62 is formed at the inside of the upright wall portion 61. Since the annular portion 63 is formed, the length of the insertion hole 62 in the width direction is longer than that of the annular portion 63.

Figure 22:
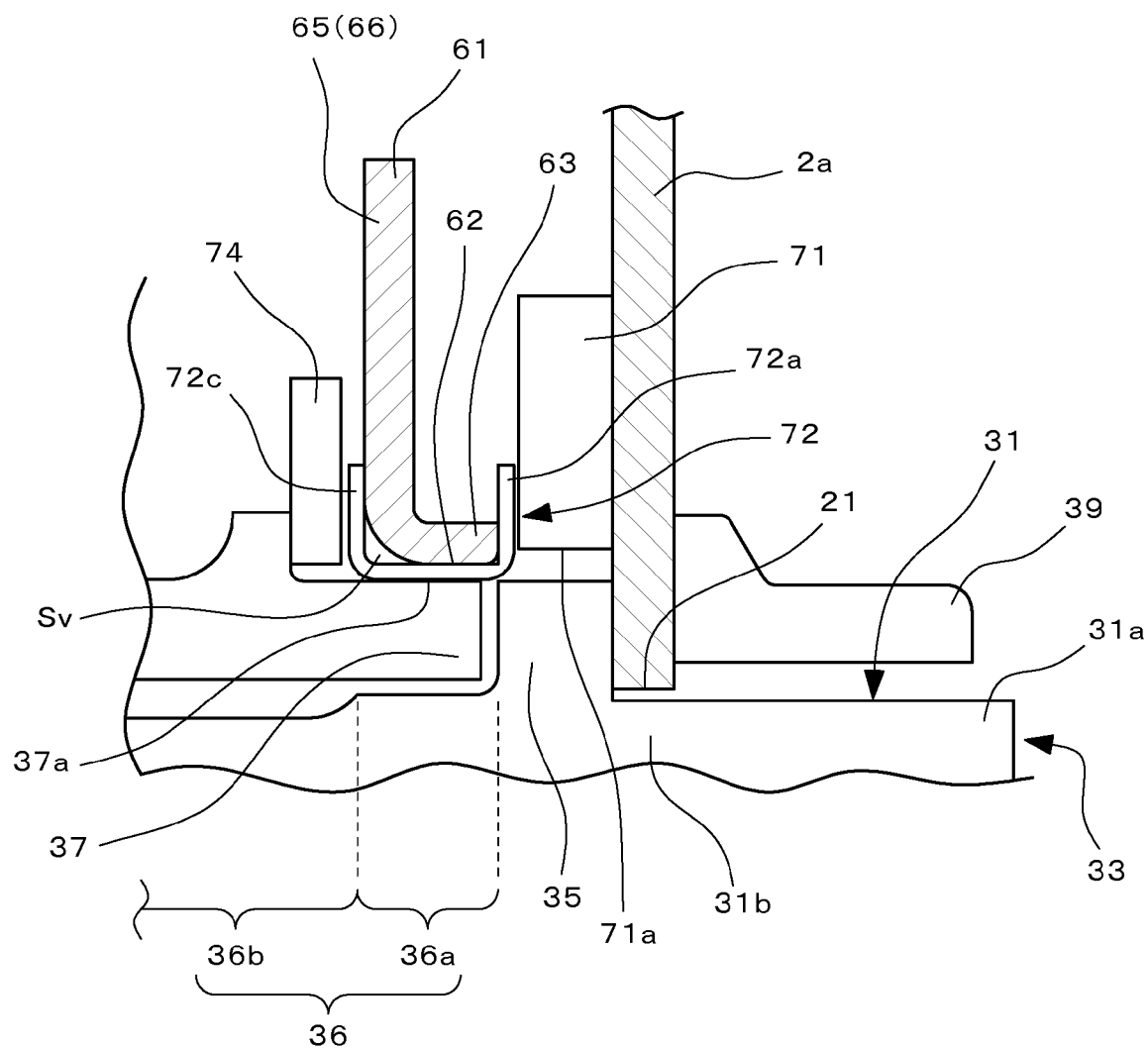
FIG. 22 is a partially enlarged front view of a load measurement sensor support structure according to the other embodiment.

Further, in this embodiment, a portion that is bent to form the annular portion 63 in the upright wall portion 61 is bent in an R-shape as illustrated in FIG. 22. That is, in the upright wall portion 61, the opening edge of the insertion hole 62 located at the opposite side to the annular portion 63 is rounded by chamfering.

Further, in the upright wall portion 61, a portion located at the lower side of the insertion hole 62 substantially extends straightly in the up to down direction toward the vehicle body floor, that is, the downside. Accordingly, since the upright wall portion 61 is widened in the width direction, an increase in the size of the vehicle seat Z may be suppressed.

Then, the insertion hole 62 formed in each of the sensor receiving brackets 65 and 66 overlaps the hole portion 21 formed in the side frame 2*a* to communicate with each other, and the extension shaft portion 31 of the sensor 30 is inserted into the two overlapping holes from the inside of the upright wall portion 61 of each of the sensor receiving brackets 65 and 66. At this time, the sensor 30 is inserted until the positioning portion 35 provided in the sensor body 32 contacts the inner surface of the upright wall portion 61. Accordingly, the sensor 30 is positioned in the width direction.

When the sensor 30 is positioned, the annular portion as the load detection unit 37 of the sensor body 32 is loosely inserted into the insertion hole 62 formed in the upright wall portion 61 of each of the sensor receiving brackets 65 and 66. Also, the male screw portion 31*a* of the extension shaft portion 31 protrudes from the insertion hole 62 and is inserted into the hole portion 21 of the side frame 2*a* to protrude outward from the hole portion 21. At this time, the adjacent portion 31*b* of the extension shaft portion 31 is fitted to the hole portion 21. Then, the nut 39 is threaded into the male screw portion 31*a* protruding from the hole portion 21 of the side frame 2*a*, and the extension shaft portion 31 is fastened to the side frame 2*a*. By the above-described procedure, the sensor 30 is supported by each of the sensor receiving brackets 65 and 66.

When the sensor 30 is supported by each of the sensor receiving brackets 65 and 66, the sensor 30 is interposed between the portion provided with the hole portion 21 of the side frame 2*a* and the portion provided with the insertion hole 62 of each of the sensor receiving brackets 65 and 66. Here, as described above, the portion provided with the hole portion 21 of the side frame 2a corresponds to a load input portion that inputs a load to the sensor 30. Further, as described above, the portion provided with the insertion hole 62 of each of the sensor receiving brackets 65 and 66 forms the sensor body receiving portion that is pressed against the annular portion of the sensor body 32 when the sensor 30 is rotated by the load. That is, in the other embodiment, the load input portion and the sensor body receiving portion are separated from each other in the axial direction of the extension shaft portion 31 in a state where the sensor 30 is supported by each of the sensor receiving brackets 65 and 66.

As described above, when the load input portion and the sensor body receiving portion are separated from each other in the axial direction of the extension shaft portion 31, the sensor 30 is rotated by the load input from the load input portion to the sensor 30. In accordance with the rotation of the sensor 30, the free-end-side end of the annular portion of the sensor body 32 is pressed against the sensor body receiving portion through the sliding member 72, so that the free-end-side end of the annular portion is deformed to be strained inward in the radial direction. That is, the load input from the load input portion is appropriately transmitted to the annular portion in a manner such that the annular portion moves to the position where the annular portion is pressed against the sensor body receiving portion with the rotation of the sensor 30. At this time, even when the load input from the load input portion is minute, the load is appropriately transmitted from the load input portion to the annular portion by the principle of the lever.

Due to the above-described action, in this embodiment, the load input from the load input portion may be appropriately transmitted to the load detection unit 37, so that the load may be accurately detected and measured.

Furthermore, in a state where the sensor 30 is supported by each of the sensor receiving brackets 65 and 66, the portion provided with the hole portion 21 of the side frame 2a is located at the opposite side to the sensor 30 supported by each of the sensor receiving brackets 65 and 66 when viewed from the near sensor receiving brackets 65 and 66. That is, in the other embodiment, the load input portion is located at the opposite side to the sensor body 32 in the axial direction of the extension shaft portion 31 when viewed from the sensor body receiving portion. With such a positional relation, the load input portion is separated from the sensor body 32. For this reason, even when an excessive load is input from the load input portion, the excessive load is not directly exerted on the sensor body 32, and hence the sensor body 32 may be protected.

Further, as described above, when the sensor 30 is rotated by the load generated when the passenger sits on the vehicle seat Z, the annular portion of the sensor body 32 is pressed against the inner peripheral surface of the insertion hole 62 formed in the upright wall portion 61 of each of the sensor receiving brackets 65 and 66 through the sliding member 42 to be described later. Here, in this embodiment, the annular portion 63 is formed in the portion provided with the insertion hole 62 in the upright wall portion 61 by burring. That is, in this embodiment, the area of the inner peripheral surface of the insertion hole 62 is widened by the area of the annular portion 63. Accordingly, the annular portion is easily pressed against the inner peripheral surface of the insertion hole 62, so that the load is easily transmitted to the deformation portion. That is, the annular portion 63 is a portion that is formed to widen the area in which the annular portion of the sensor body 32 is pressed against the inner peripheral surface of the insertion hole 62.

In addition, the annular portion 63 that is formed in the upright wall portion 61 of each of the sensor receiving brackets 65 and 66 protrudes toward the side frame 2a, that is, the load input portion in the width direction. With such a configuration, when the sensor 30 is rotated by the input load so that the annular portion of the sensor body 32 is pressed against the inner peripheral surface of the insertion hole 62, the comparatively highly-rigid base end of the annular portion 63 is first pressed as illustrated in FIG. 23. As a result, the annular portion is appropriately pressed against the inner peripheral surface of the insertion hole 62.

Figure 24:
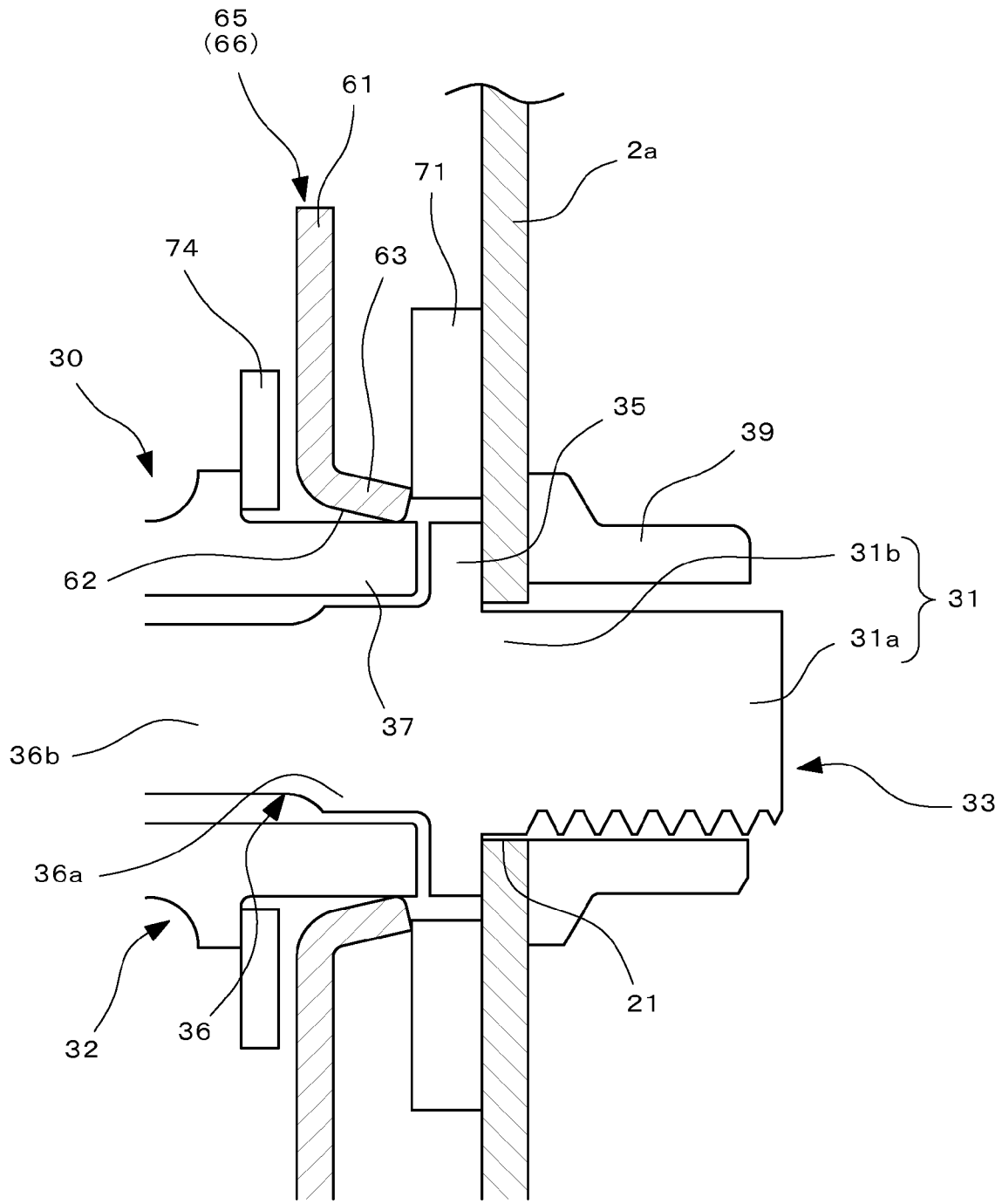
FIG. 24 is a partially enlarged front view illustrating a first modified example of a load measurement sensor support structure according to the other embodiment.

Furthermore, when the annular portion is pressed against the inner peripheral surface of the insertion hole 62 due to the rotation of the sensor 30, the load receiving surface 37a that exists in the upper portion of the outer peripheral surface of the annular portion contacts the inner peripheral surface of the insertion hole 62 while being inclined with respect to the center axis of the annular portion. Here, as illustrated in FIG. 24, the shape of the annular portion 63 is formed as a tapered shape of which the diameter decreases toward the free end so that the contact area of the load receiving surface 37a with respect to the inner peripheral surface of the insertion hole 62 is increased and the annular portion is further effectively pressed against the inner peripheral surface of the insertion hole 62. Accordingly, the inner peripheral surface of the insertion hole 62 may be formed as a surface that is inclined with respect to the center axis of the annular portion to correspond to the inclination of the load receiving surface 37a.

Figure 25:
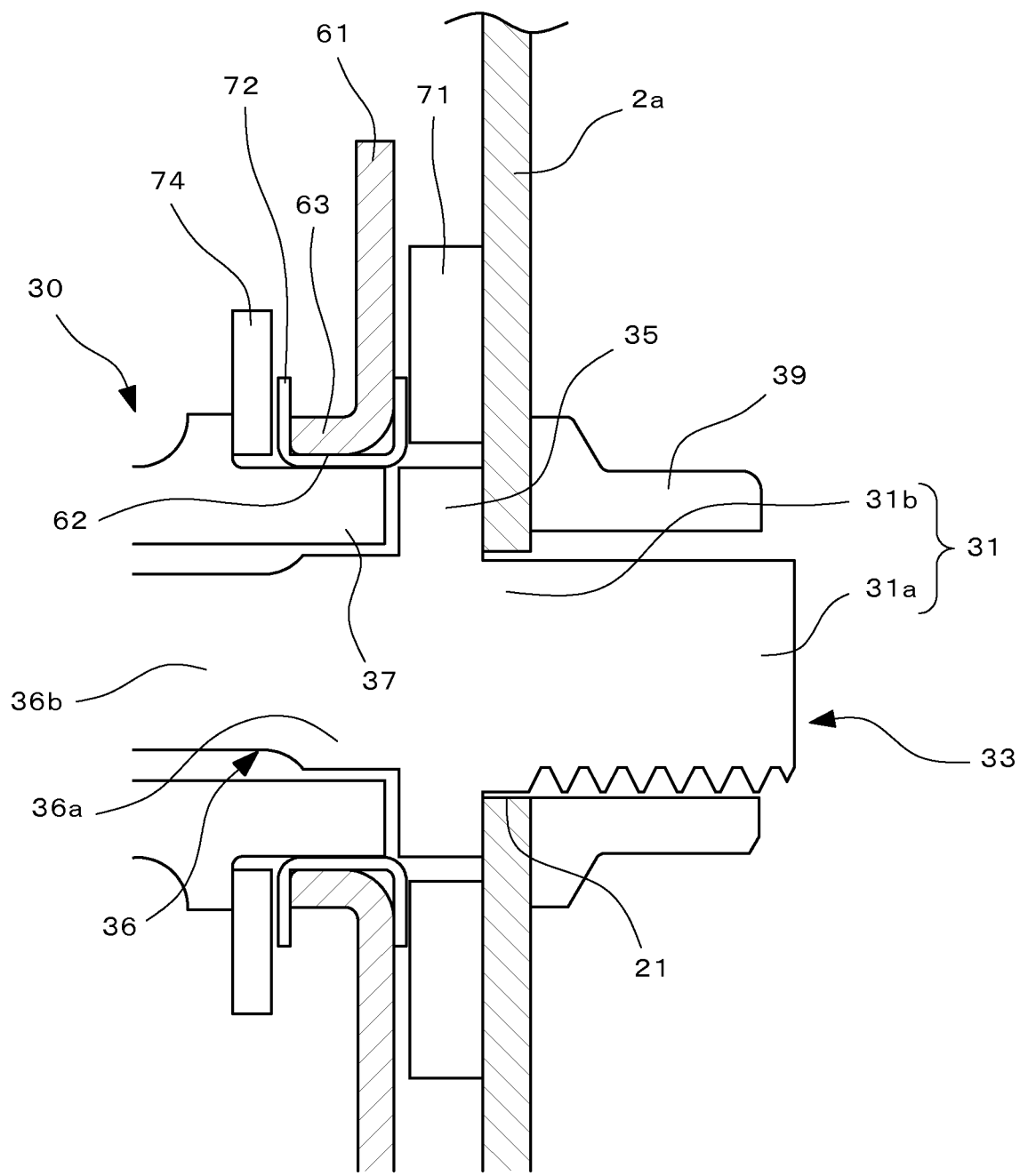
FIG. 25 is a partially enlarged front view illustrating a second modified example of a load measurement sensor support structure according to the other embodiment.
Figure 26:
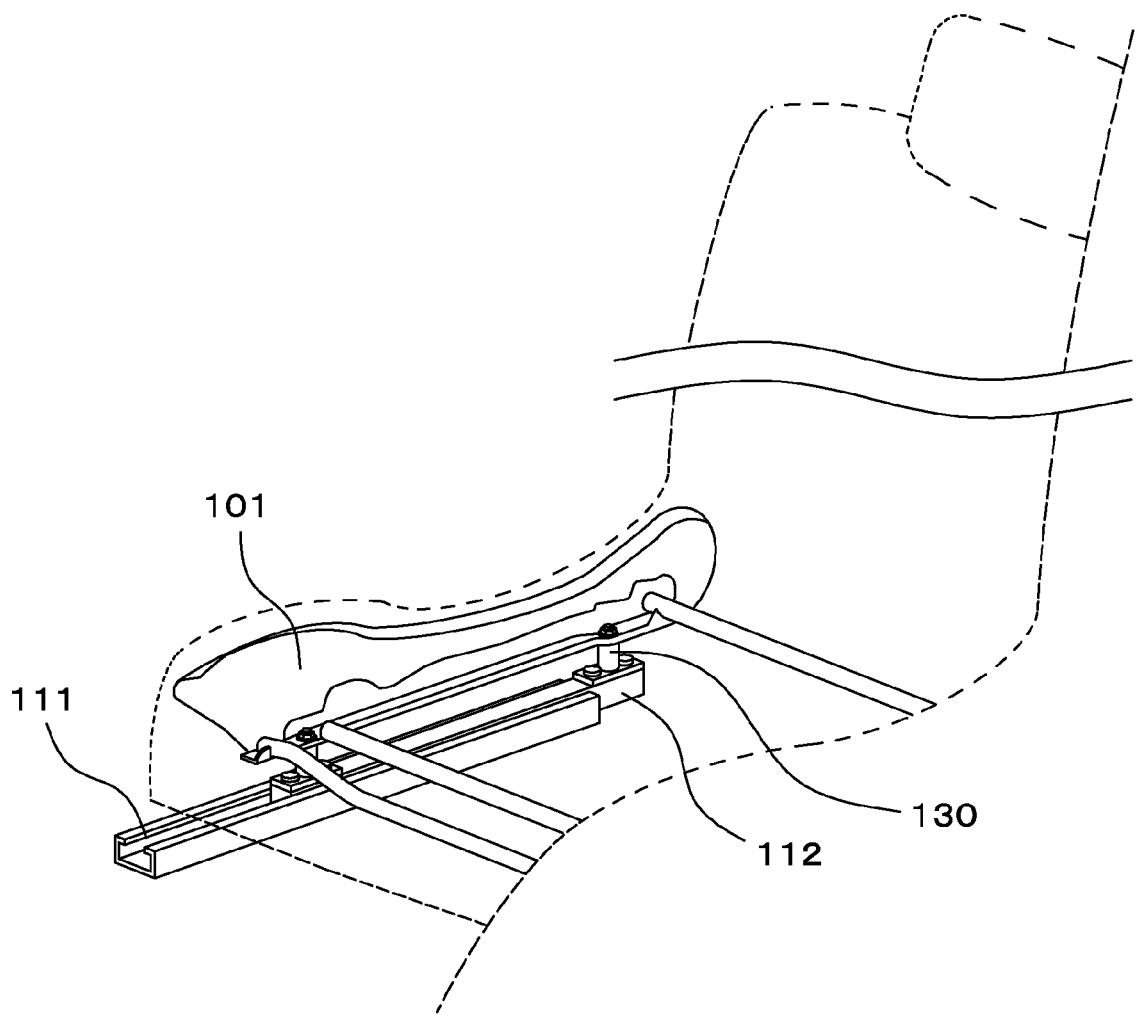
FIG. 26 is a partial perspective view illustrating a vehicle seat that employs a load measurement sensor support structure according to the related art.
Figure 27:
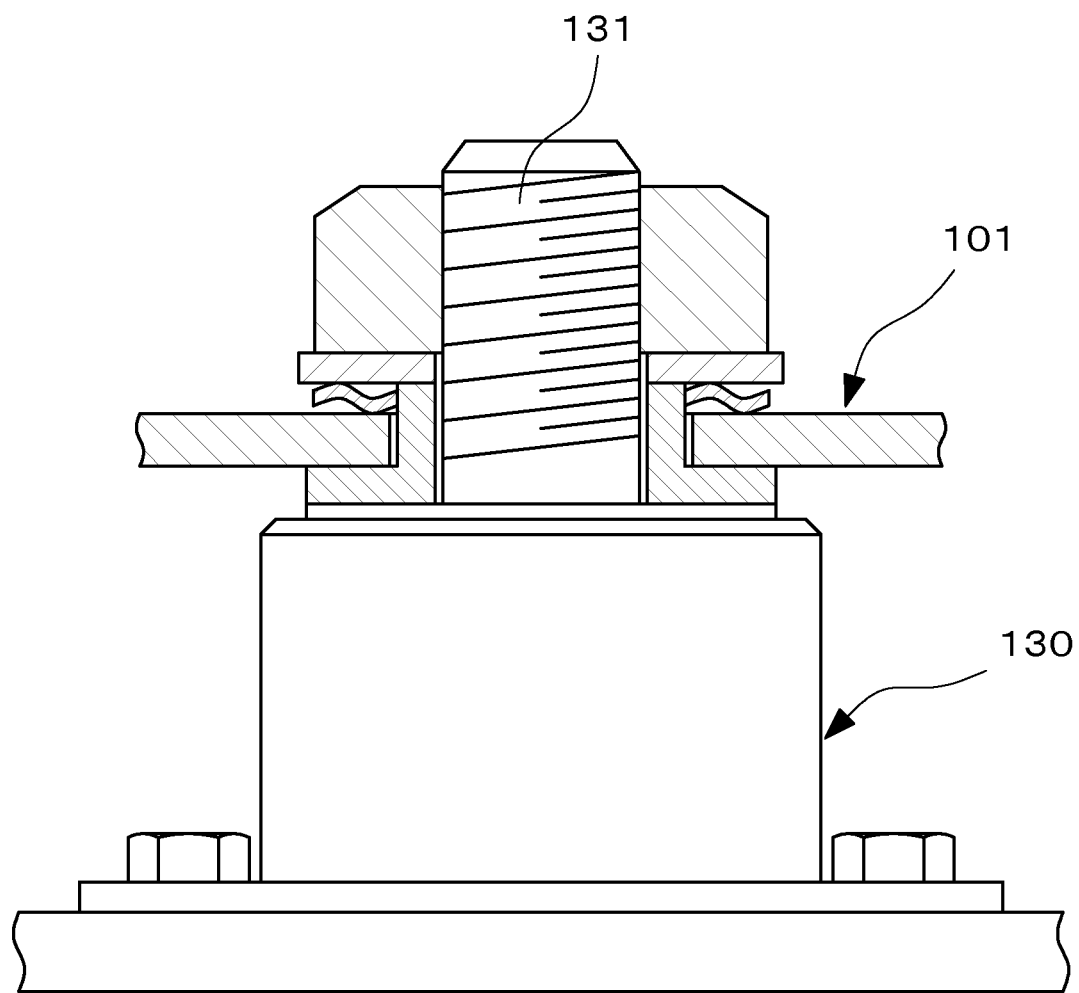
FIG. 27 is a cross-sectional view of the load measurement sensor support structure disclosed in the related art.

Further, a configuration in which the annular portion 63 protrudes toward the side frame 2a in the width direction has been described as an example. However, as illustrated in FIG. 25, the annular portion may protrude toward the opposite side to the side frame 2a, that is, the opposite side to the load input portion. In such a configuration, when the sensor 30 is rotated by the load input from the load input portion so that the annular portion of the sensor body 32 is pressed against the inner peripheral surface of the insertion hole 62, the free end of the annular portion 63 is first pressed against the inner peripheral surface of the insertion hole 62. Accordingly, for example, even when an excessive load is input from the load input portion, the annular portion is pressed against the inner peripheral surface of the insertion hole 62 at the free end of the annular portion 63. At that time, the free end is bent so that the impact load generated by the collision between the annular portion and the annular portion 63 is released. Thus, the excessive load may be absorbed.

Incidentally, in a state where the sensor 30 is supported by each of the sensor receiving brackets 65 and 66, the equal diameter portion 36a of the accommodation shaft portion 36 is disposed at the inside of the annular portion, and a part thereof forms the regulation portion that regulates the excessive deformation of the annular portion. Further, the unequal diameter portion 36b is provided in the area adjacent to the equal diameter portion 36a in the accommodation shaft portion 36, and a part of the reduced diameter portion is disposed inside the annular portion.

In a state where the sensor 30 is supported by each of the sensor receiving brackets 65 and 66, the annular portion is loosely inserted into the insertion hole 62, and a part of the reduced diameter portion in the unequal diameter portion 36b and the equal diameter portion 36a of the accommodation shaft portion 36 are disposed inside the insertion hole 62. In other words, the length of the insertion hole 62 is set in a degree that the entire equal diameter portion 36a is included in the range from one end of the insertion hole 62 to the other end thereof when the sensor 30 is supported by each of the sensor receiving brackets 65 and 66. With such a configuration, the entire area contacting the equal diameter portion 36a while being strained inward in the radial direction in the annular portion is surrounded by the annular portion 63. Accordingly, since the annular portion 63 contacts the portion that is strained by the load in the annular portion, the load is reliably transmitted.

Further, in a state where the sensor 30 is supported by each of the sensor receiving brackets 65 and 66, the upper end of each of the sensor receiving brackets 65 and 66 is located above the sensor 30 or the sensor attachment component 70, that is, a spacer 71, the sliding member 72, and a washer 74. In this way, when the sensor receiving brackets 65 and 66 are formed to be taller than the sensor attachment component 70 or the sensor 30 as the subject support body, the support rigidity with respect to the subject support body is improved.

Next, the sensor attachment components 70 will be described which appropriately support the sensor 30 so that a load is satisfactorily transmitted to the sensor 30. As illustrated in FIG. 20, the sensor attachment components 70 are arranged in parallel in order of the spacer 71, the sliding member 72, and the washer 74 from the outside in the width direction, and such a component set is provided for each of the sensor receiving brackets 65 and 66. In the sensor attachment components 70, the sliding member 72 is fitted to the insertion hole 62 formed in the upright wall portion 61 of each of the sensor receiving brackets 65 and 66, and constitutes the sensor body receiving portion along with the sensor receiving brackets 65 and 66.

Figure 21:
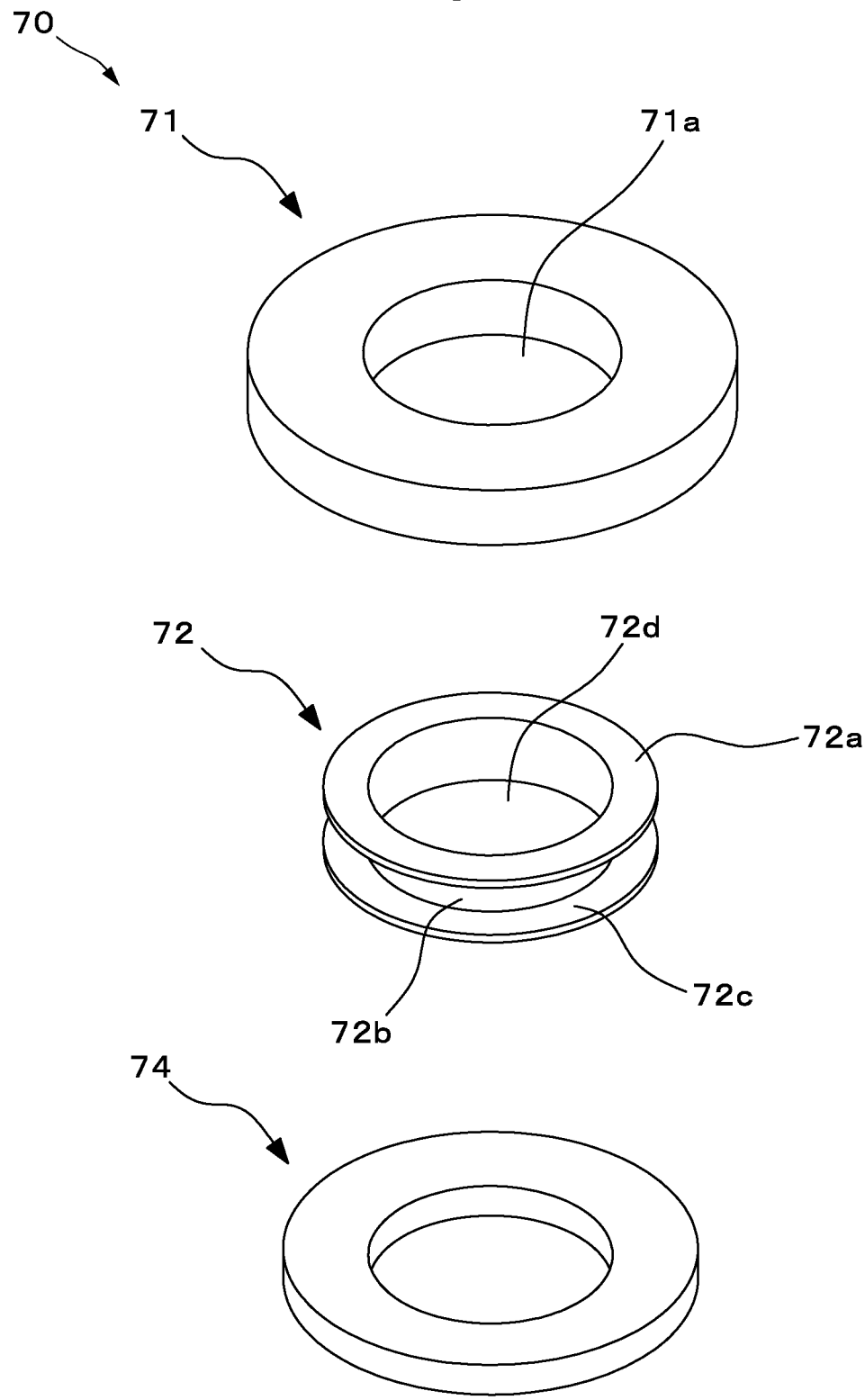
FIG. 21 is an exploded perspective component view illustrating sensor attachment components according to the other embodiment.

More specifically, the sliding member 72 is a cylindrical body illustrated in FIG. 21, and is attached to each of the sensor receiving brackets 65 and 66 in a state where the center portion thereof in the center axial direction is inserted into the insertion hole 62 of each of the sensor receiving brackets 65 and 66. At this time, the sliding member 72 is attached to each of the sensor receiving brackets 65 and 66 so that the center axial direction of the sliding member 72 matches the width direction of the vehicle seat Z. Further, in a state where the sensor 30 is supported by each of the sensor receiving brackets 65 and 66, a portion that extends from the free end of the annular portion as the load detection unit 37 to the position slightly before the base end thereof is fitted into the sliding member 42. That is, the sliding member 72 is located between the inner peripheral surface of the insertion hole 62 and the outer peripheral surface of the annular portion in the radial direction of the annular portion that matches the radial direction of the extension shaft portion 31.

Then, when the sensor 30 is rotated by the load applied to the vehicle seat Z so that the annular portion as the load detection unit 37 is pressed against the inner peripheral surface of the insertion hole 62 in each of the sensor receiving brackets 65 and 66, the sliding member 72 contacts the outer periphery of the annular portion. That is, the annular portion is pressed against the inner peripheral surface of the insertion hole 62 through the sliding member 42. In other words, the sliding member 72 inputs the load from the vehicle seat Z through the inner peripheral surface contacting the annular portion of the sensor body 32, and thus the inner peripheral surface of the sliding member 72 corresponds to a load input surface.

Further, when the annular portion is pressed against the inner peripheral surface of the insertion hole 62 through the sliding member 72, the sliding member 42 slides on the outer peripheral surface of the annular portion to move between the spacer 71 and the washer 74. That is, when the annular portion is pressed against the inner peripheral surface of the insertion hole 62 by the rotation of the sensor 30 so that the free end of the annular portion is strained inward in the radial direction, the sliding member 72 slides on the outer peripheral surface of the annular portion outward in the width direction, that is, toward the side frame 2a to follow the strained deformation. In this way, when the sliding member 72 slides outward in the width direction, the annular portion receives the load at the side frame 2a in which the fixed end of the sensor 30 exists. As a result, since the load is stably transmitted to the annular portion, the detection precision is improved.

In addition, in a state where the sensor 30 is supported by each of the sensor receiving brackets 65 and 66, the sliding member 72 is disposed to get astride of the free end of the annular portion in the width direction. Accordingly, when the annular portion is pressed against the inner peripheral surface of the insertion hole 62 through the sliding member 72, the annular portion is satisfactorily strained, and hence the load detection precision is improved.

As illustrated in FIG. 21, the sliding member 72 with the above-described configuration includes a cylindrical fitting cylinder portion 72b that is provided in the center axial direction the center portion and flange portions 72a and 72c that are provided at both ends in the center axial direction. Furthermore, the center axial direction of the sliding member 72 matches the sliding direction of the sliding member 72. Then, in a state where the sliding member 72 is supported by each of the sensor receiving brackets 65 and 66, the fitting cylinder portion 72b is inserted into the insertion hole 62, so that the one-end-side flange portion 72a in the center axial direction is adjacent to the free end at the outside of the free end of the annular portion 63 in the width direction and the other-end-side flange portion 72c in the center axial direction is adjacent to the inner surface of the upright wall portion 61. That is, when the sliding member 72 is attached to each of the sensor receiving brackets 65 and 66, the portion provided with the insertion hole 62 in the upright wall portion 61 of each of the sensor receiving brackets 65 and 66 is interposed between two flange portion 72a and 72c.

Further the sliding member 72 according to the other embodiment is formed so that the one-end-side flange portion 72a and the other-end-side flange portion 72c are symmetrical to each other, and the two flange portions 72a and 72c substantially have the same diameter. Accordingly, it is possible to suppress a force, which is exerted on the flange portions 72a and 72c when the annular portion of the sensor body 32 contacts the sliding member 72, from become non-uniform between the flange portions 72a and 72c. Further, when the one-end-side flange portion 72a and the other-end-side flange portion 72c are symmetrical to each other, the sliding member 42 may be attached from any end side when the sliding member is attached to the annular portion, and hence the operation of attaching the sliding member 72 may be easily performed.

The attachment of the sliding member 72 will be described. In a state where a substantially cylindrical base material is inserted into the insertion hole 62 of each of the sensor receiving brackets 65 and 66 and both ends of the base material are caused to protrude from the insertion hole 62, caulking is performed on each of both ends of the base material. By the above-described procedure, the sliding member 72 of which both ends are provided with the flange portions 72a and 72c is made, and hence the sliding member 72 is assembled to the upright wall portion 61 of each of the sensor receiving brackets 65 and 66. Then, in a state where the sliding member 72 is assembled to each of the sensor receiving brackets 65 and 66, the outer edge of the free end of the annular portion 63 is located at the inside of the outer edge of the one-end-side flange portion 72a. Accordingly, at the time point in which the caulking is performed, the one-end-side flange portion 72a may ensure a margin by the protruding amount in relation to the outer edge of the free end of the annular portion 63.

Furthermore, in a state where the sliding member 72 is attached to each of the sensor receiving brackets 65 and 66, as illustrated in FIG. 22, the one-end-side flange portion 72a of the sliding member 72 is coupled to the annular portion 63 while contacting the free end of the annular portion 63 without any gap therebetween. The other-end-side flange portion 72c is coupled to the upright wall portion 61 while contacting the inner surface of the upright wall portion 61, but a gap is formed between the upright wall portion 61 and the corner formed by the other-end-side flange portion 72c and the fitting cylinder portion 72b. This means that the annular portion 63 is formed in a manner such that the opening edge of the insertion hole 62 in the upright wall portion 61 is bent in an R-shape to protrude toward the side frame 2a as described above. Thus, the other-end-side flange portion 72c is coupled to the portion located at the outside of the radial direction in relation to the origin when the upright wall portion 61 is bent in an R-shape, and hence the other-end-side flange portion is coupled to the upright wall portion 61.

Then, in a state where the sensor 30 is supported by each of the sensor receiving brackets 65 and 66, the equal diameter portion 36a of the accommodation shaft portion 36 is disposed at the inner position in relation to both ends of the sliding member 72 in the axial direction of the extension shaft portion 31 as illustrated in FIG. 22. Accordingly, when the annular portion of the sensor body 32 is pressed against each of the sensor receiving brackets 65 and 66 through the sliding member 72, the equal diameter portion 36a exists at the opposite side to the sliding member 72 with the annular portion interposed therebetween, and hence a load is stably transmitted to the annular portion.

Further, in a state where the sensor 30 is supported by each of the sensor receiving brackets 65 and 66, the sliding member 72 is disposed to get astride of the slit formed between the annular portion and the positioning portion 35 of the sensor body 32 in the axial direction of the extension shaft portion 31 as illustrated in FIG. 22. That is, in the other embodiment, since the sliding member 72 is disposed at the outside of the radial direction of the slit, the slit is blocked by the sliding member 72, and hence it is possible to suppress the foreign matter from intruding into the slit.

Further, in a state where the sensor 30 is supported by each of the sensor receiving brackets 65 and 66, a gap (hereinafter, a hollow portion) Sv that is surrounded by the other-end-side flange portion 72c, the fitting cylinder portion 72b, and the R-shaped bent portion of the upright wall portion 61 in the axial direction of the extension shaft portion 31 reaches the boundary position between the equal diameter portion 36a and the unequal diameter portion 36b of the accommodation shaft portion 36 as illustrated in FIG. 22. That is, the hollow portion Sv and the upright wall portion 61 exist at the same position as that of the termination end of the equal diameter portion 36a in the axial direction of the extension shaft portion 31. Further, in the annular portion as the load detection unit 37, a portion located at the same position as that of the termination end of the equal diameter portion 36a in the center axial direction is located at the innermost side in the width direction in the pressed area of the inner peripheral surface of the insertion hole 62.

In this embodiment, as described above, when the sensor 30 is rotated by the input load so that the annular portion of the sensor body 32 is pressed against the inner peripheral surface of the insertion hole 62, the base end of the annular portion 63 is pressed. At this time, in the annular portion, the portion located at the same position as that of the equal diameter portion 36a is pressed against the inner peripheral surface of the insertion hole 62. Then, since the hollow portion Sv is formed at the base end of the annular portion 63, the impact generated when the annular portion contacts the inner peripheral surface of the insertion hole 62 is absorbed by the hollow portion Sv.

The washer 74 is an annular member into which the annular portion of the sensor body 32 is inserted. The washer 74 is located at the inside of the width direction in relation to the other-end-side flange portion 72c of the sliding member 72, and regulates the excessive inward movement of the sliding member 72 in the width direction. That is, the washer 74 is a movement regulation member that regulates the inward movement of the sliding member 72 in relation to the arrangement position of the washer 74. Further, as illustrated in FIG. 22, the boundary position between the equal diameter portion 36a and the unequal diameter portion 36b of the accommodation shaft portion 36 is located at the outside of the width direction in relation to the washer 74. Accordingly, it is possible to suppress an increase in the length of the equal diameter portion 36a more than the necessity in the axial direction of the accommodation shaft portion 36. Further, the outer diameter of the washer 74 is set to be larger than the outer diameters of the flange portions 72a and 72c of the sliding member 72. Accordingly, it is possible to reduce excessive movement of the sliding member 72 by the washer 74. Furthermore, the present invention is not limited the configuration in which the washer 74 is provided separately from the sensor 30. For example, the washer may be integrally formed with the annular portion of the sensor body 32. In such a configuration, the number of components may be decreased, and hence the time taken for the operation of supporting the sensor 30 may be shortened.

The spacer 71 is a cylindrical member that is located between the one-end-side flange portion 72a of the sliding member 72 and the side frame 2a, and regulates the excessive outward movement of the sliding member 72 in the width direction. More specifically, when the sliding member 42 fitted to the annular portion of the sensor body 32 slides outward on the outer peripheral surface of the annular portion, the spacer 71 regulates the sliding member 72 from being separated from the annular portion while contacting the sliding member 72. The spacer 71 is formed so that a circular hole 71a formed in the center portion is coupled to the side frame 2a by projection-welding while coaxially overlapping the hole portion 21 of the side frame 2a. The diameter of the circular hole 71a is larger than the diameter of the hole portion 21. Then, in a state where the sensor 30 is supported by each of the sensor receiving brackets 65 and 66, the positioning portion 35 of the sensor body 32 is disposed inside the circular hole 71a as illustrated in FIG. 22. Furthermore, the present invention is not limited to the configuration in which the spacer 71 is provided separately from the sensor 30 or the sensor receiving brackets 65 and 66. For example, the spacer is integrally formed with the upright wall portion 61 by processing a part of the upright wall portion 61 of each of the sensor receiving brackets 65 and 66. In such a configuration, the number of the components may be decreased, and hence the time taken for the operation of attaching the sensor 30 may be shortened.

Other Embodiments

In the above-described embodiments, the load measurement sensor support structure that measures the load generated when the passenger sits on the vehicle seat Z has been exemplified as the load measurement sensor support structure. However, the above-described embodiments are merely used to help the comprehension of the present invention, and do not limit the present invention. The present invention may be modified and improved without departing from the spirit of the present invention, and the present invention may, of course, include the equivalent thereof. Further, the above-described material or shape is merely an example for exhibiting the effect of the present invention, and does not limit the present invention.

For example, in the above-described embodiments, a strain sensor that detects and measures the deformation amount of the load detection unit 37 has been exemplified as the sensor 30, but the present invention is not limited thereto. For example, a load measurement sensor may be used which includes a magnet displaced with the deformation of the load detection unit 37 and a hall element facing the magnet. In the load measurement sensor with such a configuration, when the load detection unit 37 is deformed, the magnet is displaced with the deformation, and the hall element measures the displacement amount, thereby measuring the load from the measurement result.

Further, in the above-described embodiments, in a case where the sensor 30 needs to be supported, the extension shaft portion 31 is inserted into the insertion hole 52 of each of the attachment brackets 15 and 16, the male screw portion 31a is caused to protrude toward the outside of the attachment brackets 15 and 16, and then the nut 39 is threaded into the male screw portion 31a. However, the present invention is not limited thereto. For example, in a case where the sensor 30 is supported, the front end of the extension shaft portion 31 may not be caused to protrude toward the outside of the attachment brackets 15 and 16. That is, in a state where the extension shaft portion 31 is inserted into the insertion hole 52, the front end of the extension shaft portion 31 may be located between the one-end-side opening of the insertion hole 52 (the opening at the insertion side of the extension shaft portion 31) and the other-end-side opening located opposite to the one-end-side opening. With such a configuration, it is possible to suppress a portion (in other words, the nut 39) protruding from the attachment brackets 15 and 16 in the extension shaft portion 31 from interfering with the other members.

Further, in the above-described embodiments, a configuration has been described in which the attachment brackets 15 and 16 supporting the sensor 30 are attached to the upper rail 12, but the vehicle body floor or the like may be exemplified as the other components to which the attachment brackets 15 and 16 are attached. That is, the attachment brackets 15 and 16 may be directly attached to the vehicle body floor. Further, a configuration has been described in which the bolts 18a and 18b face each other in the front to back direction with the sensor 30 interposed therebetween, but the bolts 18a and 18b may face each other in the seat width direction with the sensor 30 interposed therebetween.

In addition, in the above-described embodiments, a configuration has been described in which the fastening member used for attaching the attachment brackets 15 and 16 is attached to the upper rail 12, but the fastening member may be attached to the side frame 2a. That is, a configuration may be employed in which the bolts 18a and 18b are attached to the side frame 2a and the bolts 18a and 18b are attached to both sides of the sensor 30. At this time, in particular, in a case where the bolts 18a and 18b are disposed to protrude inward in the width direction of the vehicle seat Z, it is desirable to evenly arrange the heights of the upper ends of the bolts 18a and 18b.

Further, in the above-described embodiments, a configuration has been described in which the bolts 18a and 18b are attached in the horizontal plane like the upper rail 12, but the bolts may be attached to a surface in the vertical plane as well.

Further, in the above-described embodiments, it is described that the S-spring 6 is provided as the support spring that supports the cushion member. Then, in the above-described embodiments, it is described that the sensor 30 is disposed at a position separated from the S-spring 6 as much as possible in order to avoid the interference between the sensor 30 and the S-spring 6. However, the present invention is not limited thereto. For example, a configuration may be employed in which a passenger posture support member such as a pan frame (a sheet-metal member) may be provided instead of the support spring. Even in such a configuration, it is desirable to attach the sensor 30 so that the sensor is separated from the passenger posture support member as much as possible in order to realize the compact size of the vehicle seat Z.

Further, in the above-described embodiments, the bush 43 or the sliding member 42 is provided in order to further appropriately transmit the load from the side frame 2a to the sensor body 32, that is, the load detection unit 37, and the side frame 2a presses the load detection unit 37 through the bush 43 or the sliding member 42. However, the present invention is not limited thereto. For example, a configuration may be employed in which the bush 43 or the sliding member 42 is not provided and the side frame 2a directly contacts the load detection unit 37 to press the load detection unit 37. Further, the other relay member other than the bush 43 or the sliding member 42 may be provided inside the load transmission path from the side frame 2a to the sensor body 32.

Furthermore, in the above-described embodiments, the sliding member 42 corresponds to a movable portion that moves with the deformation of the load detection unit 37. However, for example, in a configuration in which the side frame 2a directly contacts the load detection unit 37 to press the load detection unit 37, the side frame 2a corresponds to a movable portion.

Further, in the above-described embodiments, the vehicle seat Z has been exemplified as an example of the seat, but the present invention is not limited thereto. For example, the present invention may be also applied to the other conveyance seat of an airplane, a ship, or the like. Further, the present invention is not limited to the conveyance seat, and may be applied to any seat that requires the load measurement.

REFERENCE NUMERALS 1 seat back frame
2 seating frame
2a side frame
2ax concave portion (removal portion)
2ay flange portion
3 connection pipe (connection member)
4 submarine restraining pipe (connection member)
4a width-direction center portion
4b width-direction end
4c connection portion
4d shaft center
5 installation pan (plate-shaped frame)
5a attachment portion
6 S-spring
6a first curved portion
6b second curved portion
10 rail member
11 lower rail (rail member)
12 upper rail (rail member)
13 fixed bracket
14 member frame
15 attachment bracket 16 attachment bracket
17 slide lever
18 bolt
18a bolt (first attachment member)
18b bolt (second attachment member)
18c pin
18d pin
18e pin
20 front end
21 hole portion
22 connection area (connection portion)
23 back attachment area (outward protruding portion)
23a projection portion
24 front end area
25 front attachment area (outward protruding portion)
25a projection portion
25b concave portion
26 middle area
26a lower portion
26b upper portion
26c back adjacent portion
26d front adjacent portion
30 sensor
31 extension shaft portion
31a male screw portion
31b adjacent portion
31c convex portion
31d convex portion
31e shaft center
32 sensor body
33 shaft body
34 circuit board unit
34a connector portion
35 positioning portion
36 accommodation shaft portion
36a equal diameter portion
36b unequal diameter portion
37 load detection unit
37a load receiving surface
37b free end
39 nut (fastening member)
40 sensor attachment component
41 spacer
41a circular hole
42 sliding member
42a one-end-side flange portion
42b fitting cylinder portion
42c other-end-side flange portion
42d through-hole
43 bush
43a cylindrical portion
43b flange portion
43c through-hole
44 washer
50 bottom wall portion
50a extension portion
51 upright wall portion
51a concave portion
51b convex portion
52 insertion hole
52a concave portion
52b concave portion
53 upward protruding wall
54 removal portion
55 inner flange portion
56 back end protruding wall
60 bottom wall portion
61 upright wall portion
62 insertion hole
63 annular portion
64 upward protruding wall
65 sensor receiving bracket
66 sensor receiving bracket
70 sensor attachment component
71 spacer
71a circular hole
72 sliding member
72a one-end-side flange portion
72b fitting cylinder portion
72c other-end-side flange portion
72d through-hole
74 washer
101 seat frame
111 lower rail
112 upper rail
130 load measurement sensor
131 shaft portion
F seat frame
S seat unit
Z vehicle seat (seat)
Sv hollow portion

The invention claimed is:

1. A load measurement sensor support structure that supports a load measurement sensor, which includes a sensor body that detects a load applied to a seat and an extension shaft portion extending from the lateral side of the sensor body, the sensor support structure comprising:
a support bracket that supports the sensor while the extension shaft portion is located at the lateral side of the sensor body, the support bracket comprising:
an upright wall portion that is provided with an insertion hole into which the extension shaft portion is inserted when the load measurement sensor is supported;
a bottom wall portion that intersects the upright wall portion and contacts the upright wall portion at one end in a seat width direction; and
an upward protruding wall that:
is provided at a position contacting the bottom wall portion at an other end of the bottom wall portion opposite to the upright wall portion in the width direction;
intersects the bottom wall portion;
faces the upright wall portion; and
comprises a removal portion:
formed by removing a part of the upward protruding wall; and
provided at a position that is opposite to the insertion hole of the upright wall portion.

2. The load measurement sensor support structure according to claim 1, wherein:
the support bracket extends in a front to back direction of the seat;
the upward protruding wall is formed from a front end of the bottom wall portion toward a back end thereof; and
the removal portion, is formed at a same position as a center axis of the extension shaft portion of the load measurement sensor in the front to back direction so that the load measurement sensor is exposed to a space opposite to the upright wall portion when viewed from the upward protruding wall in the width direction.

3. The load measurement sensor support structure according to claim 1, wherein:

the seat is attached onto a rail member that extends in a front to back direction of the seat through the support bracket; and the support bracket is separated from the rail member, and is removably fixed to the rail member.

4. The load measurement sensor support structure according to claim 3, wherein:
the support bracket is fixed to the rail member by a fastening member; and
the fastening member is set to a position that avoids the load measurement sensor in the front to back direction.

5. The load measurement sensor support structure according to claim 3, wherein the support bracket fixing position in the rail member is adjustable in a longitudinal direction of the rail member.

6. A load measurement sensor support structure that supports a load measurement sensor, which includes a sensor body that detects a load applied to a seat and an extension shaft portion extending from the lateral side of the sensor body, the sensor support structure comprising:
a support bracket that supports the sensor while the extension shaft portion is located at the lateral side of the sensor body, the support bracket comprising:
an upright wall portion that is provided with an insertion hole into which the extension shaft portion is inserted when the load measurement sensor is supported;
a bottom wall portion that intersects the upright wall portion and contacts the upright wall portion at one end in a seat width direction; and
an upward protruding wall that:
is provided at a position contacting the bottom wall portion at an other end of the bottom wall portion opposite to the upright wall portion in the width direction;
intersects the bottom wall portion; and
faces the upright wall portion;
wherein:
the sensor body includes a deformation portion that is deformed bent inwardly in a radial direction of the extension shaft portion by receiving the load;
the load measurement sensor support structure comprises:
a load input portion that contacts the load measurement sensor to input the load to the load measurement sensor; and
a sensor body receiving portion that presses the deformation portion when the load measurement sensor is moved by the load input from the load input portion,
the sensor body receiving portion includes the support bracket as a constituent; and
the load input portion is separated from the sensor body receiving portion while the load measurement sensor is supported by the support bracket.

7. The load measurement sensor support structure according to claim 6, wherein:
the load measurement sensor is rotated by the load input from the load input portion;
the deformation portion moves in a direction in which the deformation portion is pressed by the sensor body due to the rotation of the load measurement sensor; and
the load input portion is separated from the sensor body receiving portion in an axial direction of the extension shaft portion in a state where the load measurement sensor is supported by the support bracket.

8. The load measurement sensor support structure according to claim 7, wherein the load input portion is located at an opposite side to the sensor body when viewed from the sensor body receiving portion in the axial direction in a state where the load measurement sensor is supported by the support bracket.

9. The load measurement sensor support structure according to claim 7, wherein:
the deformation portion is an annular portion that is inserted into the insertion hole and is pressed against the inner peripheral surface of the insertion hole to be strained in the radial direction;
the sensor body receiving portion includes a sliding member that is located between the inner peripheral surface of the insertion hole and the outer peripheral surface of the annular portion in the radial direction and is slidable on the outer peripheral surface of the annular portion;
when the load measurement sensor is moved by the load input from the load input portion, the annular portion is pressed against the inner peripheral surface of the insertion hole through the sliding member; and
the sliding member is a cylindrical body into which the annular portion is fitted, a flange portion is provided at each of both ends of the sliding member in the sliding direction, and the flange portion at one end side in the sliding direction and the flange portion at the other end side in the sliding direction are formed symmetrical to each other.

10. The load measurement sensor support structure according to claim 7, wherein:
the seat includes side frames that are separated from each other in a seat width direction;
the upright wall portion is disposed at a position that is parallel to the side frame in the axial direction; and
a portion that is located at the lower position in relation to the insertion hole in the upright wall portion extends downward in an up to down direction.

11. The load measurement sensor support structure according to claim 6, wherein the support bracket constitutes at least a part of the rail member on which the seat is placed.

12. The load measurement sensor support structure according to claim 6, wherein:
the upright wall portion includes an annular portion that is formed at an inside of the insertion hole and protrudes in a seat width direction; and
when the load measurement sensor is moved by the load input from the load input portion, the deformation portion is pressed against the inner peripheral surface of the insertion hole.

13. The load measurement sensor support structure according to claim 12, wherein the annular portion protrudes toward the load input portion in the width direction.

14. The load measurement sensor support structure according to claim 12, wherein the annular portion protrudes toward an opposite side to the load input portion in the width direction.

15. The load measurement sensor support structure according to claim 12, wherein:
the deformation portion is an annular portion that is inserted into the insertion hole and is pressed against the inner peripheral surface of the insertion hole to be strained in the radial direction;
the sensor body receiving portion includes a sliding member that is located between the inner peripheral surface of the insertion hole and the outer peripheral surface of the annular portion in the radial direction and is slidable on the outer peripheral surface of the annular portion;
when the load measurement sensor is moved by the load input from the load input portion, the annular portion is pressed against the inner peripheral surface of the insertion hole through the sliding member;

the sliding member is a cylindrical body into which the annular portion is fitted, and a flange portion is provided at each of both ends of the sliding member in the sliding direction;

a one-end-side flange portion located at one side in the sliding direction among the flange portions is adjacent to a front end of the annular portion at the outside of the front end in the width direction; and an outer edge of the front end of the annular portion is located at the inside of an outer edge of the one-end-side flange portion.

16. The load measurement sensor support structure according to claim 12, wherein:

the deformation portion includes an annular portion that is inserted into the insertion hole and is pressed against the inner peripheral surface of the insertion hole so as to be strained in the radial direction;

the sensor body includes an inner portion that is located at the inside of the annular portion in the radial direction;

the inner portion includes an inner large-diameter area that contacts the annular portion when the annular portion is strained inward in the radial direction and an inner small-diameter area that is adjacent to the inner large-diameter area and has a diameter smaller than that of the inner large-diameter area; and in a state where the load measurement sensor is supported by the support bracket, at least a part of the inner large-diameter area and the inner small-diameter area are disposed inside the insertion hole.

17. The load measurement sensor support structure according to claim 6, wherein:

the seat includes side frames that are separated from each other in a seat width direction;

the support bracket is located at the inside of the side frame in the width direction; and a front end of the extension shaft portion protrudes from the insertion hole and is fastened to the side frame.

* * * * *